United States Patent
Moore et al.

(10) Patent No.: US 10,024,678 B2
(45) Date of Patent: Jul. 17, 2018

(54) WEARABLE CLIP FOR PROVIDING SOCIAL AND ENVIRONMENTAL AWARENESS

(71) Applicant: Toyota Motor Engineering & Manufacturing North America, Inc., Erlanger, KY (US)

(72) Inventors: Douglas A. Moore, Livermore, CA (US); Joseph M. A. Djugash, San Jose, CA (US); Yasuhiro Ota, Santa Clara, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 14/489,420

(22) Filed: Sep. 17, 2014

(65) Prior Publication Data

US 2016/0080897 A1    Mar. 17, 2016

(51) Int. Cl.
*G01C 21/36* (2006.01)
*H04W 4/02* (2018.01)
(Continued)

(52) U.S. Cl.
CPC .......... *G01C 21/3617* (2013.01); *G01S 19/13* (2013.01); *G01S 19/14* (2013.01);
(Continued)

(58) Field of Classification Search
CPC .............. G01C 21/343; G01C 21/3617; G01C 21/3623; G01C 21/3652; G01C 21/206
See application file for complete search history.

(56) References Cited

U.S. PATENT DOCUMENTS

| 4,520,501 A | 5/1985 | DuBrucq |
| 4,586,827 A | 5/1986 | Hirsch et al. |

(Continued)

FOREIGN PATENT DOCUMENTS

| CN | 201260746 | 6/2009 |
| CN | 101527093 | 9/2009 |

(Continued)

OTHER PUBLICATIONS

Wang, et al.; "Camera-Based Signage Detection and Recognition for Blind Persons"; ICCHP 2, vol. 7383 of Lecture Notes in Computer Science; pp. 17-24; 2012.

(Continued)

*Primary Examiner* — Khoi H Tran
*Assistant Examiner* — Donald J Wallace
(74) *Attorney, Agent, or Firm* — Snell & Wilmer LLP

(57) ABSTRACT

A clip includes an IMU coupled to the clip and adapted to detect inertial measurement data and a GPS coupled to the device and adapted to detect location data. The clip further includes a camera adapted to detect image data and a memory adapted to store data. The clip further includes a processor adapted to recognize an object in the surrounding environment by analyzing the data. The processor can determine a desirable action based on the data and a current time or day. The processor can determine a destination based on the determined desirable action. The processor can determine a navigation path based on the determined destination and the data. The processor is further adapted to determine output based on the navigation path. The clip further includes a speaker adapted to provide audio information to the user.

20 Claims, 17 Drawing Sheets

(51) Int. Cl.

| | | |
|---|---|---|
| G08B 6/00 | (2006.01) | |
| H04N 7/18 | (2006.01) | |
| G06K 9/46 | (2006.01) | |
| G06K 9/00 | (2006.01) | |
| G01S 19/13 | (2010.01) | |
| G01S 19/14 | (2010.01) | |
| G01S 19/49 | (2010.01) | |
| G08B 13/24 | (2006.01) | |
| G08B 25/08 | (2006.01) | |
| G08B 3/10 | (2006.01) | |
| G01C 21/16 | (2006.01) | |
| G01C 21/20 | (2006.01) | |

(52) U.S. Cl.
CPC .......... *G01S 19/49* (2013.01); *G06K 9/00476* (2013.01); *G06K 9/00664* (2013.01); *G06K 9/46* (2013.01); *G08B 6/00* (2013.01); *G08B 13/2462* (2013.01); *G08B 25/08* (2013.01); *H04N 7/18* (2013.01); *H04W 4/02* (2013.01); *G01C 21/165* (2013.01); *G01C 21/206* (2013.01); *G01C 21/3629* (2013.01); *G01C 21/3652* (2013.01); *G06K 2209/27* (2013.01); *G08B 3/10* (2013.01)

(56) References Cited

U.S. PATENT DOCUMENTS

| | | | |
|---|---|---|---|
| 4,786,966 | A | 11/1988 | Hanson |
| 5,047,952 | A | 9/1991 | Kramer |
| 5,097,856 | A | 3/1992 | Chi-Sheng |
| 5,129,716 | A | 7/1992 | Holakovsky et al. |
| 5,233,520 | A | 8/1993 | Kretsch et al. |
| 5,265,272 | A | 11/1993 | Kurcbart |
| 5,463,428 | A | 10/1995 | Lipton et al. |
| 5,508,699 | A | 4/1996 | Silverman |
| 5,539,665 | A | 7/1996 | Lamming et al. |
| 5,543,802 | A | 8/1996 | Villevielle |
| 5,544,050 | A | 8/1996 | Abe |
| 5,568,127 | A | 10/1996 | Bang |
| 5,636,038 | A | 6/1997 | Lynt |
| 5,659,764 | A | 8/1997 | Sakiyama |
| 5,701,356 | A | 12/1997 | Stanford et al. |
| 5,733,127 | A | 3/1998 | Mecum |
| 5,807,111 | A * | 9/1998 | Schrader .............. A61F 9/08 367/116 |
| 5,872,744 | A | 2/1999 | Taylor |
| 5,953,693 | A | 9/1999 | Sakiyama |
| 5,956,630 | A * | 9/1999 | Mackey ............. H04B 1/086 2/60 |
| 5,982,286 | A | 11/1999 | Vanmoor |
| 6,009,577 | A | 1/2000 | Day |
| 6,055,048 | A | 4/2000 | Langevin et al. |
| 6,067,112 | A | 5/2000 | Wellner et al. |
| 6,199,010 | B1 | 3/2001 | Richton |
| 6,229,901 | B1 | 5/2001 | Mickelson et al. |
| 6,230,135 | B1 | 5/2001 | Ramsay |
| 6,230,349 | B1 | 5/2001 | Silver et al. |
| 6,285,757 | B1 | 9/2001 | Carroll et al. |
| 6,307,526 | B1 | 10/2001 | Mann |
| 6,323,807 | B1 * | 11/2001 | Golding ............... G01C 21/20 342/419 |
| 6,349,001 | B1 | 2/2002 | Spitzer |
| 6,466,232 | B1 * | 10/2002 | Newell ............... G06F 1/163 345/3.1 |
| 6,477,239 | B1 | 11/2002 | Ohki |
| 6,542,623 | B1 | 4/2003 | Kahn |
| 6,580,999 | B2 * | 6/2003 | Maruyama ......... G01C 21/26 342/357.31 |
| 6,594,370 | B1 * | 7/2003 | Anderson ............ H01Q 1/273 381/315 |
| 6,603,863 | B1 | 8/2003 | Nagayoshi |
| 6,619,836 | B1 | 9/2003 | Silvant et al. |
| 6,701,296 | B1 | 3/2004 | Kramer |
| 6,774,788 | B1 * | 8/2004 | Balfe .................... A61H 3/061 340/4.12 |
| 6,825,875 | B1 | 11/2004 | Strub et al. |
| 6,826,477 | B2 | 11/2004 | Ladetto et al. |
| 6,834,373 | B2 | 12/2004 | Dieberger |
| 6,839,667 | B2 | 1/2005 | Reich |
| 6,857,775 | B1 | 2/2005 | Wilson |
| 6,920,229 | B2 | 7/2005 | Boesen |
| D513,997 | S | 1/2006 | Wilson |
| 7,027,874 | B1 | 4/2006 | Sawan et al. |
| D522,300 | S | 6/2006 | Roberts |
| 7,069,215 | B1 | 6/2006 | Bangalore |
| 7,106,220 | B2 | 9/2006 | Gourgey et al. |
| 7,228,275 | B1 | 6/2007 | Endo |
| 7,299,034 | B2 | 11/2007 | Kates |
| 7,308,314 | B2 | 12/2007 | Havey et al. |
| 7,336,226 | B2 | 2/2008 | Jung et al. |
| 7,356,473 | B2 | 4/2008 | Kates |
| 7,413,554 | B2 | 8/2008 | Kobayashi et al. |
| 7,417,592 | B1 | 8/2008 | Hsiao et al. |
| 7,428,429 | B2 | 9/2008 | Gantz et al. |
| 7,463,188 | B1 | 12/2008 | McBurney |
| 7,496,445 | B2 | 2/2009 | Mohsini |
| 7,501,958 | B2 | 3/2009 | Saltzstein et al. |
| 7,525,568 | B2 | 4/2009 | Raghunath |
| 7,564,469 | B2 | 7/2009 | Cohen |
| 7,565,295 | B1 | 7/2009 | Hernandez-Rebollar |
| 7,598,976 | B2 | 10/2009 | Sofer et al. |
| 7,618,260 | B2 | 11/2009 | Daniel et al. |
| D609,818 | S | 2/2010 | Tsang et al. |
| 7,656,290 | B2 | 2/2010 | Fein et al. |
| 7,659,915 | B2 | 2/2010 | Kurzweil et al. |
| 7,743,996 | B2 | 6/2010 | Maciver |
| D625,427 | S | 10/2010 | Lee |
| 7,843,351 | B2 | 11/2010 | Bourne |
| 7,843,488 | B2 | 11/2010 | Stapleton |
| 7,848,512 | B2 | 12/2010 | Eldracher |
| 7,864,991 | B2 | 1/2011 | Espenlaub et al. |
| 7,938,756 | B2 | 5/2011 | Rodetsky et al. |
| 7,991,576 | B2 * | 8/2011 | Roumeliotis .......... G01C 21/12 340/995.1 |
| 8,005,263 | B2 | 8/2011 | Fujimura |
| 8,035,519 | B2 | 10/2011 | Davis |
| D649,655 | S | 11/2011 | Petersen |
| 8,123,660 | B2 | 2/2012 | Kruse et al. |
| D656,480 | S | 3/2012 | McManigal et al. |
| 8,138,907 | B2 * | 3/2012 | Barbeau ................ G01C 21/20 340/457 |
| 8,150,107 | B2 * | 4/2012 | Kurzweil ............... G06F 3/017 348/62 |
| 8,177,705 | B2 | 5/2012 | Abolfathi |
| 8,239,032 | B2 | 8/2012 | Dewhurst |
| 8,253,760 | B2 | 8/2012 | Sako et al. |
| 8,300,862 | B2 | 10/2012 | Newton et al. |
| 8,325,263 | B2 | 12/2012 | Kato et al. |
| D674,501 | S | 1/2013 | Petersen |
| 8,359,122 | B2 | 1/2013 | Koselka et al. |
| 8,395,968 | B2 * | 3/2013 | Vartanian ............. G01S 15/08 367/99 |
| 8,401,785 | B2 * | 3/2013 | Cho .................... G01C 21/3602 340/995.24 |
| 8,414,246 | B2 | 4/2013 | Tobey |
| 8,418,705 | B2 | 4/2013 | Ota et al. |
| 8,428,643 | B2 | 4/2013 | Lin |
| 8,483,956 | B2 | 7/2013 | Zhang |
| 8,494,507 | B1 | 7/2013 | Tedesco et al. |
| 8,494,859 | B2 | 7/2013 | Said |
| 8,538,687 | B2 * | 9/2013 | Plocher ................ G01C 21/20 701/433 |
| 8,538,688 | B2 | 9/2013 | Prehofer |
| 8,571,860 | B2 | 10/2013 | Strope |
| 8,583,282 | B2 | 11/2013 | Angle et al. |
| 8,588,464 | B2 | 11/2013 | Albertson et al. |
| 8,588,972 | B2 | 11/2013 | Fung |
| 8,591,412 | B2 | 11/2013 | Kovarik et al. |
| 8,594,935 | B2 | 11/2013 | Cioffi et al. |
| 8,606,316 | B2 | 12/2013 | Evanitsky |
| 8,610,879 | B2 | 12/2013 | Ben-Moshe et al. |

(56) References Cited

U.S. PATENT DOCUMENTS

| | | | |
|---|---|---|---|
| 8,630,633 B1* | 1/2014 | Tedesco | A61F 4/00 |
| | | | 434/132 |
| 8,676,274 B2 | 3/2014 | Li | |
| 8,676,623 B2* | 3/2014 | Gale | G01C 21/20 |
| | | | 705/7.13 |
| 8,694,251 B2 | 4/2014 | Janardhanan et al. | |
| 8,704,902 B2 | 4/2014 | Naick et al. | |
| 8,718,672 B2 | 5/2014 | Xie et al. | |
| 8,743,145 B1 | 6/2014 | Price | |
| 8,750,898 B2 | 6/2014 | Haney | |
| 8,768,071 B2 | 7/2014 | Tsuchinaga et al. | |
| 8,786,680 B2 | 7/2014 | Shiratori | |
| 8,797,141 B2 | 8/2014 | Best et al. | |
| 8,797,386 B2 | 8/2014 | Chou et al. | |
| 8,803,699 B2 | 8/2014 | Foshee et al. | |
| 8,805,929 B2 | 8/2014 | Erol et al. | |
| 8,812,244 B2 | 8/2014 | Angelides | |
| 8,814,019 B2 | 8/2014 | Dyster et al. | |
| 8,825,398 B2* | 9/2014 | Alexandre | A61H 3/061 |
| | | | 701/505 |
| 8,836,532 B2 | 9/2014 | Fish, Jr. et al. | |
| 8,836,580 B2 | 9/2014 | Mendelson | |
| 8,836,910 B2 | 9/2014 | Cashin et al. | |
| 8,902,303 B2 | 12/2014 | Na'Aman et al. | |
| 8,909,534 B1 | 12/2014 | Heath | |
| D721,673 S | 1/2015 | Park et al. | |
| 8,926,330 B2 | 1/2015 | Taghavi | |
| 8,930,458 B2 | 1/2015 | Lewis et al. | |
| 8,981,682 B2 | 3/2015 | Delson et al. | |
| 8,994,498 B2 | 3/2015 | Agrafioti | |
| D727,194 S | 4/2015 | Wilson | |
| 9,004,330 B2 | 4/2015 | White | |
| 9,025,016 B2 | 5/2015 | Wexler et al. | |
| 9,042,596 B2 | 5/2015 | Connor | |
| 9,053,094 B2 | 6/2015 | Yassa | |
| 9,076,450 B1 | 7/2015 | Sadek | |
| 9,081,079 B2 | 7/2015 | Chao et al. | |
| 9,081,385 B1* | 7/2015 | Ferguson | G06K 9/00798 |
| D736,741 S | 8/2015 | Katz | |
| 9,111,545 B2 | 8/2015 | Jadhav et al. | |
| D738,238 S | 9/2015 | Pede et al. | |
| 9,137,484 B2 | 9/2015 | DiFrancesco et al. | |
| 9,137,639 B2 | 9/2015 | Garin et al. | |
| 9,140,554 B2* | 9/2015 | Jerauld | G02B 27/017 |
| 9,148,191 B2 | 9/2015 | Teng et al. | |
| 9,158,378 B2 | 10/2015 | Hirukawa | |
| D742,535 S | 11/2015 | Wu | |
| D743,933 S | 11/2015 | Park et al. | |
| 9,185,489 B2 | 11/2015 | Gerber et al. | |
| 9,190,058 B2 | 11/2015 | Klein | |
| 9,104,806 B2 | 12/2015 | Stivoric et al. | |
| 9,230,430 B2 | 1/2016 | Civelli et al. | |
| 9,232,366 B1 | 1/2016 | Charlier et al. | |
| 9,267,801 B2 | 2/2016 | Gupta et al. | |
| 9,269,015 B2* | 2/2016 | Boncyk | G06F 17/30259 |
| 9,275,376 B2 | 3/2016 | Barraclough et al. | |
| 9,304,588 B2 | 4/2016 | Aldossary | |
| D756,958 S | 5/2016 | Lee et al. | |
| D756,959 S | 5/2016 | Lee et al. | |
| 9,335,175 B2 | 5/2016 | Zhang et al. | |
| 9,341,014 B2 | 5/2016 | Oshima et al. | |
| 9,355,547 B2 | 5/2016 | Stevens et al. | |
| 2001/0023387 A1* | 9/2001 | Rollo | G01C 21/20 |
| | | | 701/532 |
| 2002/0067282 A1 | 6/2002 | Moskowitz et al. | |
| 2002/0071277 A1* | 6/2002 | Starner | G06F 3/017 |
| | | | 362/276 |
| 2002/0075323 A1 | 6/2002 | O'Dell | |
| 2002/0173346 A1 | 11/2002 | Wang | |
| 2002/0178344 A1 | 11/2002 | Bourguet | |
| 2003/0026461 A1 | 2/2003 | Hunter | |
| 2003/0133008 A1 | 7/2003 | Stephenson | |
| 2003/0133085 A1 | 7/2003 | Tretiakoff | |
| 2003/0179133 A1* | 9/2003 | Pepin | A61H 3/061 |
| | | | 342/357.52 |
| 2004/0056907 A1 | 3/2004 | Sharma | |
| 2004/0232179 A1 | 11/2004 | Chauhan | |
| 2004/0267442 A1 | 12/2004 | Fehr et al. | |
| 2005/0020845 A1 | 9/2005 | Fink et al. | |
| 2005/0221260 A1 | 10/2005 | Kikuchi | |
| 2005/0259035 A1 | 11/2005 | Iwaki | |
| 2005/0283752 A1 | 12/2005 | Fruchter | |
| 2006/0004512 A1* | 1/2006 | Herbst | G01C 21/3638 |
| | | | 701/431 |
| 2006/0028550 A1* | 2/2006 | Palmer, Jr. | G08B 13/19619 |
| | | | 348/155 |
| 2006/0029256 A1 | 2/2006 | Miyoshi | |
| 2006/0129308 A1* | 6/2006 | Kates | A61H 3/061 |
| | | | 701/532 |
| 2006/0171704 A1 | 8/2006 | Bingle et al. | |
| 2006/0177086 A1 | 8/2006 | Rye et al. | |
| 2006/0184318 A1* | 8/2006 | Yoshimine | A61F 9/08 |
| | | | 701/433 |
| 2006/0292533 A1 | 12/2006 | Selod | |
| 2007/0001904 A1* | 1/2007 | Mendelson | G01C 21/206 |
| | | | 342/450 |
| 2007/0052672 A1 | 3/2007 | Ritter et al. | |
| 2007/0173688 A1 | 7/2007 | Kim | |
| 2007/0182812 A1 | 8/2007 | Ritchey | |
| 2007/0202865 A1 | 8/2007 | Moride | |
| 2007/0230786 A1 | 10/2007 | Foss | |
| 2007/0296572 A1* | 12/2007 | Fein | A61H 3/061 |
| | | | 340/539.13 |
| 2008/0024594 A1 | 1/2008 | Ritchey | |
| 2008/0068559 A1* | 3/2008 | Howell | G01C 22/006 |
| | | | 351/158 |
| 2008/0120029 A1 | 5/2008 | Zelek et al. | |
| 2008/0144854 A1 | 6/2008 | Abreu | |
| 2008/0145822 A1 | 6/2008 | Bucchieri | |
| 2008/0174676 A1 | 7/2008 | Squilla et al. | |
| 2008/0198222 A1 | 8/2008 | Gowda | |
| 2008/0198324 A1 | 8/2008 | Fuziak | |
| 2008/0208455 A1 | 8/2008 | Hartman | |
| 2008/0251110 A1 | 10/2008 | Pede | |
| 2008/0260210 A1 | 10/2008 | Kobeli | |
| 2009/0012788 A1 | 1/2009 | Gilbert | |
| 2009/0040215 A1 | 2/2009 | Afzulpurkar | |
| 2009/0058611 A1 | 3/2009 | Kawamura | |
| 2009/0106016 A1 | 4/2009 | Athsani | |
| 2009/0118652 A1 | 5/2009 | Carlucci | |
| 2009/0122161 A1 | 5/2009 | Bolkhovitinov | |
| 2009/0122648 A1 | 5/2009 | Mountain et al. | |
| 2009/0157302 A1 | 6/2009 | Tashev et al. | |
| 2009/0177437 A1 | 7/2009 | Roumeliotis | |
| 2009/0189974 A1 | 7/2009 | Deering | |
| 2009/0210596 A1 | 8/2009 | Furuya | |
| 2010/0041378 A1* | 2/2010 | Aceves | H04L 67/306 |
| | | | 455/414.1 |
| 2010/0080418 A1 | 4/2010 | Ito | |
| 2010/0109918 A1 | 5/2010 | Liebermann | |
| 2010/0110368 A1 | 5/2010 | Chaum | |
| 2010/0179452 A1 | 7/2010 | Srinivasan | |
| 2010/0182242 A1 | 7/2010 | Fields et al. | |
| 2010/0182450 A1* | 7/2010 | Kumar | H04N 1/00002 |
| | | | 348/229.1 |
| 2010/0198494 A1 | 8/2010 | Chao | |
| 2010/0199232 A1* | 8/2010 | Mistry | G06F 1/163 |
| | | | 715/863 |
| 2010/0241350 A1 | 9/2010 | Cioffi et al. | |
| 2010/0245585 A1 | 9/2010 | Fisher et al. | |
| 2010/0267276 A1 | 10/2010 | Wu | |
| 2010/0292917 A1* | 11/2010 | Emam | A61H 3/061 |
| | | | 701/533 |
| 2010/0298976 A1 | 11/2010 | Sugihara et al. | |
| 2010/0305845 A1* | 12/2010 | Alexandre | A61H 3/061 |
| | | | 701/533 |
| 2010/0308999 A1 | 12/2010 | Chornenky | |
| 2011/0066383 A1* | 3/2011 | Jangle | A61B 5/1116 |
| | | | 702/19 |
| 2011/0071830 A1 | 3/2011 | Kim | |
| 2011/0092249 A1 | 4/2011 | Evanitsky | |

(56) References Cited

U.S. PATENT DOCUMENTS

| | | |
|---|---|---|
| 2011/0124383 A1 | 5/2011 | Garra et al. |
| 2011/0125735 A1 | 5/2011 | Petrou |
| 2011/0181422 A1 | 7/2011 | Tran |
| 2011/0187640 A1 | 8/2011 | Jacobsen |
| 2011/0211760 A1* | 9/2011 | Boncyk ............ G06F 17/30259 |
| | | 382/190 |
| 2011/0216006 A1 | 9/2011 | Litschel |
| 2011/0221670 A1 | 9/2011 | King, III et al. |
| 2011/0234584 A1 | 9/2011 | Endo |
| 2011/0246064 A1 | 10/2011 | Nicholson |
| 2011/0260681 A1 | 10/2011 | Guccione |
| 2011/0307172 A1 | 12/2011 | Jadhav et al. |
| 2012/0016578 A1* | 1/2012 | Coppens ................. G01C 21/32 |
| | | 701/433 |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1* | 3/2012 | Osterhout ............ G02B 27/017 |
| | | 345/8 |
| 2012/0082962 A1 | 4/2012 | Schmidt |
| 2012/0085377 A1 | 4/2012 | Trout |
| 2012/0092161 A1 | 4/2012 | West |
| 2012/0092460 A1 | 4/2012 | Mahoney |
| 2012/0123784 A1 | 5/2012 | Baker et al. |
| 2012/0136666 A1 | 5/2012 | Corpier et al. |
| 2012/0143495 A1* | 6/2012 | Dantu ................. G01C 21/206 |
| | | 701/428 |
| 2012/0162423 A1 | 6/2012 | Xiao et al. |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1 | 8/2012 | Murphy |
| 2012/0214418 A1 | 8/2012 | Lee |
| 2012/0220234 A1 | 8/2012 | Abreu |
| 2012/0232430 A1 | 9/2012 | Boissy et al. |
| 2012/0249797 A1 | 10/2012 | Haddick et al. |
| 2012/0252483 A1 | 10/2012 | Farmer et al. |
| 2012/0316884 A1 | 12/2012 | Rozaieski et al. |
| 2012/0323485 A1 | 12/2012 | Mutoh |
| 2012/0327194 A1 | 12/2012 | Shiratori |
| 2013/0002452 A1 | 1/2013 | Lauren |
| 2013/0044005 A1 | 2/2013 | Foshee et al. |
| 2013/0046541 A1 | 2/2013 | Klein et al. |
| 2013/0066636 A1 | 3/2013 | Singhal |
| 2013/0079061 A1 | 3/2013 | Jadhav |
| 2013/0090133 A1 | 4/2013 | D'Jesus Bencci |
| 2013/0115578 A1 | 5/2013 | Shiina |
| 2013/0115579 A1 | 5/2013 | Taghavi |
| 2013/0116559 A1 | 5/2013 | Levin |
| 2013/0127980 A1 | 5/2013 | Haddick |
| 2013/0128051 A1 | 5/2013 | Velipasalar et al. |
| 2013/0131985 A1* | 5/2013 | Weiland ................. G01C 21/20 |
| | | 701/516 |
| 2013/0141576 A1 | 6/2013 | Lord et al. |
| 2013/0144629 A1 | 6/2013 | Johnston |
| 2013/0155474 A1 | 6/2013 | Roach et al. |
| 2013/0157230 A1 | 6/2013 | Morgan |
| 2013/0184982 A1 | 7/2013 | DeLuca et al. |
| 2013/0201344 A1 | 8/2013 | Sweet, III |
| 2013/0202274 A1 | 8/2013 | Chan |
| 2013/0204605 A1 | 8/2013 | Illgner-Fehns |
| 2013/0211718 A1* | 8/2013 | Yoo ..................... G01C 21/206 |
| | | 701/500 |
| 2013/0218456 A1 | 8/2013 | Zelek et al. |
| 2013/0228615 A1 | 9/2013 | Gates et al. |
| 2013/0229669 A1 | 9/2013 | Smits |
| 2013/0243250 A1 | 9/2013 | France |
| 2013/0245396 A1 | 9/2013 | Berman et al. |
| 2013/0250078 A1* | 9/2013 | Levy ....................... A61F 9/08 |
| | | 348/62 |
| 2013/0250233 A1 | 9/2013 | Blum et al. |
| 2013/0253818 A1* | 9/2013 | Sanders ............... G01C 21/206 |
| | | 701/419 |
| 2013/0265450 A1 | 10/2013 | Barnes, Jr. |
| 2013/0271584 A1* | 10/2013 | Wexler ............... G06K 9/00671 |
| | | 348/62 |
| 2013/0290909 A1 | 10/2013 | Gray |
| 2013/0307842 A1 | 11/2013 | Gringberg et al. |
| 2013/0311179 A1 | 11/2013 | Wagner |
| 2013/0328683 A1 | 12/2013 | Sitbon et al. |
| 2013/0332452 A1* | 12/2013 | Jarvis .................. G06F 17/3087 |
| | | 707/724 |
| 2014/0009561 A1 | 1/2014 | Sutherland |
| 2014/0031081 A1 | 1/2014 | Vossoughi |
| 2014/0031977 A1 | 1/2014 | Goldenberg et al. |
| 2014/0032596 A1 | 1/2014 | Fish et al. |
| 2014/0037149 A1* | 2/2014 | Zetune .................. G01C 21/20 |
| | | 382/114 |
| 2014/0055353 A1 | 2/2014 | Takahama |
| 2014/0071234 A1 | 3/2014 | Millett |
| 2014/0081631 A1 | 3/2014 | Zhu et al. |
| 2014/0085446 A1* | 3/2014 | Hicks ................... G09B 21/008 |
| | | 348/62 |
| 2014/0098018 A1 | 4/2014 | Kim et al. |
| 2014/0100773 A1 | 4/2014 | Cunningham et al. |
| 2014/0125700 A1 | 5/2014 | Ramachandran |
| 2014/0132388 A1 | 5/2014 | Alalawi |
| 2014/0133290 A1 | 5/2014 | Yokoo |
| 2014/0160250 A1 | 6/2014 | Pomerantz |
| 2014/0184384 A1 | 7/2014 | Zhu et al. |
| 2014/0184775 A1 | 7/2014 | Drake |
| 2014/0204245 A1 | 7/2014 | Wexler |
| 2014/0222023 A1 | 8/2014 | Kim et al. |
| 2014/0233859 A1 | 8/2014 | Cho |
| 2014/0236932 A1 | 8/2014 | Ikonomov |
| 2014/0249847 A1 | 9/2014 | Soon-Shiong |
| 2014/0251396 A1 | 9/2014 | Subhashrao et al. |
| 2014/0253702 A1* | 9/2014 | Wexler ..................... A61F 9/08 |
| | | 348/62 |
| 2014/0278070 A1 | 9/2014 | McGavran |
| 2014/0281943 A1 | 9/2014 | Prilepov |
| 2014/0287382 A1 | 9/2014 | Villar Cloquell |
| 2014/0309806 A1 | 10/2014 | Ricci |
| 2014/0313040 A1 | 10/2014 | Wright, Sr. |
| 2014/0335893 A1 | 11/2014 | Ronen |
| 2014/0343846 A1 | 11/2014 | Goldman et al. |
| 2014/0345956 A1 | 11/2014 | Kojina |
| 2014/0347265 A1 | 11/2014 | Aimone |
| 2014/0368412 A1 | 12/2014 | Jacobsen |
| 2014/0369541 A1* | 12/2014 | Miskin ..................... H04R 5/02 |
| | | 381/334 |
| 2014/0379251 A1 | 12/2014 | Tolstedt |
| 2014/0379336 A1 | 12/2014 | Bhatnager |
| 2015/0002808 A1 | 1/2015 | Rizzo, III et al. |
| 2015/0016035 A1 | 1/2015 | Tussy |
| 2015/0058237 A1 | 2/2015 | Bailey |
| 2015/0063661 A1 | 3/2015 | Lee |
| 2015/0081884 A1 | 3/2015 | Maguire |
| 2015/0099946 A1 | 4/2015 | Sahin |
| 2015/0109107 A1 | 4/2015 | Gomez et al. |
| 2015/0120186 A1 | 4/2015 | Heikes |
| 2015/0125831 A1 | 5/2015 | Chandrashekhar Nair et al. |
| 2015/0135310 A1 | 5/2015 | Lee |
| 2015/0141085 A1 | 5/2015 | Nuovo et al. |
| 2015/0142891 A1 | 5/2015 | Haque |
| 2015/0154643 A1 | 6/2015 | Artman et al. |
| 2015/0196101 A1 | 7/2015 | Dayal et al. |
| 2015/0198454 A1 | 7/2015 | Moore et al. |
| 2015/0198455 A1 | 7/2015 | Chen |
| 2015/0199566 A1 | 7/2015 | Moore et al. |
| 2015/0201181 A1 | 7/2015 | Moore et al. |
| 2015/0211858 A1* | 7/2015 | Jerauld ................ G02B 27/017 |
| | | 701/541 |
| 2015/0219757 A1 | 8/2015 | Boelter et al. |
| 2015/0223355 A1 | 8/2015 | Fleck |
| 2015/0256977 A1 | 9/2015 | Huang |
| 2015/0257555 A1 | 9/2015 | Wong |
| 2015/0260474 A1 | 9/2015 | Rublowsky |
| 2015/0262509 A1 | 9/2015 | Labbe |
| 2015/0279172 A1 | 10/2015 | Hyde |
| 2015/0324646 A1 | 11/2015 | Kimia |
| 2015/0330787 A1 | 11/2015 | Cioffi et al. |
| 2015/0336276 A1 | 11/2015 | Song |

(56) References Cited

U.S. PATENT DOCUMENTS

| | | |
|---|---|---|
| 2015/0338917 A1 | 11/2015 | Steiner et al. |
| 2015/0341591 A1 | 11/2015 | Kelder et al. |
| 2015/0346496 A1 | 12/2015 | Haddick et al. |
| 2015/0356345 A1 | 12/2015 | Velozo |
| 2015/0356837 A1* | 12/2015 | Pajestka ............ A61H 3/061 340/4.14 |
| 2015/0364943 A1 | 12/2015 | Vick |
| 2015/0367176 A1 | 12/2015 | Bejestan |
| 2015/0375395 A1 | 12/2015 | Kwon |
| 2016/0007158 A1 | 1/2016 | Venkatraman |
| 2016/0028917 A1 | 1/2016 | Wexler |
| 2016/0042228 A1 | 2/2016 | Opalka |
| 2016/0078289 A1 | 3/2016 | Michel |
| 2016/0098138 A1 | 4/2016 | Park |
| 2016/0156850 A1 | 6/2016 | Werblin et al. |
| 2016/0198319 A1 | 7/2016 | Huang |
| 2016/0350514 A1 | 12/2016 | Rajendran |

FOREIGN PATENT DOCUMENTS

| | | |
|---|---|---|
| CN | 201440733 | 4/2010 |
| CN | 101803988 | 8/2010 |
| CN | 101647745 | 1/2011 |
| CN | 102316193 | 1/2012 |
| CN | 102631280 | 8/2012 |
| CN | 202547659 | 11/2012 |
| CN | 202722736 | 2/2013 |
| CN | 102323819 | 6/2013 |
| CN | 103445920 | 12/2013 |
| DE | 102011080056 | 1/2013 |
| DE | 102012000587 | 7/2013 |
| DE | 102012202614 | 8/2013 |
| EP | 1174049 | 9/2004 |
| EP | 1721237 | 11/2006 |
| EP | 2368455 | 9/2011 |
| EP | 2371339 | 10/2011 |
| EP | 2127033 | 8/2012 |
| EP | 2581856 | 4/2013 |
| EP | 2751775 | 7/2016 |
| FR | 2885251 | 11/2006 |
| GB | 2401752 | 11/2004 |
| JP | 10069539 | 3/1998 |
| JP | 2001304908 | 10/2001 |
| JP | 201012529 | 1/2010 |
| JP | 2010182193 | 8/2010 |
| JP | 4727352 | 7/2011 |
| JP | 2013169611 | 9/2013 |
| KR | 100405636 | 11/2003 |
| KR | 20080080688 | 9/2008 |
| KR | 20120020212 | 3/2012 |
| KR | 1250929 | 4/2013 |
| WO | WO 1995004440 | 2/1995 |
| WO | WO 9949656 | 9/1999 |
| WO | WO 0010073 | 2/2000 |
| WO | WO 0038393 | 6/2000 |
| WO | WO 0179956 | 10/2001 |
| WO | WO 2004/076974 | 9/2004 |
| WO | WO 2006/028354 | 3/2006 |
| WO | WO 2006/045819 | 5/2006 |
| WO | WO 2007/031782 | 3/2007 |
| WO | WO 2008/008791 | 1/2008 |
| WO | WO 2008015375 | 2/2008 |
| WO | WO 2008/035993 | 3/2008 |
| WO | WO 2008/096134 | 8/2008 |
| WO | WO 2008127316 | 10/2008 |
| WO | WO 2010/062481 | 6/2010 |
| WO | WO 2010/109313 | 9/2010 |
| WO | WO 2012/040703 | 3/2012 |
| WO | WO 2012163675 | 12/2012 |
| WO | WO 2013/045557 | 4/2013 |
| WO | WO 2013/054257 | 4/2013 |
| WO | WO 2013/067539 | 5/2013 |
| WO | WO 2013/147704 | 10/2013 |
| WO | WO 2014104531 | 7/2014 |
| WO | WO 2014/138123 | 9/2014 |
| WO | WO 2014/172378 | 10/2014 |
| WO | WO 2015065418 | 5/2015 |
| WO | WO 2015092533 | 6/2015 |
| WO | WO 2015108882 | 7/2015 |
| WO | WO 2015127062 | 8/2015 |

OTHER PUBLICATIONS

Krishna et al.; "A Systematic Requirements Analysis and Development of an Assistive Device to Enhance the Social Interaction of People Who are Blind or Visually Impaired"; Workshop on Computer Vision Applications for the Visually Impaired; 12 pages; 2008.

The Nex Band; http://www.mightycast.com/#faq; May 19, 2015; 4 pages.

Cardonha et al.; "*A Crowdsourcing Platform for the Construction of Accessibility Maps*"; W4A'13 Proceedings of the 10th International Cross-Disciplinary Conference on Web Accessibility; Article No. 26; 2013; 5 pages.

Bujacz et al.; "*Remote Guidance for the Blind—A Proposed Teleassistance System and Navigation Trials*"; Conference on Human System Interactions; May 25-27, 2008; 6 pages.

Rodriguez et al; "*CrowdSight: Rapidly Prototyping Intelligent Visual Processing Apps*"; AAAI Human Computation Workshop (HCOMP); 2011; 6 pages.

Chaudary et al.; "*Alternative Navigation Assistance Aids for Visually Impaired Blind Persons*"; Proceedings of ICEAPVI; Feb. 12-14, 2015; 5 pages.

Garaj et al.; "*A System for Remote Sighted Guidance of Visually Impaired Pedestrians*"; The British Journal of Visual Impairment; vol. 21, No. 2, 2003; 9 pages.

Coughlan et al.; "*Crosswatch: A System for Providing Guidance to Visually Impaired Travelers at Traffic Intersections*"; Journal of Assistive Technologies 7.2; 2013; 17 pages.

Sudol et al.; "*LookTel—A Comprehensive Platform for Computer-Aided Visual Assistance*"; Computer Vision and Pattern Recognition Workshops (CVPRW), 2010 IEEE Computer Society Conference; Jun. 13-18, 2010; 8 pages.

Paladugu et al.; "*GoingEasy® with Crowdsourcing in the Web 2.0 World for Visually Impaired Users: Design and User Study*"; Arizona State University; 8 pages.

Kammoun et al.; "*Towards a Geographic Information System Facilitating Navigation of Visually Impaired Users*"; Springer Berlin Heidelberg; 2012; 8 pages.

Guy et al; "*CrossingGuard: Exploring Information Content in Navigation Aids for Visually Impaired Pedestrians*" Proceedings of the SIGCHI Conference on Human Factors in Computing Systems; May 5-10, 2012; 10 pages.

Zhang et al.; "*A Multiple Sensor-Based Shoe-Mounted User Interface Designed for Navigation Systems for the Visually Impaired*"; 5th Annual ICST Wireless Internet Conference (WICON); Mar. 1-3, 2010; 9 pages.

Shoval et al.; "*Navbelt and the Guidecane—Robotics-Based Obstacle-Avoidance Systems for the Blind and Visually Impaired*"; IEEE Robotics & Automation Magazine, vol. 10, Issue 1; Mar. 2003; 12 pages.

Dowling et al.; "*Intelligent Image Processing Constraints for Blind Mobility Facilitated Through Artificial Vision*"; 8th Australian and NewZealand Intelligent Information Systems Conference (ANZIIS); Dec. 10-12, 2003; 7 pages.

Heyes, Tony; "*The Sonic Pathfinder an Electronic Travel Aid for the Vision Impaired*"; http://members.optuszoo.com.au/aheyew40/pa/pf_blerf.html; Dec. 11, 2014; 7 pages.

Lee et al.; "*Adaptive Power Control of Obstacle Avoidance System Using Via Motion Context for Visually Impaired Person.*" International Conference on Cloud Computing and Social Networking (ICCCSN), Apr. 26-27, 2012 4 pages.

Wilson, Jeff, et al. "*Swan: System for Wearable Audio Navigation*"; 11th IEEE International Symposium on Wearable Computers; Oct. 11-13, 2007; 8 pages.

(56) References Cited

OTHER PUBLICATIONS

Borenstein et al.; "*The GuideCane—A Computerized Travel Aid for the Active Guidance of Blind Pedestrians*"; IEEE International Conference on Robotics and Automation; Apr. 21-27, 1997; 6 pages.
Bhatlawande et al.; "*Way-finding Electronic Bracelet for Visually Impaired People*"; IEEE Point-of-Care Healthcare Technologies (PHT), Jan. 16-18, 2013; 4 pages.
Blenkhorn et al.; "*An Ultrasonic Mobility Device with Minimal Audio Feedback*"; Center on Disabilities Technology and Persons with Disabilities Conference; Nov. 22, 1997; 5 pages.
Mann et al.; "*Blind Navigation with a Wearable Range Camera and Vibrotactile Helmet*"; 19$^{th}$ ACM International Conference on Multimedia; Nov. 28, 2011; 4 pages.
Shoval et al.; "*The Navbelt—A Computerized Travel Aid for the Blind*"; RESNA Conference, Jun. 12-17, 1993; 6 pages.
Kumar et al.; "*An Electronic Travel Aid for Navigation of Visually Impaired Persons*"; Communications Systems and Networks (COMSNETS), 2011 Third International Conference; Jan. 2011; 5 pages.
Pawar et al.; "*Multitasking Stick for Indicating Safe Path to Visually Disable People*"; IOSR Journal of Electronics and Communication Engineering (IOSR-JECE), vol. 10, Issue 3, Ver. II; May-Jun. 2015; 5 pages.
Pagliarini et al.; "*Robotic Art for Wearable*"; Proceedings of EUROSIAM: European Conference for the Applied Mathematics and Informatics 2010; 10 pages.
Greenberg et al.; "*Finding Your Way: A Curriculum for Teaching and Using the Braillenote with Sendero GPS 2011*"; California School for the Blind; 2011; 190 pages.
Helal et al.; "*Drishti: An Integrated Navigation System for Visually Impaired and Disabled*"; Fifth International Symposium on Wearable Computers; Oct. 8-9, 2001; 8 pages.
Parkes, Don; "*Audio Tactile Systems for Designing and Learning Complex Environments as a Vision Impaired Person: Static and Dynamic Spatial Information Access*"; EdTech-94 Proceedings; 1994; 8 pages.
Zeng et al.; "*Audio-Haptic Browser for a Geographical Information System*"; ICCHP 2010, Part II, LNCS 6180; Jul. 14-16, 2010; 8 pages.
AlZuhair et al.; "*NFC Based Applications for Visually Impaired People—A Review*"; IEEE International Conference on Multimedia and Expo Workshops (ICMEW), Jul. 14, 2014; 7 pages.
Graf, Christian; "*Verbally Annotated Tactile Maps—Challenges and Approaches*"; Spatial Cognition VII, vol. 6222; Aug. 15-19, 2010; 16 pages.
Hamid, Nazatul Naquiah Abd; "*Facilitating Route Learning Using Interactive Audio-Tactile Maps for Blind and Visually Impaired People*"; CHI 2013 Extended Abstracts; Apr. 27, 2013; 6 pages.
Ramya, et al.; "*Voice Assisted Embedded Navigation System for the Visually Impaired*"; International Journal of Computer Applications; vol. 64, No. 13, Feb. 2013; 7 pages.
Caperna et al.; "*A Navigation and Object Location Device for the Blind*"; Tech. rep. University of Maryland College Park; May 2009; 129 pages.
Burbey et al.; "*Human Information Processing with the Personal Memex*"; ISE 5604 Fall 2005; Dec. 6, 2005; 88 pages.
Ghiani, et al.; "*Vibrotactile Feedback to Aid Blind Users of Mobile Guides*"; Journal of Visual Languages and Computing 20; 2009; 13 pages.
Guerrero et al.; "*An Indoor Navigation System for the Visually Impaired*"; Sensors vol. 12, Issue 6; Jun. 13, 2012; 23 pages.
Nordin et al.; "*Indoor Navigation and Localization for Visually Impaired People Using Weighted Topological Map*"; Journal of Computer Science vol. 5, Issue 11; 2009; 7 pages.
Hesch et al.; "*Design and Analysis of a Portable Indoor Localization Aid for the Visually Impaired*"; International Journal of Robotics Research; vol. 29; Issue 11; Sep. 2010; 15 pgs.
Joseph et al.; "*Visual Semantic Parameterization—To Enhance Blind User Perception for Indoor Navigation*"; Multimedia and Expo Workshops (ICMEW), 2013 IEEE International Conference; Jul. 15, 2013; 7 pages.
Katz et al; "*NAVIG: Augmented Reality Guidance System for the Visually Impaired*"; Virtual Reality (2012) vol. 16; 2012; 17 pages.
Rodríguez et al.; "*Assisting the Visually Impaired: Obstacle Detection and Warning System by Acoustic Feedback*"; Sensors 2012; vol. 12; 21 pages.
Treuillet; "*Outdoor/Indoor Vision-Based Localization for Blind Pedestrian Navigation Assistance*"; WSPC/Instruction File; May 23, 2010; 16 pages.
Ran et al.; "*Drishti: An Integrated Indoor/Outdoor Blind Navigation System and Service*"; Proceeding PERCOM '04 Proceedings of the Second IEEE International Conference on Pervasive Computing and Communications (PerCom'04); 2004; 9 pages.
Bigham et al.; "*VizWiz: Nearly Real-Time Answers to Visual Questions*" Proceedings of the 23nd annual ACM symposium on User interface software and technology; 2010; 2 pages.
Lee et al.; "*A Walking Guidance System for the Visually Impaired*"; International Journal of Pattern Recognition and Artificial Intelligence; vol. 22; No. 6; 2008; 16 pages.
Ward et al.; "*Visual Experiences in the Blind Induced by an Auditory Sensory Substitution Device*"; Journal of Consciousness and Cognition; Oct. 2009; 30 pages.
Merino-Garcia, et al.; "*A Head-Mounted Device for Recognizing Text in Natural Sciences*"; CBDAR'11 Proceedings of the 4$^{th}$ International Conference on Camera-Based Document Analysis and Recognition; Sep. 22, 2011; 7 pages.
Yi, Chucai; "*Assistive Text Reading from Complex Background for Blind Persons*"; CBDAR'11 Proceedings of the 4$^{th}$ International Conference on Camera-Based Document Analysis and Recognition; Sep. 22, 2011; 7 pages.
Yang, et al.; "*Towards Automatic Sign Translation*"; The Interactive Systems Lab, Carnegie Mellon University; 2001; 5 pages.
Meijer, Dr. Peter B.L.; "*Mobile OCR, Face and Object Recognition for the Blind*"; The vOICe, www.seeingwithsound.com/ocr.htm; Apr. 18, 2014; 7 pages.
OMRON; Optical Character Recognition Sensor User's Manual; 2012; 450 pages.
Park, Sungwoo; "*Voice Stick*"; www.yankodesign.com/2008/08/21/voice-stick; Aug. 21, 2008; 4 pages.
OrCam; www.orcam.com; Jul. 22, 2014; 3 pages.
Rentschler et al.; "*Intelligent Walkers for the Elderly: Performance and Safety Testing of VA-PAMAID Robotic Walker*"; Department of Veterans Affairs Journal of Rehabilitation Research and Development; vol. 40, No. 5; Sep./Oct. 2013; 9pages.
Science Daily; "*Intelligent Walker Designed to Assist the Elderly and People Undergoing Medical Rehabilitation*"; http://www.sciencedaily.com/releases/2008/11/081107072015.htm; Jul. 22, 2014; 4 pages.
Glover et al.; "*A Robotically-Augmented Walker for Older Adults*"; Carnegie Mellon University, School of Computer Science; Aug. 1, 2003; 13 pages.
Eccles, Lisa; "*Smart Walker Detects Obstacles*"; Electronic Design; http://electronicdesign.com/electromechanical/smart-walker-detects-obstacles; Aug. 20, 2001; 2 pages.
Graft, Birgit; "*An Adaptive Guidance System for Robotic Walking Aids*"; Journal of Computing and Information Technology—CIT 17; 2009; 12 pages.
Frizera et al.; "*The Smart Walkers as Geriatric Assistive Device. The SIMBIOSIS Purpose*"; Gerontechnology, vol. 7, No. 2; Jan. 30, 2008; 6 pages.
Rodriquez-Losada et al.; "*Guido, The Robotic Smart Walker for the Frail Visually Impaired*"; IEEE International Conference on Robotics and Automation (ICRA); Apr. 18-22, 2005; 15 pages.
Kayama et al.; "*Outdoor Environment Recognition and Semi-Autonomous Mobile Vehicle for Supporting Mobility of the Elderly and Disabled People*"; National Institute of Information and Communications Technology, vol. 54, No. 3; Aug. 2007; 11 pages.
Kalra et al.; "*A Braille Writing Tutor to Combat Illiteracy in Developing Communities*"; Carnegie Mellon University Research Showcase, Robotics Institute; 2007; 10 pages.

(56) References Cited

OTHER PUBLICATIONS

Blaze Engineering; "*Visually Impaired Resource Guide: Assistive Technology for Students who use Braille*"; Braille 'n Speak Manual; http://www.blaize.com; Nov. 17, 2014; 5 pages.
AppleVis; *An Introduction to Braille Screen Input On iOS 8*; http://www.applevis.com/guides/braille-ios/introduction-braille-screen-input-ios-8, Nov. 16, 2014; 7 pages.
Dias et al.; "*Enhancing an Automated Braille Writing Tutor*"; IEEE/RSJ International Conference on Intelligent Robots and Systems; Oct. 11-15, 2009; 7 pages.
D'Andrea, Frances Mary; "*More than a Perkins Brailler: A Review of the Mountbatten Brailler, Part 1*"; AFB AccessWorld Magazine; vol. 6, No. 1, Jan. 2005; 9 pages.
Trinh et al.; "*Phoneme-based Predictive Text Entry Interface*"; Proceedings of the 16th International ACM SIGACCESS Conference on Computers & Accessibility; Oct. 2014; 2 pgs.
Merri et al.; "*The Instruments for a Blind Teacher of English: The challenge of the board*"; European Journal of Psychology of Education, vol. 20, No. 4 (Dec. 2005), 15 pages.
Kirinic et al.; "*Computers in Education of Children with Intellectual and Related Developmental Disorders*"; International Journal of Emerging Technologies in Learning, vol. 5, 2010, 5 pages.
Campos et al.; "Design *and Evaluation of a Spoken-Feedback Keyboard*"; Department of Information Systems and Computer Science, INESC-ID/IST/Universidade Tecnica de Lisboa, Jul. 2004; 6 pages.
Ebay; Matin (Made in Korea) Neoprene Canon DSLR Camera Curved Neck Strap #6782; http://www.ebay.com/itm/Matin-Made-in-Korea-Neoprene-Canon-DSLR-Camera-Curved-Neck-Strap-6782-/281608526018?hash=item41912d18c2:g:~pMAAOSwe-FU6zDa ; 4 pages.
Newegg; Motorola S10-HD Bluetooth Stereo Headphone w/ Comfortable Sweat Proof Design; http://www.newegg.com/Product/Product.aspx?Item=9SIA0NW2G39901&Tpk=9sia0nw2g39901; 4 pages.
Newegg; Motorola Behind the Neck Stereo Bluetooth Headphone Black/Red Bulk (S9)—OEM; http://www.newegg.com/Product/Product.aspx?Item—N82E16875982212&Tpk=n82e16875982212; 3 pages.
Bharathi et al.; "Effective Navigation for Visually Impaired by Wearable Obstacle Avoidance System;" *2012 International Conference on Computing, Electronics and Electrical Technologies (ICCEET)*; pp. 956-958; 2012.
Pawar et al.; "Review Paper on Multitasking Stick for Guiding Safe Path for Visually Disable People;" *IJPRET*; vol. 3, No. 9; pp. 929-936; 2015.
Ram et al.; "The People Sensor: A Mobility Aid for the Visually Impaired;" 2012 16$^{th}$ International Symposium on Wearable Computers; pp. 166-167; 2012.
Singhal; "The Development of an Intelligent Aid for Blind and Old People;" *Emerging Trends and Applications in Computer Science (ICETACS)*, 2013 1$^{st}$ International Conference; pp. 182-185; Sep. 13, 2013.
Aggarwal et al.; "All-in-One Companion for Visually Impaired;" *International Journal of Computer Applications*; vol. 79, No. 14; pp. 37-40; Oct. 2013.
"Light Detector" *EveryWare Technologies*; 2 pages; Jun. 18, 2016.
Yabu et al.; "Development of a Wearable Haptic Tactile Interface as an Aid for the Hearing and/or Visually Impaired;" *NTUT Education of Disabilities*; vol. 13; pp. 5-12; 2015.
Mau et al.; "BlindAid: An Electronic Travel Aid for the Blind;" *The Robotics Institute Carnegie Mellon University*; 27 pages; May 2008.
Shidujaman et al.; "Design and navigation Prospective for Wireless Power Transmission Robot;" IEEE; Jun. 2015.
Wu et al. "Fusing Multi-Modal Features for Gesture Recognition", Proceedings of the 15$^{th}$ ACM on International Conference on Multimodal Interaction, Dec. 9, 2013, ACM, pp. 453-459.
Pitsikalis et al. "Multimodal Gesture Recognition via Multiple Hypotheses Rescoring", Journal of Machine Learning Research, Feb. 2015, pp. 255-284.
Shen et al. "Walkie-Markie: Indoor Pathway Mapping Made Easy" 10$^{th}$ USENIX Symposium on Networked Systems Design and Implementation (NSDI'13); pp. 85-98, 2013.
Tu et al. "Crowdsourced Routing II D2.6" 34 pages; 2012.
De Choudhury et al. "Automatic Construction of Travel Itineraries Using Social Breadcrumbs" pp. 35-44; Jun. 2010.
Zhang, Shanjun; Yoshino, Kazuyoshi; A Braille ReCognition System by the Mobile Phone with Embedded Camera; 2007; IEEE.
Diallo, Amadou; Sep. 18, 2014; Apple iOS8: Top New Features, Forbes Magazine.
N. Kalar, T. Lawers, D. Dewey, T. Stepleton, M.B. Dias; Iterative Design of a Braille Writing Tutor to Combat Illiteracy; Aug. 30, 2007; IEEE.

\* cited by examiner

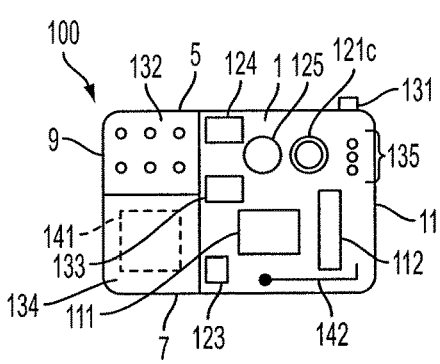
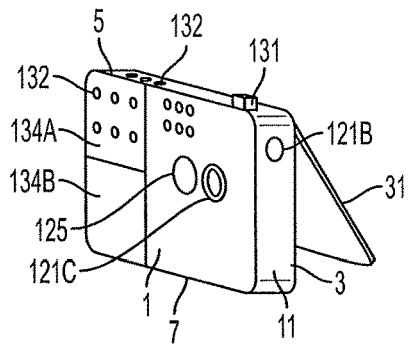
FIG. 1I          FIG. 1J
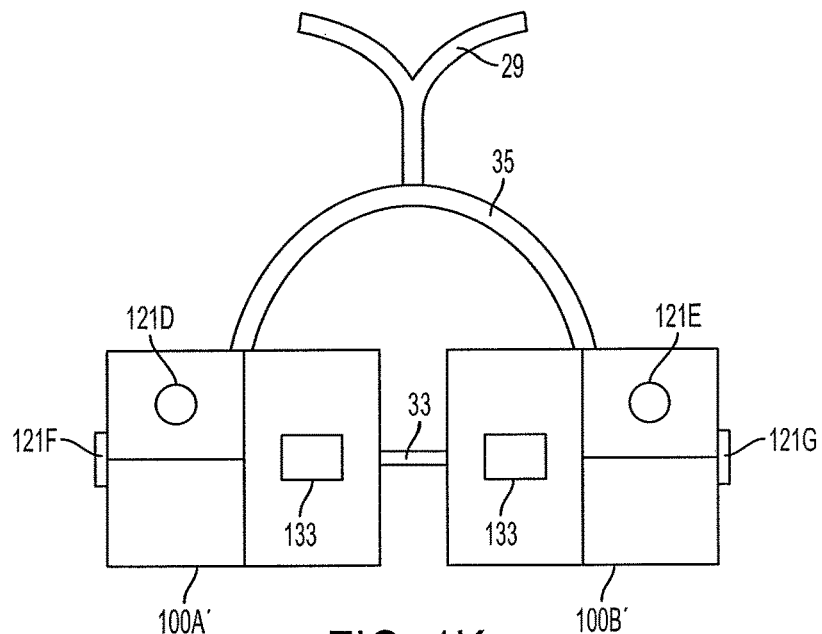
FIG. 1K
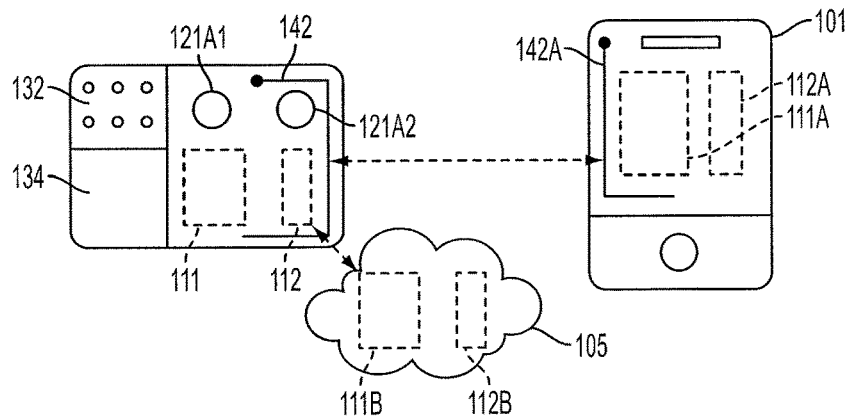
FIG. 1L

WEARABLE CLIP FOR PROVIDING SOCIAL AND ENVIRONMENTAL AWARENESS

BACKGROUND

Field

The present disclosure relates to a wearable device. More specifically, the present disclosure relates to a clip which provides haptic and audio feedback based on various sensors and user input.

Description of the Related Art

Wearable devices currently exist in the art which have an input, such as a camera, an output, such as a speaker, and a processor. However, these devices are not optimized to assist users having certain physical disabilities. For example, they do not proactively collect data regarding the user and the environment of the user to achieve an understanding of the user and the user's environment. These devices also do not proactively provide helpful information or assistance to the user. In other words, the devices known in the art do not proactively aid the user in navigation, environmental awareness, and social interactions.

Thus, there is a need for a wearable device that actively collects data about the user and the his/her surrounding information, draws helpful inferences based on the collected data, and actively aids the user in navigation, environmental awareness, and social interactions.

SUMMARY

An intelligent clip to be worn by a user is described. The intelligent clip includes an inertial measurement unit (IMU) sensor coupled to the intelligent clip. The IMU is configured to detect inertial measurement data corresponding to a positioning, velocity, or acceleration of the intelligent clip. The intelligent clip also includes a global positioning system (GPS) unit coupled to the intelligent clip. The GPS unit is configured to detect location data corresponding to a location of the intelligent clip. The intelligent clip also includes at least one camera coupled to the intelligent clip. The at least one camera is configured to detect image data corresponding to a surrounding environment of the intelligent clip. The intelligent clip also includes a memory configured to store object data regarding previously determined objects and previously determined user data associated with the user. The intelligent clip also includes a first processor connected to the IMU, the GPS unit and the at least one camera. The first processor is adapted to recognize an object in the surrounding environment by analyzing the image data based on the stored object data and at least one of the inertial measurement data or the location data. The first processor is also adapted to determine a desirable event or action based on the recognized object, the previously determined user data, and a current time or day. The first processor is also adapted to determine a destination based on the determined desirable event or action. The first processor is also adapted to determine a navigation path for navigating the intelligent clip to the destination based on the determined destination, the image data, and at least one of the inertial measurement data or the location data. The first processor is also adapted to determine output data based on the determined navigation path. The intelligent clip also includes a speaker that is configured to provide audio information to the user based on at least one of the recognized object, determined desirable event or action, or navigation path.

Also described is a method for providing continuous social and environmental awareness by an intelligent clip. The method includes detecting, via a camera, a GPS unit or an IMU, inertial measurement data corresponding to a positioning, velocity, or acceleration of the intelligent clip. Also detected may be location data corresponding to a location of the intelligent clip or image data corresponding to a surrounding environment of the intelligent clip. The method also includes storing, in a memory, object data regarding previously determined objects and previously determined user data regarding a user. The method also includes recognizing, by a processor, an object in the surrounding environment. The object is recognized by analyzing the image data based on the stored object data and at least one of the inertial measurement data or the location data. The method also includes determining, by the processor, a desirable event or action based on the recognized object, the previously determined user data, and a current time or day. The processor may also determine a destination based on the determined desirable event or action. The processor may also determine a navigation path for navigating the intelligent clip to the destination based on the determined destination, the image data, and at least one of the inertial measurement data or the location data. The processor may also determine output data based on the determined navigation path. The method also includes providing, via a speaker or a vibration unit, audio or haptic information to the user. The information is provided based on at least one of the recognized object, the determined desirable event or action, or the navigation path.

Also described is an intelligent clip to be worn by a user. The intelligent clip includes a front, a back, a first side and a second side. The intelligent clip also includes an inertial measurement unit (IMU) sensor coupled to the intelligent clip. The IMU sensor is configured to detect inertial measurement data corresponding to a positioning, velocity, or acceleration of the intelligent clip. The intelligent clip also includes a global positioning system (GPS) unit coupled to the intelligent clip. The GPS unit is configured to detect location data corresponding to a location of the intelligent clip. The intelligent clip also includes a first camera positioned on the front of the intelligent clip and coupled to the intelligent clip. The first camera is configured to detect a first image data corresponding to a surrounding environment of the intelligent clip. The intelligent clip also includes a second camera positioned on either the first side of the intelligent clip or the second side of the intelligent clip and coupled to the intelligent clip. The second camera is configured to detect a second image data corresponding to the surrounding environment of the intelligent clip. The intelligent clip also includes a memory that is configured to store object data regarding previously determined objects. The memory may also store previously determined user data associated with the user. The intelligent clip also includes a processor connected to the IMU, the GPS unit, the first camera and the second camera. The processor is configured to recognize an object in the surrounding environment by analyzing the first image data and the second image data. The object is analyzed based on the stored object data and at least one of the inertial measurement data or the location data. The processor is also configured to determine a desirable event or action based on the recognized object, the previously determined user data, and a current time or day. The processor is also configured to determine a destination based on the determined desirable event or action. The processor is also configured to determine a navigation path for navigating the intelligent clip to the destination. The navigation path is based on the determined destination, the first image data, the second image data, and at least one of the inertial measurement data or the location data. The processor is also configured to determine output data based on the determined navigation path. The intelligent clip also includes a speaker configured to provide audio information to the user based on at least one of the recognized object, determined desirable event or action, or navigation path.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 1I illustrates a clip including some of the internal components according to an embodiment of the present invention;

FIG. 1J illustrates a clip having two buttons, two cameras and a sensor according to an embodiment of the present invention;

FIG. 1K illustrates two clips attached together by a physical connector and an electrical connector according to an embodiment of the present invention;

FIG. 1L illustrates a clip wirelessly connected to a wireless smart device and a cloud according to an embodiment of the present invention;

DETAILED DESCRIPTION

Apparatus, systems and methods that implement the implementations of the various features of the present application will now be described with reference to the drawings. The drawings and the associated descriptions are provided to illustrate some implementations of the present application and not to limit the scope of the present application. Throughout the drawings, reference numbers are re-used to indicate correspondence between referenced elements. For purposes of this disclosure, when mentioned, a connection may be a wired connection, a wireless connection, or a mix of wired and wireless connections. A connection also provides for communications propagating both ways along the connection. For example, a connection with a processor provides for the processor to receive communications and to transmit communications over the connection.

The wearable intelligent clip for providing social and environmental awareness provides several advantages over the current state of the art. The selection and placement of inputs on the wearable clip has been optimized. This provides the advantage of more accurate output being provided to the user. Also, the selection and placement of outputs has been optimized in order to provide information to the user in a more integrated and easier to understand fashion.

Additionally, the clip can continuously observe the user and his surroundings as well as store preference information, such as calendars and schedules, and access remote databases. Based on this observed data, the clip can proactively provide feedback to the user. Proactive functions can, for example, remind a user where he should be, inform the user of the name of a person he is speaking with, warn the user when the user may be approaching a hazardous situation, etc. This is advantageous over the state of the art because the user of the clip can be provided information without having to request it. This can result in the user being provided feedback that he may not have known he could receive. Additionally, it allows the user to receive feedback without wasting extra time or effort. In some circumstances, this proactive feedback can prevent potential embarrassment for the user (for example, he need not ask the clip the name of a person he is speaking with).

The on board stereo camera of the clip (when included) provides useful depth and distance information to the device. The combination of a camera on the front of the clip as well as a camera on the side of the clip provides a larger total field of view for the clip. The clip can then use this information to better determine social and environmental elements around the user.

The combination of the global positioning system (GPS), the inertial measurement unit (IMU) and the camera is advantageous as the combination can provide more accurate feedback to the user.

Figure 1A:
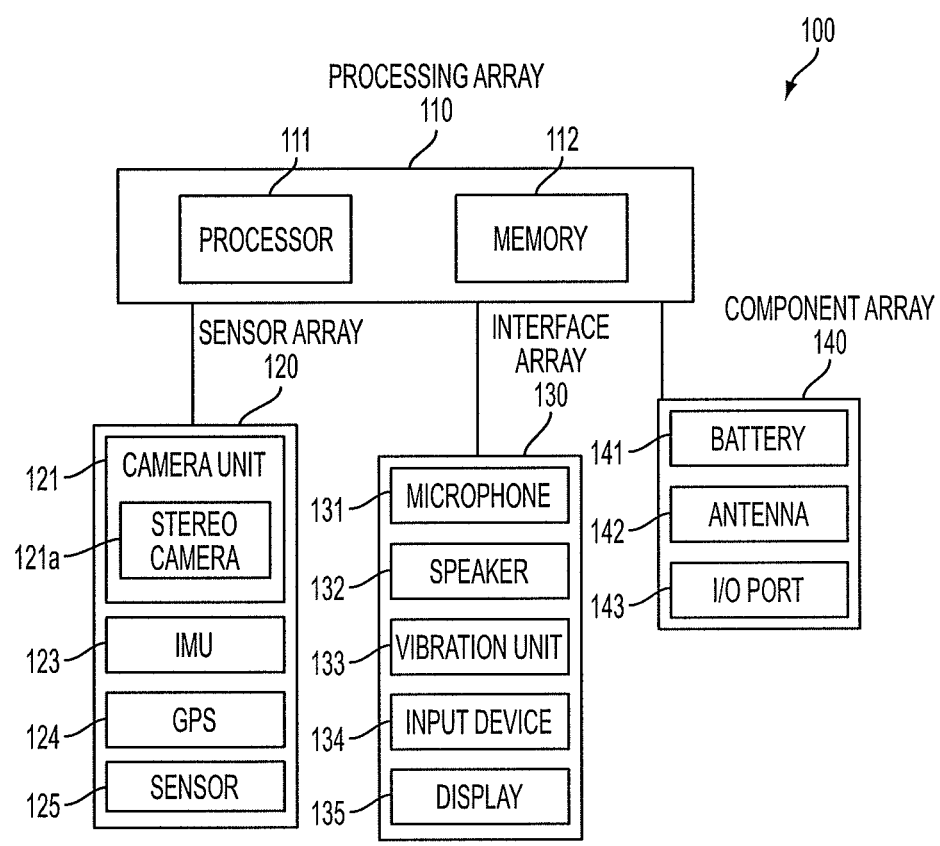
FIG. 1A is a block diagram of a clip according to an embodiment of the present invention.

FIG. 1A is a block diagram of an intelligent clip (clip) 100 according to an embodiment of the present invention. In one embodiment, the clip 100 includes an onboard processing array 110, which communicates with a sensor array 120, an interface array 130 and a component array 140.

The arrays 110, 120, 130 and 140 are exemplary groupings to visually organize the components of the clip 100 in the block diagram of FIG. 1A and are not limiting or necessarily representative of any physical groupings. In addition, certain embodiments may have more or less components illustrated in FIG. 1A. The embodiments shown in FIGS. 1B-1K are examples physical designs of the clip 100. The components can be arranged differently based on design concerns. Not all features and components described herein are shown in FIGS. 1B-1K. Furthermore, the structure in FIGS. 1B-1K may be modified or other embodiments of the clip 100 can be designed to include additional features described herein.

The shape of the clip 100 can be designed based on comfort to the user, weight of the clip 100, ability for the clip 100 to remain attached to the user and for placement of components. Some examples are illustrated in FIGS. 1B-1K. The design may also be optimized by utilizing light-weight and small components. Light-weight components allow the clip 100 to remain light and comfortable for the user. Small components allow the clip 100 to remain small, so that they do not feel bulky to the user. Connectivity to another device to perform certain functions is beneficial as it allows the clip 100 to remain light (as less bulky hardware is required on board) while still providing higher power computations.

The onboard processing array 110 includes a processor 111 and a memory 112. The processor 111 may be a computer processor such as an ARM processor, DSP processor, distributed processor, or other form of central processing. The memory 112 may be a RAM or other volatile or nonvolatile memory used by the processor 111. The memory 112 may be a non-transitory memory or a data storage device, such as a hard disk drive, a solid state disk drive, a hybrid disk drive, or other appropriate data storage, and may further store machine-readable instructions, which may be loaded and executed by the processor 111.

The sensor array 120 includes a camera unit (camera) 121, an inertial measurement unit (IMU) 123, a global positioning system (GPS) 124, and a sensor 125. In one embodiment, the camera 121 may include a pair of stereo cameras 121A having at least two cameras offset by a stereo distance and/or a non-stereo camera 121. The stereo distance may be optimized for the two cameras. When discussed herein, camera 121 may refer to any pair of stereo cameras 121A and/or any non-stereo camera 121.

Stereo cameras provide depth information in both indoor and outdoor environments. The pair of stereo cameras 121A may face forward, in front of a user, to establish a field of view (FOV). The pair of stereo cameras 121A may have, for example, an FOV of around 90 degrees. The pair of stereo cameras 121A provides 3D information such as depth in front of the user. Additional cameras, such as a wide angle lens camera, which may be placed to the sides of the pair of stereo cameras 121A or used in place of the pair of stereo cameras 121A, may increase the FOV to, for example, around 120 degrees. Although the cameras 121 may be monocular, they can provide simple recognition, even without depth or distance information. For example, the cameras 121 can detect moving objects in the user's periphery. The stereo cameras 121A and/or the cameras 121 continuously recognize objects in the environment. Working in conjunction with the other sensors in the sensor array 120, the clip 100 provides the user with guidance and navigation commands by way of audio and haptic feedback.

For example, instead of or in addition to a pair of stereo cameras 121A, the clip 100 may include a wide-lens camera to increase the field of view. Although additional cameras may be monocular, they can provide simple recognition, even without depth or distance information. For example, the cameras can detect moving objects in the user's periphery. The stereo cameras 121A and the additional cameras continuously recognize objects in the environment. Working in conjunction with the camera(s) 121 and the other sensors in the sensor array 120, the clip 100 provides the user with guidance and navigation commands by way of audio and haptic feedback.

In some embodiments, the camera 121 may include a plurality of cameras. Adding multiple cameras might be beneficial as it may capture a view that may be obstructed by the device itself if a single camera is utilized. For example, a single camera's view may be blocked by a physical component of the clip 100. To obtain a greater field of view, cameras may be positioned at different vantage points. The multiple images can be fit together via image processing to capture a broader spectrum of the surrounding environment.

Many different embodiments can be imagined for placement of different cameras 121 on the clip 100. For example, a wide lens camera 121 may be positioned on the front of the clip 100 to detect data in a forward direction and another camera 121 may be placed on a side of the clip 100 to detect data is a sideways direction. A third camera 121 may be positioned on the other side of the clip 100 to detect data in the other sideways direction. These cameras 121 may capture additional image data to be used at a later time, such as by filling in data correlating to a physical layout of an area, viewing a map to one side of the user, etc. This data may also be useful for real-time applications, such as identification of a friend (if a friend is standing to the right or the left of the user), danger avoidance (if a car is moving towards the user from the right or the left), etc.

The clip 100 may assist the user in environmental awareness, navigation, social interactions, and obstacle avoidance through real-time feedback. The clip 100 is capable of recognizing objects around the user, in order to alert the user. For example, the clip 100 may be used by a blind person to aid in environmental awareness and navigate safely around obstacles, to read text to a user and/or for object recognition and alerting. The clip 100 provides the user audio and haptic feedback through the speaker 132 and the vibration unit 133, based upon camera input from the sensor array 120 (and input from the interface array 130, such as audio input from a microphone 131 and/or user input from the input device 134).

In certain embodiments, the clip 100 is designed to accommodate blind or partially blind users. In such embodiments, a low-light viewing or night-vision camera (e.g., infrared camera) may also be utilized. For example, a camera may be directed to normal lighting and another directed to night vision. For example, a blind user may be more likely to turn off the lights because he/she does not depend on the lighting. The clip 100 would still function properly by processing images of the night-vision camera. The image processed may be limited in night-vision. For example, facial recognition may not be feasible, but the presence of another person can be detected. As a result, helpful information can be given to the user.

The clip 100 may include an infrared camera in combination with another camera or cameras 121. For example, a wide angle camera 121 and/or a stereo camera 121A may be utilized for image detection for normal lighting situations and an infrared camera may be utilized for image detection for darker situations.

Because the clip 100 may be used for environmental awareness and detection, other light spectrums may be useful. The visible light spectrum allows humans to detect certain details that other light spectrums may not provide. However, other light spectrums may provide certain details that human visible light spectrum cannot provide. Details of certain objects may not be easily detected by the visible light spectrum during a cloudy or foggy day. Another spectrum of light may provide better details of objects during certain conditions. These spectrums may include extreme ultraviolet, near infrared, mid infrared, far infrared, etc. For maximum efficiency and object detection, different cameras 121 may be provided for detecting various light spectrum data. In some embodiments, a single camera 121 is provided that detects a spectrum of light other than the visible light spectrum.

In addition to uses for blind or partially blind users, the clip 100 may be applied to other uses of daily life. For example, it can be used to record life events (i.e. weddings, sporting events, etc.). It may also be utilized to aid peace officers, such as by recording arrests, traffic stops, etc. It may also be used by workers, for example, by visually identifying hazardous items in the environment and alerting the worker.

The IMU 123 may comprise one or more of an accelerometer, a gyroscope, and/or a magnetometer. The GPS 124 may be one or more GPS units. The IMU 123 and/or the GPS 124 may be utilized to determine the location and/or positioning of the user and/or the clip 100. The IMU 123 may provide data to the clip 100 so that the clip 100 can determine to run a certain algorithm. In some embodiments, the clip 100 may be used to help a blind user read a book, magazine, newspaper, etc. If the IMU 123, possibly in combination with the camera(s) 121, provides data to the processor 111 that the user is directing the clip towards text, then the clip 100 may determine that the user would like for the text to be read aloud.

The GPS 124 provides location information, which works with the inertial guidance information, including velocity and orientation information, provided by the IMU 123 to help direct the user. The memory 112 may store, for example, map information or data to help locate and provide navigation commands to the user. The map data may be preloaded, downloaded wirelessly through the antenna 142 or through a wired connection to the I/O port 143, or may be visually determined, such as by capturing a building map posted near a building's entrance, or built from previous encounters and recordings. The map data may be abstract, such as a network diagram with edges, or a series of coordinates with features. The map data may contain points of interest to the user, and as the user walks, the stereo cameras 121A and/or cameras 121 may recognize additional points of interest and update the map data as they enter into the field of view of the camera 121.

For example, the user may give a voice command, "Take me to building X in Y campus." The clip 100 may then download a relevant map if not already stored, or may navigate based on perceived images from the stereo cameras 121A and the cameras 121. As the user follows the navigation commands from the clip 100, the user may walk by a coffee shop in the morning, and the clip 100 would recognize the coffee shop and the time of day, along with the user's habits, and appropriately alert the user. The clip 100 may verbally alert the user through the speakers 132. The user may use the input device 134 to adjust settings, which for example may control the types of alerts, what details to announce, and other parameters which may relate to object recognition or alert settings. The user may turn on or off certain features as needed. The clip 100 may learn the adjusted settings of the user and apply the preferred settings to other features.

When navigating indoors, the GPS 124 may not provide enough information to a blind user to navigate around obstacles and reach desired locations or features. The clip 100 may recognize, for instance, stairs, exits, and restrooms and appropriately store them in the memory 112.

The sensor 125 may be one or more sensors which provide further information about the environment in conjunction with the rest of the sensor array 120. The sensor 125 may be, for example, one or more of a temperature sensor, an air pressure sensor, a moisture or humidity sensor, a gas detector or other chemical sensor, a sound sensor, a pH sensor, a smoke detector, a metal detector, an actinometer, an altimeter, a depth gauge, a compass, a radiation sensor, a motion detector, or other sensor.

The interface array 130 includes the microphone 131, a speaker 132, a vibration unit 133, an input device 134, and a display 135. The microphone 131 may be a microphone or other device capable of receiving sounds, such as voice activation/commands or other voice actions from the user, and may be integrated with or external to the clip 100. The microphone 131 may also provide input as part of the sensor array 120.

The microphone 131 may provide additional environmental data, such as sounds of moving cars or other possible hazards. The microphone 131 may work in conjunction with the speaker 132, and may be placed away from the speaker 132 to prevent interference. The microphone 131 may alternatively work in conjunction with an attached audio device, such as bone conduction devices, to provide the user with audio feedback without broadcasting the audio feedback.

The speaker 132 may be one or more speakers or other devices capable of producing sounds and/or vibrations. In some embodiments, a pair of headphones is provided. The I/O port may be adapted to port audio data to and from the headphones. Wireless headphones may also be provided that receive audio data via the antenna 142.

The vibration unit 133 may be a vibration motor or actuator capable of providing haptic and tactile output. In certain embodiments, the vibration unit 133 may also be capable of producing sounds, such that the speaker 132 and the vibration unit 133 may be the same or integrated. Because of the size of the clip 100, the vibration unit 133 should be small in size.

Each side of the clip 100 may include a vibration unit 133 so the clip 100 may provide stereo vibration data. In some embodiments, two clips 100 are provided, each having a single vibration unit 133, such that each clip 100 can provide one part of the stereo vibration data. Vibration patterns on one side can be outputted that are different than vibration patterns on the other side. In this manner, different combination of left/right vibration patterns can convey useful information to the user. For example, certain vibration patterns on the left that are lacking on the right may be used to signal to the user that the user should turn left.

The input device 134 may be an input device such as a touch sensor and/or one or more buttons. For example, the input device 134 may be a touch sensor used as a slider to adjust settings as well as act as a button for making selections, similar to a touchpad.

The display 135 may be a display, wirelessly connected to the clip 100. For example, the display 135 may be a display on a connected cellular telephone. The display 135 may be capable of displaying visual data from the camera 121. In embodiments, the display 135 may be another visual alert device, such as one or more LEDs or similar light source.

In some embodiments, a local display, such as one or more LEDs, is present on the clip 100 and a remote display, for example, on a cellular phone, may also be utilized. The LED's may be helpful in troubleshooting the clip 100. For example, if the clip 100 stops working, it will have to be fixed. The LEDs may indicate a power status or any other status of the clip 100 or any error present with the clip 100.

The display 135 can appropriately remind the user with memory retention difficulties. For example, the display 135 may display an image indicating information about activities of the user to remind the user. For example, the displayed information may be based on the task that the user is currently performing, and the destination that the user is travelling towards. The displayed information may further correspond to the surrounding environment. For example, the information may correspond to identity, location and movement of others currently around the user. For example, a user with Alzheimer's may not recognize the people around the user. The processor may determine identity of the nearby person using facial recognition based on data detected by the camera 121. The display 135 may further indicate current events.

The component array 140 includes a battery 141, an antenna 142, and an input/output (I/O) port 143. The battery 141 may be a battery or other power supply capable of powering the clip 100. The battery 141 may have a connection port for recharging, or may be wirelessly recharged, such as through induction charging.

The clip 100 may be positioned in such a way that it can detect data within the residence, or any other location, while it is not being worn by the user. A kickstand may be provided for positioning the clip 100 when it is not being worn by the user. In some embodiments, the clip 100 may include a dock for charging. The clip 100 may remain in an active mode while it is docked. While docked, the clip 100 can alert the user if someone is walking up to the user's door. The clip 100 can also monitor the safety surroundings of the user's residence while it is in a docked state. For example, it can alert the user or police via a wireless or wired call if an intruder is present, it can alert the user if the stove has been left on, etc. In a residence with connected appliances, the clip can send a signal to the stove for the stove to turn itself off if it has been left home. These functions may also be performed away from a docking station.

The battery 141 can be connected to an external power source or outlet via a power cord. Alternatively or in addition, the battery 141 can be charged via wireless charging. Battery size and capacity may differ based on design concerns such as the required computation. Additional capacity may be required based on the average operation time.

The antenna 142 may be one or more antennas capable of transmitting and receiving wireless communications. For example, the I/O port 143 may include a headphone jack and/or or may include a data port. For example, the antenna 142 may be a Bluetooth or WiFi antenna, may be a radio frequency identification (RFID) antenna or reader, mobile telecommunication antenna (e.g., third generation (3G)) and/or a near field communication (NFC) unit. The I/O port 143 may be one or more ports for connecting additional peripherals.

The processor 111 may wirelessly connect to another processor of a smart phone, tablet, computer, laptop, other computer-based devices or a cloud via the antenna 142. The connection may be established using Bluetooth or Wi-Fi. The connection may instead or additionally be a wired connection, such as via a USB or other cable.

The connection can assist the user in sharing data among various devices in addition to utilizing functionality of the connected devices. The antenna 142 and/or the I/O port 143 allow the clip 100 to connect to another device or network for data downloads, such as updates or map information or other relevant information for a particular application, and data uploads, such as status updates. Further, the antenna 142 and/or the I/O port 143 allow the clip 100 to communicate with other clips 100 for distributed computing or sharing resources.

The clip 100 described herein is generally a stand-alone device. For example, smartphones, tablets, or other mobile devices may wirelessly connect to the clip 100 for shared data and processing. The mobile device may act as an additional or alternative display unit for the clip 100. The clip 100 may further have specific protocols for interacting with mobile devices or other clips 100.

Because the size of the clip 100 may be small so that it is not bulky, it may be desirable to use a small processor. A small processor may not be able to handle large quantities of computations. In some embodiments, the processor 111 may be able to filter certain data that it receives from the sensor array 120 to create a smaller data set. The smaller data set may then be sent to an offboard processor for further processing. In order to process visual data from the camera 121, the processor 111 may select a certain percent of frames to be sent offboard for processing. The processor 111 may also or instead determine divergence data between image frames and send the divergence data to an offboard processor via the antenna 142 or I/O port 143. This filtering of the data and sending the filtered portions of the data to an offboard processor can allow for a smaller processor 111 to be utilized and reduce the amount of data transfer via the antenna 142 or I/O port 143. In some embodiments, instead of or in addition to filtering, the processor 111 may perform some other functions and allow the offboard processor to perform the remaining functions.

The processor 111 may also be capable of handling all required processing. In some situations, an offboard processor may not be available, such as if a connected cellular telephone runs out of power. It may be desirable in this situation for the clip 100 to continue to operate. By allowing the processor 111 to handle all of the required processing, the clip 100 can still function. In some embodiments, the processor 111 may be configured to only filter data while an offboard processor is connected and to perform all processing if no offboard processor is available. The processor 111 may also be adapted to perform only some of the functions of the clip 100 if no offboard processor is available. These limited functions may be selected by the processor 111 or by the user.

The memory 112 may be positioned on the clip 100 or may be accessed remotely, for example, via the antenna 142. For example, the clip 100 may have a memory within it, and the processor 111 may access a remote memory for additional storage capacity. The remote memory may include memory dedicated to the user and/or it may include shared memory, such as a shared database.

The clip 100 may improve social interactions. For example, the clip 100 may recognize faces in a room to identify potential friends, and provide the user with audio feedback identifying friends. The stereo cameras 121A and/or the camera 121 may be further able to determine additional details about persons, such as moods or expressions, or if they are engaging in physical activities, in order to alert the user. For example, the potential friend may extend a hand for a handshake or a "high five," and the clip 100 may use audio or haptic feedback to notify the user. The microphone 131 may recognize voices of other persons to identify and appropriately notify the user, or may recognize a new voice to save for future identification.

The clip 100 may also be used in hazardous environments to provide additional safety warnings. The clip 100 can be a memory device to aid persons, such as Alzheimer's patients. The clip 100 can aid in shopping or otherwise navigating inventories by helping to keep track of goods. The antenna 142 may be an RFID or NFC reader capable of identifying RFID or NFC tags on goods.

Below are illustrated some embodiments of the clip 100. These embodiments are meant to be illustrative of various designs of the clip 100. The designs of the clip 100 illustrated below are not meant to be limiting in any way. Although FIGS. 1B-1K depict specific locations of components, in other implementations the exact locations and configurations may vary, as more or less components may be added or rearranged depending on specific applications.

Figure 1B:
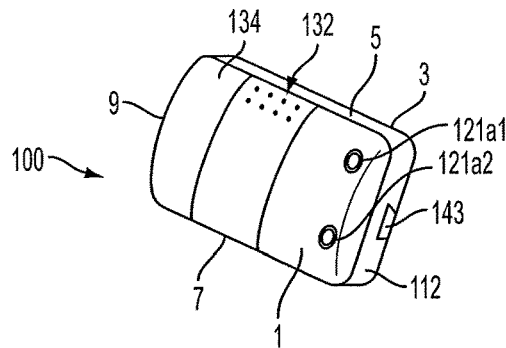
FIG. 1B illustrates a clip including a stereo camera pair, a button, a speaker and a USB port according to an embodiment of the present invention.

FIG. 1B illustrates a clip 100 according to an embodiment. The clip 100 has a front 1, a back 3, a top 5, a bottom 7, a first side 9 and a second side 11. The front 1 of the clip 100 includes a pair of stereo cameras 121A.

The first stereo camera 121A1 is positioned above the second stereo camera 121A2. A distance between the first stereo camera 121A1 and the second stereo camera 121A2 may be determined based on a preferred range of image detection. For example, if detection is preferred at a further distance from the clip 100, then the distance between the stereo cameras 121A may be greater. However, if greater precision is preferred at closer distances, then the distance between the stereo cameras 121A may be smaller. In various embodiments, a wide lens camera 121 or any other camera 121 may be provided. The stereo cameras 121A may be provided along with another camera 121.

The stereo cameras 121A may be positioned anywhere on the clip 100. It may be preferred for the stereo cameras 121A to be positioned on the front 1 of the clip 100. Because the clip 100 may be worn by the user, the user may prefer to have the stereo cameras 121A facing in a direction forward of the user. By having the stereo cameras 121A facing in a direction in which the user will be facing, data captured by the stereo cameras 121A may be more useful.

An input device 134 may be positioned on the front 1 of the clip 100 towards the first side 9 of the clip 100. The input device 134 may be positioned anywhere on the clip 100. The input device 134 may be a button, a knob, a dial, a haptic strip or the like. The input device 134 may allow the user to power on and off the clip 100, it may allow the user to change settings of the clip 100, it may allow the user to select a mode of the clip 100, etc.

The user may be able to select a mode of operation of the clip 100 using the input device 134. In some embodiments, a button or buttons may be used to scan through operation modes. In some embodiments, a button may be assigned to a particular mode, such that when a particular button is pressed, the clip 100 enters into the corresponding mode.

The clip 100 may operate in four modes: explorer mode, scan mode, find mode and capture. While in the explorer mode, the clip 100 provides data to the user associated with the surroundings of the user. In some embodiments, the clip 100 may describe data collected by the stereo cameras 121A, the camera 121 and/or any other sensor to the user. In some embodiments, the clip 100 may only described data that is collected while the user is moving (i.e., the field of view of the stereo cameras 121A and/or the camera 121 is changing). The data may only be certain data, such as hazards, whether a friend of the user is passing by, whether a user's favorite restaurant is detected, etc.

While in the scan mode, the clip 100 may describe everything that is in the field of view of the stereo cameras 121A, the camera 121 and/or any other sensor. For example, the clip 100 may describe everything in the field of view, such as by telling the user that object X is at your 10:00, object Y is at your 11:00, objects Z and W are at your 12:00, etc. The clip 100 may operate in the scan mode even if it is not in motion and/or being worn. For example, the user could place the clip 100 in a charging dock or in any other position in which the clip 100 could capture data with the stereo cameras 121A and/or the camera 121. The clip 100 could then continue to describe information that is in the field of view of the stereo cameras 121A and/or the camera 121.

While in the find mode, the clip 100 can navigate the user to a desired object, place, person, etc. The user can provide data about the desired object, place, person, etc., such as by speaking the name of the object, place, person, etc. The clip 100 can then determine the location of the object, place, person, etc. and provide navigation directions to the user.

The capture mode may allow the clip 100 to store its current position in the memory 1112 so that it can guide the user back to the same location at a later time. The capture mode may include 2 instructions—capture and return. Capture stores the position information (and possibly any obstacles that may arise during a return trip to the position) while return causes the clip 100 to provide navigation instructions to the user for a return to the position. In various embodiments, a single press of the capture button may indicate the capture instruction and a double click indicates the return instruction.

The clip 100 may also include a speaker 132. The speaker may be positioned anywhere on the clip 100. In the embodiment illustrated in FIG. 1B, the speaker 132 is positioned on the front 1 of the clip 100 towards the top 5 of the clip 100. The speaker 132 may extend onto the top 5 of the clip 100. This may allow the audio output from the speaker 132 to be directed towards a user's ear.

An I/O port 143 may be positioned anywhere on the clip 100. In the illustrated embodiment, the I/O port 143 is positioned on the second side 11 of the clip 100. The I/O port 143 may be any type of port, such as a USB port, a flash drive port, a 9 mm cable port, or the like. Multiple I/O ports 143 may be provided. For example, the clip 100 may include a 9 mm headphone jack for connecting the headphones and may include a USB port for connecting the clip 100 to a USB device.

Figure 1C:
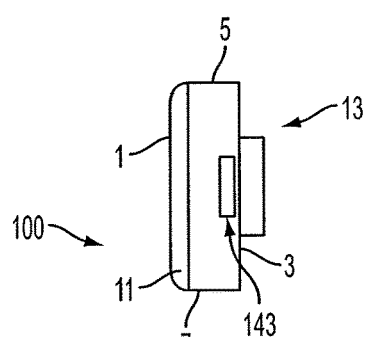
FIG. 1C illustrates the clip of FIG. 1B from a first side according to an embodiment of the present invention.

FIG. 1C illustrates the clip 100 of FIG. 1B from the second side 11. In FIG. 1C, we can see that the I/O port 143 is a USB port. It may be desirable for the I/O port 143 to be positioned on the first side 9, the second side 11, the top 5 or the bottom 7 of the clip 100. This may allow a cable connecting the clip 100 to an external device, such as a cell phone, to not obstruct a view of the camera 121 or be awkwardly positioned between the clip 100 and the user.

Also illustrated in FIG. 1C is a clasp 13. The clasp 13 may be positioned on the back 3 of the clip 100. The clasp 13 may be adapted to attach the clip 100 to the user. The user can attach the clip 100, via the clasp 13, to a loose article of clothing, such as a pocket flap, a collar, etc.

Figure 1D:
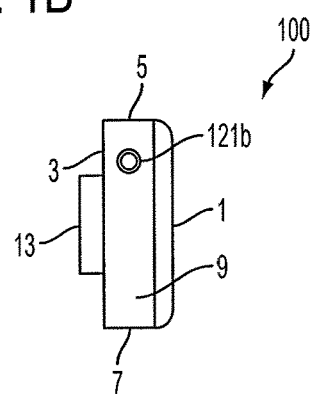
FIG. 1D illustrates the clip of FIG. 1B from a second side according to an embodiment of the present invention.

FIG. 1D illustrates the clip 100 of FIG. 1B from the first side 9. The clip 100 may include a second camera 121B. The second camera 121B may be any type of camera. In some embodiments, the second camera 121B is a low focal length camera. Using a low focal length camera would allow the clip 100 to read fine print. For example, the user may want the clip 100 to read text from a book or a magazine to the user. Because the clip 100 can be easily attached and detached from the user via the clasp 13, the user can remove the clip 100 from his article of clothing and use the second camera 121B to scan the book or magazine. Because the second camera 121B is a low focal length camera, the user can scan the book or magazine with the first side 9 of the clip 100 such that the second camera 121B can detect the words in the book or the magazine.

The processor 111 may receive data captured by the second camera 121B and perform an image recognition algorithm such that the processor 111 can determine the words. The processor 111 may then transmit the determined word data to the speaker 132 so that the speaker 132 can provide speech data including the determined word data.

Figure 1E:
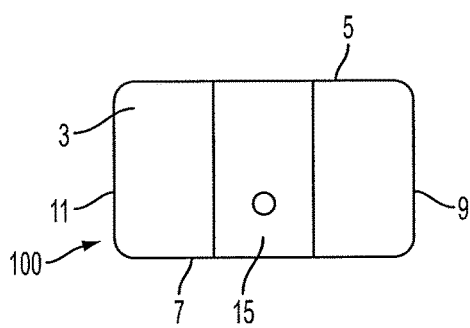
FIG. 1E illustrates the clip of FIG. 1B from the back according to an embodiment of the present invention.

FIG. 1E illustrates the clip 100 from the back 3. The clip 100 may include a channel 15 positioned on the rear of the clip 100. The channel 15 may be adapted to receive a physical connection to a clasp 13 or to a lanyard 27.

Figure 1F:
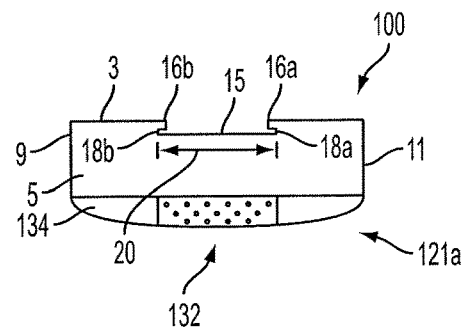
FIG. 1F illustrates the clip of FIG. 1B from the top according to an embodiment of the present invention.

FIG. 1F illustrates the clip 100 from the top 5. As illustrated, the speaker 132 may extend towards the top 5 of the clip 100.

From the top 5 of the clip 100, the channel 15 is illustrated with more detail. Protrusions 16 extend into the channel 15 from either side. These protrusions 16 form slots 18. The channel 15 has a distance 20 that extends between the first slot 18A and the second slot 18B. An attachment, such as a clasp 13 or a lanyard 27, may slide into the channel 15 at the location of the slots 18. The protrusions 16 would then hold the attachments in place in the channel 15.

Figure 1G:
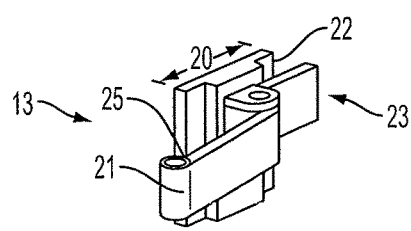
FIG. 1G illustrates a clasp for attaching a clip to a person according to an embodiment of the present invention.

FIG. 1G illustrates a clasp 13 which may be utilized with the clip 100. The clasp 13 may include a surface 22, a movable member 21, and a lever 23. The surface 22 may have a distance 20 that is the same distance 20 of the slot 18 or slightly smaller than the distance 20 of the slot 18. The surface 22 may be adapted to slide into the channel 15. Because of the protrusions 16 and the slots 18, the surface 22 will remain in place in the channel 15.

When pressure is applied to the lever 23, the movable member 21 moves in a direction away from the surface 22. This moves the movable member 21 away from the surface 22 at the junction 25 of the surface 22 and the movable member 21. When the force is removed from the lever 23, the movable member 21 exerts force on the surface 22 at the junction 25. Therefore, the user can apply pressure to the lever 23, position the movable member 21 over the article of clothing in which the clip 100 is to be attached, and then release the pressure on the lever 23 such that the clip 100 will remain in place.

Figure 1H:
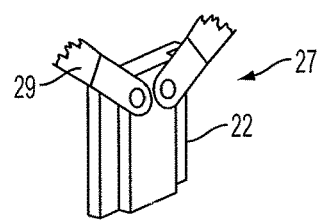
FIG. 1H illustrates a lanyard for attaching a clip to a person according to an embodiment of the present invention.

FIG. 1H illustrates a lanyard 27 that is adapted to attach to the clip 100. The lanyard 27 includes a surface 22 that may be the same or similar to the surface 22 of the clasp 13. The surface 22 may be configured to attach to the clip 100 in the slot 18. The lanyard 27 also includes a rope 29. The rope 29 may be positioned around a user's neck, wrist or any other part of the user's body. The rope 29 may then attach the clip 100 to the user.

The clasp 13 and the lanyard 27 allow the clip 100 to be easily attached and detached from the user. This can be useful in many situations. For example, the user may want the clip 100 to output detailed information about an object. In order to receive this detailed information, the user can remove the clip 100 from his body and position the clip 100 closer to the object. This proximity allows the clip 100 to detect more detail about the object.

FIG. 1I illustrates another embodiment of the clip 100 including positioning of some internal components. The clip 100 may include a camera 121C on the front 1 of the clip 100. The camera 121C may be any type of camera, such as a normal camera, a wide lens camera, a stereo camera 121A, or the like. The clip 100 can also include a sensor 125. The sensor 125 may be any type of sensor, such as a night vision sensor or a camera that detects light other than visible light. The wide lens camera 121C may provide a wide angle of view for the camera 121C. This allows the clip 100 to detect data in a larger range. Because the camera 121C is positioned on the front 1 of the clip 100, it will be facing in the same direction as the user. By having the wide lens camera 121C, the clip 100 will be able to capture data in a wide field of view, such as 120 degrees.

The clip 100 also includes a GPS 124. The GPS 124 may collect location data regarding the location of the clip 100. This can be useful in the case of a navigation operation of the clip 100.

The clip 100 may also include an IMU 123. The IMU 123 can detect motion and acceleration of the clip 100. This can be useful in many ways, such as providing data to the clip 100 that is useful in orienting the clip 100. As an example, the clip 100 may be adapted to warn the user of hazards. A hole may be a hazard in which the clip 100 warns the user about. However, if the clip 100 is facing towards the sky, data received by the camera 121C appear to be a hole instead of the sky. The IMU 123 may provide data to the clip 100 that the clip 100 was facing in an upward direction. The processor 111 may then be able to determine that the camera 121C was detecting data from the sky, not a hole.

The IMU 123 may also aid the clip 100 in determining a mode of operation. For example, the user may remove the clip 100 from his person and start scanning an object with it. The IMU 123 may detect this motion and the processor 111 may determine, based on this data from the IMU 123, that a reading mode is requested.

The clip 100 may also include a speaker 132. The speaker 132 may be positioned on a front 1 and/or the top 5 of the clip 100 so that audio output will be more directed into an open space and/or towards the user's ear(s).

The clip 100 may also include a microphone 131. The microphone 131 may be adapted to receive audio input from the user and/or from the environment. In some embodiments, more than one microphone 131 may be provided. The microphone 131 may be positioned anywhere on the clip 100. It may be preferred for the microphone 131 to be positioned at the top 5 of the clip 100. This way, the microphone 131 may be nearest to the user such that the user's voice will easily reach the microphone 131. In some embodiments, a second microphone 131 may be positioned elsewhere on the clip 100. The second microphone 131 may be adapted to receive audio input from the environment. When using two microphones, the first microphone 131 may be adapted to clearly detect the user's voice and the second microphone 131 may be adapted to clearly detect audio from the environment.

The clip 100 may also include a display 135. The display 135 may be any type of display. In the embodiment illustrated in FIG. 1I, the display 135 includes three LEDs. The LEDs may provide status information about the clip 100, such as a mode of operation, a battery status or a power on/off. The display 135 may also be a digital display. The display 135 may also provide information helpful in debugging the clip 100. The clip 100 may occasionally encounter a software, hardware or firmware issue. The information provided by the clip 100 may help a user discover the root of the problem so that an expert need not be called.

The clip 100 also includes a battery 141. The battery 141 may be positioned anywhere on the clip 100. It is preferred that the battery 141 be positioned towards the bottom of the clip 100. This provides a lower center of gravity to the clip 100, so that when the clip 100 is worn with a lanyard 27, or if it is desired to place the clip 100 in an upright position, such as with a kickstand, the clip 100 will more easily rest in an upright position.

The clip 100 also includes a processor 111. The processor 111 may be positioned anywhere on the clip 100. In some embodiments, it may be preferred for the processor 111 to be towards the bottom 7 of the clip 100. This again allows for a lower center of gravity for the clip 100 for positioning purposes. In some embodiments, the clip 100 does not include the processor 111. In these embodiments, data may be transferred to an off board processor via the antenna 142 or the I/O port 143.

The clip 100 may also include a memory 112. The memory 112 may be positioned anywhere on the clip 100. It may be preferred for the memory 112 to be positioned towards the bottom 7 of the clip 100. This allows the clip 100 to have a lower center of gravity, allowing it to remain in an upright position easier. In some embodiments, the clip 100 does not include the memory 112. Instead, an off board memory may be utilized. The off board memory may be connected to the clip 100 via a wireless connection through the antenna 142 or through the I/O port 143.

In some embodiments, it may be preferred to evenly distribute elements having significant weight, such as the battery 141, the processor 111 and/or the memory 112. This even distribution of weight may allow the center of gravity of the clip 100 to be towards the center of the clip 100. When the clip is to be attached to the user via the clasp 13, the clip 100 may more easily be positioned such that the front 1 of the clip is facing directly forward. It is generally preferred for weight to be evenly distributed between the first side 9 and the second side 11 of the clip. This helps the clip to remain comfortable and to remain in a stabilized position.

It may also be desired to select components having low weight. Because the clip 100 may be attached to a person, the clip 100 may become uncomfortable if too heavy. Additionally, the clip 100 can more easily remain in a desired position if it is low in weight.

The clip 100 may also include an antenna 142. The antenna 142 may be positioned anywhere on the clip 100. In some embodiments, the antenna 142 may form an open loop around the perimeter of the clip 100. This may provide for increased transmission and reception of data via the antenna 142.

The clip 100 may also include a vibration unit 133. The vibration unit 133 can provide haptic output to the user. In some embodiments, two or more vibration units 133 may be provided. These multiple vibration units 133 may provide stereo haptic output to the user.

FIG. 1J illustrates another embodiment of the clip 100. As illustrated, the speaker 132 extends from the front 1 of the clip 100 to the top 5 of the clip 100. This extension of the speaker 132 allows the speaker 132 to provide audio output to the user in a direction towards the user's ears, from the top 5 of the clip 100. This also allows the speaker 132 to provide audio data in a forward direction from the front 1 of the clip 100. This forward direction of audio output may be preferred if the user is using the clip 100 in a reading mode by scanning a book or magazine.

The clip 100 may include a first input device 134A and a second input device 134B. The input devices 134 may be buttons, knobs or haptic input, such as a touch screen. In the embodiment illustrated in FIG. 1J, two buttons are provided.

The clip 100 includes a first camera positioned on the front 1 of the clip 100. The first camera may be a wide lens camera, capable of capturing data in a range of 120 degrees.

The clip 100 also includes a second camera 121B positioned on the second side 11 of the clip 100. The second camera 121B may be a low focal length camera that is better optimized for reading text than the first camera 121C. The second camera 121B is also useful in detecting peripheral data. While walking, the camera 121C may detect data in front of the user. The second camera 121B may detect data towards the sides of the user. For example, if the user is shopping in a supermarket, the second camera 121B may be able to detect objects on the aisle while the user is walking down the aisle. If the second camera 121B detects an object to the side of the user, the clip 100 may alert the user that the user is near the object. In various embodiments, a third camera may be provided on the first side 9 of the clip 100.

Provided with the clip 100 is a kickstand 31. The kickstand 31 may attach to the clip 100 in the same manner as the clasp 13 and the lanyard 27. The kickstand 31 may be adapted to allow the clip 100 to rest in an upright position. While in a resting upright position, the clip 100 may still be able to detect objects in the environment as well as communicate with the user.

FIG. 1K illustrates two clips 100 attached together. The two clips 100 may be attached via a data connector 33 and/or a physical connector 35. In some embodiments, a single connector encapsulates a data connector and a physical connector. In some embodiments, a separate data connector 33 and physical connector 35 are provided. The data connector 33 allows data to transfer between the first clip 100A and the second clip 100B. The data connector 33 may be a physical connector, such as a USB cable, or it may be a wireless connection between antennas 142 of the clips 100.

The physical connector 35 may be any connector that is adapted to physically attach the first clip 100A to the second clip 100B. It may be preferred that the physical connector 35 be rigid. A rigid physical connector 35 between the clips 100 allows the clips 100 to remain in a single position relative to each other, which is useful if a camera from each clip 100 provides data to be used as stereo image data.

The first clip 100A may include a first camera 121D and a second camera 121F. The first camera 121D may be adapted to detect data forward of the user, and the second camera 121F may be adapted to detect data towards a first side of the user. The second clip 100B includes a first camera 121E and a second camera 121G. The first camera 121E may be adapted to detect data forward of the user and the second camera 121G may be adapted to detect data towards a second side of the user.

By utilizing two clips 100 together, stereo data may be detected by the cameras 121. Because each clip 100 only includes one single front facing camera 121, stereo data cannot be captured by an individual clip 100. However, because the first clip 100A is connected to the second clip 100B via the data connector 33, visual data can be combined from the first camera 121D and the first camera 121E into stereo data in order to detect depth information. Because the physical connector 35 is preferably rigid, captured stereo visual data will be more accurate. If the physical connector 35 was not rigid, then the first camera 121D and the first camera 121E may not always have the same position relative to each other. Because of this variable position, stereo data collected by the first camera 121D and the first camera 121E may not be as accurate as if the stereo data is when the physical connector 35 is rigid.

By connecting the two clips 100, additional peripheral data can be captured by the second cameras 121F and 121G. Because each clip 100 only has one second camera 121, data can only be collected on one side of the user by each clip 100. However, because the clips 100 are connected by the data connector 33, and because they each have a second camera 121 on a side, peripheral data can be captured from both sides of the user.

The first clip 100A includes a vibration unit 133. The second clip 100B also includes a vibration unit 133. Because each clip 100 only includes one vibration unit 133, stereo vibration output cannot be provided by an individual clip 100. However, by connecting the two clips 100 each having a vibration unit 133, stereo vibration data can be provided to the user.

FIG. 1L illustrates a clip in data communication with a smart device 101 and a cloud 105. The clip 100 includes an antenna 142. The antenna 142 may be adapted to communicate wirelessly with the smart device 101, the cloud 105, a tablet or the like.

The smart device 101 may include a processor 111A, a memory 112A and an antenna 142A. The antenna 142A may be adapted to communicate with the antenna 142 of the clip 100. The clip 100 may take advantage of the connection to the processor 111A and/or the memory 112A of the smart device 101. For example, the clip 100 may cause the processor 111A to perform some or all of the processing normally performed by the processor 111. Additionally, the clip 100 may use the memory 112A for storage instead of or in addition to the memory 112. In some embodiments, the clip 100 does not include the processor 111 and/or the memory 112 and relies solely on the smart device 101 for processing and storage.

The cloud 1105 may include a processor 111B and a memory 112B. The antenna 1142 may be able to communicate with the cloud 105. The clip 100 may take advantage of the connection to the processor 111B and/or the memory 112B of the cloud 105. For example, the clip 100 may cause the processor 111B to perform some or all of the processing normally performed by the processor 111. Additionally, the clip 100 may use the memory 112B for storage instead of or in addition to the memory 112. In some embodiments, the clip 100 does not include the processor 111 and/or the memory 112 and relies solely on the cloud 105 for processing and storage.

Figure 2:
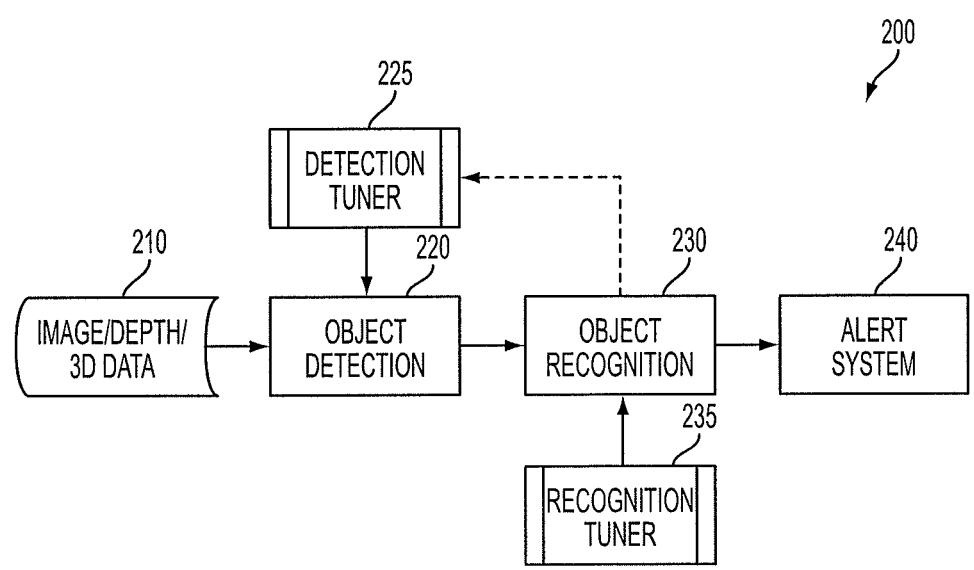
FIG. 2 is a flowchart of an object recognition logic according to an embodiment of the present invention.

Referring now to FIG. 2, a flowchart of a method 200 of adjusting object detection parameters, object recognition parameters, or both object detection parameters and object recognition parameters is schematically depicted. In some embodiments, the method 200 may be implemented as logic within the machine readable instructions that, when executed by the processor 111, automatically adjust object detection parameters, object recognition parameters, or both object detection parameters and object recognition parameters. It is noted that, while the method 200 depicts a specific sequence, additional embodiments of the present invention are not limited to any particular sequence.

Referring to FIG. 2, at block 210 the clip 100 receive image data representative of the environment. As noted above, in some embodiments, the clip 100 is configured to acquire video or image data, which may be video frames, of the FOV of the user from the camera 121 (including for example, the pair of stereo cameras 121A), and to then send the acquired image data of the environment to the processor ill and/or the memory 112 for storage and/or processing. In some embodiments, the clip 100 may receive image data from a source external to the clip 100, such as via the antenna 142 through a wireless network.

The image data received at block 210 may be data of a variety of forms, such as, but not limited to red-green-blue ("RGB") data, depth image data, three dimensional ("3D") point data, and the like. In some embodiments, the clip 100 may receive depth image data from an infrared sensor or other depth sensor, such as an infrared sensor or depth sensor integrated with the pair of stereo cameras 121A and/or the camera 121. In other embodiments that include a depth sensor (e.g., an infrared sensor), the depth sensor may be separate from the pair of stereo cameras 121A and/or the camera 121.

Still referring to FIG. 2, at block 220, the machine readable instructions stored in the memory 112, when executed by the processor 111, cause the clip 100 to detect a candidate object, with the onboard processing array 110, based on the image data received at block 210. In some embodiments, the onboard processing array 110 may detect the candidate object by identifying a candidate region of the received image data, such as a region of the image that includes high entropy. For example, the onboard processing array 110 may detect a high entropy region in the acquired target image data that includes a spray bottle. In some embodiments, the onboard processing array 110 may utilize a sliding window algorithm to identify the candidate region of the received image data. In embodiments, the onboard processing array 110 may detect the candidate object by utilizing a feature descriptor algorithm or an image descriptor algorithm, such as scale-invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. In some embodiments, the onboard processing array 110 may bias detections to one or more spatially located regions of interest based on application, scene geometry and/or prior information.

The onboard processing array 110 includes at least one object detection parameter to facilitate the detection of the candidate object. In some embodiments, the at least one object detection parameter is a window size, a noise filtering parameter, an estimated amount of light, an estimated noise level, a feature descriptor parameter, an image descriptor parameter, or the like.

Still referring to FIG. 2, at block 230, the machine readable instructions stored in the memory 112, when executed by the processor 111, will cause the clip 100 to recognize an object, using the onboard processing array 110, based on the image data received at block 210. In some embodiments, the object recognition module may recognize the object based on a candidate region identified by the onboard processing array 110.

In some embodiments, the onboard processing array 110 may recognize the candidate object by utilizing a feature descriptor algorithm or an image descriptor algorithm, such as scale invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. In some embodiments in which the onboard processing array 110 utilizes a feature descriptor or image descriptor algorithm, the onboard processing array 110 may extract a set of features from a candidate region identified by the onboard processing array 110. The onboard processing array 110 may then access a reference set of features of an object recognition reference model from an object recognition database stored in the memory 112 and then compare the extracted set of features with the reference set of features of the object recognition reference model.

For example, the onboard processing array 110 may extract a set of features from the high entropy region of the acquired target image data that includes a bottle and compare the extracted set of features to reference sets of features for one or more reference bottle models. When the extracted set of features match the reference set of features, the onboard processing array 110 may recognize an object (e.g., recognizing a bottle when the extracted set of features from the high entropy region of the acquired target image data that includes the bottle match the reference set of features for a reference bottle model). When the extracted set of features does not match the reference set of features, an object recognition error has occurred (e.g., an object recognition error indicating that no object recognition reference model matches the candidate object). When an object recognition error has occurred (e.g., referring to the example, no reference bottle model exists in the memory 112), the at least one object detection parameter may be adjusted to improve the accuracy of the object detection module, as described below with reference to block 225.

In some embodiments, the object recognition module may assign an identifier to the recognized object. For example, the identifier may be an object category identifier (e.g., "bottle" when the extracted set of features match the reference set of features for the "bottle category" or "cup" when the extracted set of features match the reference set of features for the "cup" object category) or a specific object instance identifier (e.g., "my bottle" when the extracted set of features match the reference set of features for the specific "my bottle" object instance or "my cup" when the extracted set of features match the reference set of features for the specific "my cup" object instance).

The onboard processing array 110 includes at least one object recognition parameter to facilitate the recognition of the object. In some embodiment, the at least one object recognition parameter is a window size, a noise filtering parameter, an estimated amount of light, an estimated noise level, a feature descriptor parameter, an image descriptor parameter, or the like.

Still referring to FIG. 2, at block 240, the machine readable instructions stored in the memory 112, when executed by the processor 111, cause the clip 100 to send control signals to the vibration unit 133 and/or the speaker 132 to provide appropriate haptic and audio feedback to the user. For example, if the object recognized is categorized as an obstacle, the vibration unit 133 may vibrate at an increasing rate as the clip 100 approaches it. If the object is categorized as a hazard, the speaker 132 may play a warning sound. If the object is categorized as a point of interest, the speaker 132 may play an appropriate notice, or may remain silent. As noted above, when an object recognition error has occurred, the at least one object detection parameter may be adjusted to improve the accuracy of the onboard processing array 110.

Still referring to FIG. 2, at block 225, the machine readable instructions stored in the memory 112, when executed by the processor 111, cause the clip 100 to adjust at least one object detection parameter of the processing array 110, with a detection tuner module, when an object recognition error has occurred. The detection tuner module may be implemented as instructions executed by the processor 111 and data stored on the memory 112. By way of non-limiting example, in some embodiments, the detection tuner module may adjust the window size utilized by the onboard processing array 110 when an object recognition error has occurred. In some embodiments, the detection tuner module includes a detection tuner model and the detection tuner model adjusts the at least one object detection parameter based on the object recognition error. In some embodiments, the detection tuner model maps the object recognition error to the adjusted at least one object detection parameter. In some embodiments, the detection tuner model is a learned correlation model, such as a support vector machine ("SVM") model.

Still referring to FIG. 2, at block 235, the machine readable instructions stored in the memory 112, when executed by the processor 111, cause the clip 100 to adjust at least one object recognition parameter of the onboard processing array 110, with a recognition tuner module, when object recognition error has occurred. The recognition tuner module may be implemented as instructions executed by the processor 111 and data stored on the memory 112. By way of non-limiting example, in some embodiments, the recognition tuner module may adjust the window size utilized by the onboard processing array 110 when object recognition error has occurred. In some embodiments, the recognition tuner module includes a recognition tuner model and the recognition tuner model adjusts the at least one object recognition parameter based on the object recognition error. In some embodiments, the recognition tuner model maps the object recognition error to the adjusted at least one object recognition parameter. In some embodiments, the recognition tuner model is a learned correlation model, such as a support vector machine ("SVM") model.

Figure 3B:
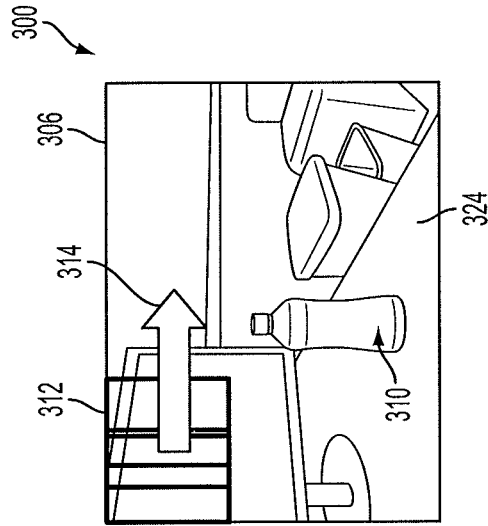
FIG. 3B further illustrates the object recognition logic shown in FIG. 3A.
Figure 3C:
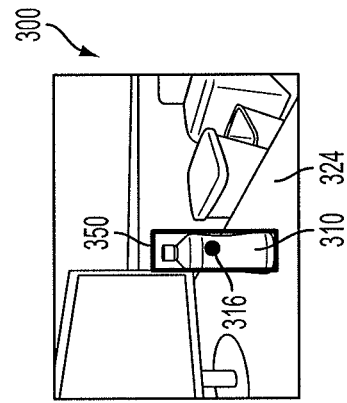
FIG. 3C further illustrates the object recognition logic shown in FIG. 3A.
Figure 3A:
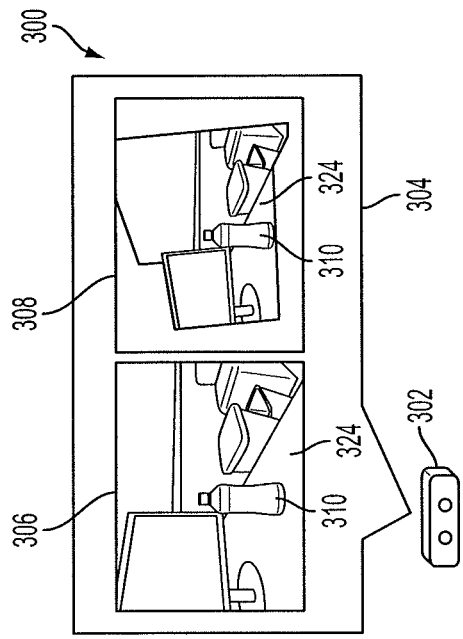
FIG. 3A illustrates an object recognition logic applied to a visual data set according to an embodiment of the present invention.

FIGS. 3A-3C present one example of a method of object recognition according to an embodiment of the present invention. In FIG. 3A, for example, the first visual data 306 corresponds to a 2-D image of the target object 310 positioned on a plane 324 (e.g., a table). The second visual data 308 corresponds to 3-D depth data of the target object 310 positioned on the plane 324. Category object recognition is performed for analyzing, using the processor 111 and the first visual data 306. The first visual data 306 is analyzed based on a plurality of object models stored in a database, which may be stored in the memory 112. For example, the plurality of object models may include primitive shapes such as cylinders, boxes, and the like associated with corresponding parameters defining the primitive shapes. For example, the processor 111 may determine whether any portion of the first visual data 306 corresponds in shape, structure, or in terms of other pose information, to the plurality of object models stored in the database. Each of the plurality of object models may have at least one parameter. For example, an object model may be a cylinder with parameters of a height and a radius. For example, an object model may be a box with three parameters of a width, a height, and a length.

When the processor 111 searches for an object model of the plurality of object models, more than one object model may be similar in shape or structure to a portion of the first visual data 306. For example, a body of a bottle (e.g., the target object 310) may be similar in shape or structure to either a cylinder or a box. The processor 111 is configured to determine which of the plurality of object models has the closest fit for the analyzed portion of the first visual data 306. For example, the processor 111 may assign a score (for example, a recognition accuracy percentage) as to the degree of similarity between a particular object model of the plurality of object models and the analyzed portion of the first visual data 306. For example, the processor 111 may choose the object model of the plurality of object models associated with the highest associated score (e.g., recognition accuracy percentage), as the object model that corresponds to the analyzed portion of the first visual data 306. As such, in one embodiment, the processor 111 determines the parameters of the chosen object model.

As described below, the plurality of object models are not fixed. The stored object models and their corresponding parameters may be supplemented or modified. In addition or in the alternative, new category object models may be learned and stored in the database based on the recognized target objects. The discussion at this juncture assumes that the method is detecting the target object 310 for the first time, and objects having similar shapes, structure, or pose information to the target object 310 as a whole are not yet encountered and stored.

Referring to FIG. 3B, an example of the category object recognition of the method is illustrated. For example, the processor 111 may examine the first visual data 306 adjacent to, around, or within the sliding enclosure 312 from left to right, starting from the top left corner of the 2-D image represented by the first visual data 306 moving right thereafter in the direction 314. The processor 111 may recognize objects within the first visual data 306 that are similar in shape or structure to an object model of the plurality of object models stored in the database. In other embodiments, instead of the sliding enclosure 312, the visual data set 304, the first visual data 306, the second visual data 308, or combinations thereof may be examined as a whole to determine whether any portion of the first visual data 306 matches an object model stored in the database.

FIG. 3C illustrates a result of the category object recognition. The processor 111 may recognize that the target object 310 is similar to one of the object models. The first enclosure 350 may be a bounding box, a bounding circle, or any other shape without limiting the scope of the invention. The first enclosure 350 has a first center point 316. When the first enclosure 350 is a bounding box, the first center point 316 is the point with approximately equal distance from each side of the bounding box. When the first enclosure 350 is a bounding circle, the first center point 316 may be the center of the bounding circle. In one embodiment, the processor 111 may determine the first center point 316 such that the first center point 316 is positioned on, corresponds to, or falls within a portion of the visual data set 304 corresponding to the target object 310. The target object 310 may, for example, be positioned within, around, or adjacent to the first enclosure 350. The processor 111 determines that a first target data (which is a portion of the first visual data 306) corresponds to the target object 310 to recognize the target object 310.

Although the method described above uses a bottle as an exemplary object, the method may be used to recognize points of interest and other features, such as stairs, empty seats or buildings. For example, the object recognition may be utilized to determine an empty seat without presence of a person. A seat can be recognized as a collection of category objects that make up an empty chair. For example, a seat can be recognized as a substantially horizontally positioned surface positioned on 4 legs recognized by straight vertical lines with a back rest positioned on the surface (which is detected as a collection of primitive shapes that make up a seat). The components of the seat and the relative positioning of the components can be compared to stored objects in the database to recognize the seat.

For example, a person could be represented by a circular shape at the top of his head, a straight line that represents the torso and two other segments which represent the legs. The camera 121 (e.g., pair of stereo cameras 121A) may be utilized to determine edge features, contours and depth information. An empty seat can be recognized as having a recognized chair without recognizing a person positioned on top of the horizontal surface of the chair.

The clip 100 can navigate the user to the empty seat. For example, the clip 100 may direct the user to an empty seat, or may remember the user's specific seat in order to navigate away and subsequently return to the same seat.

Figure 4:
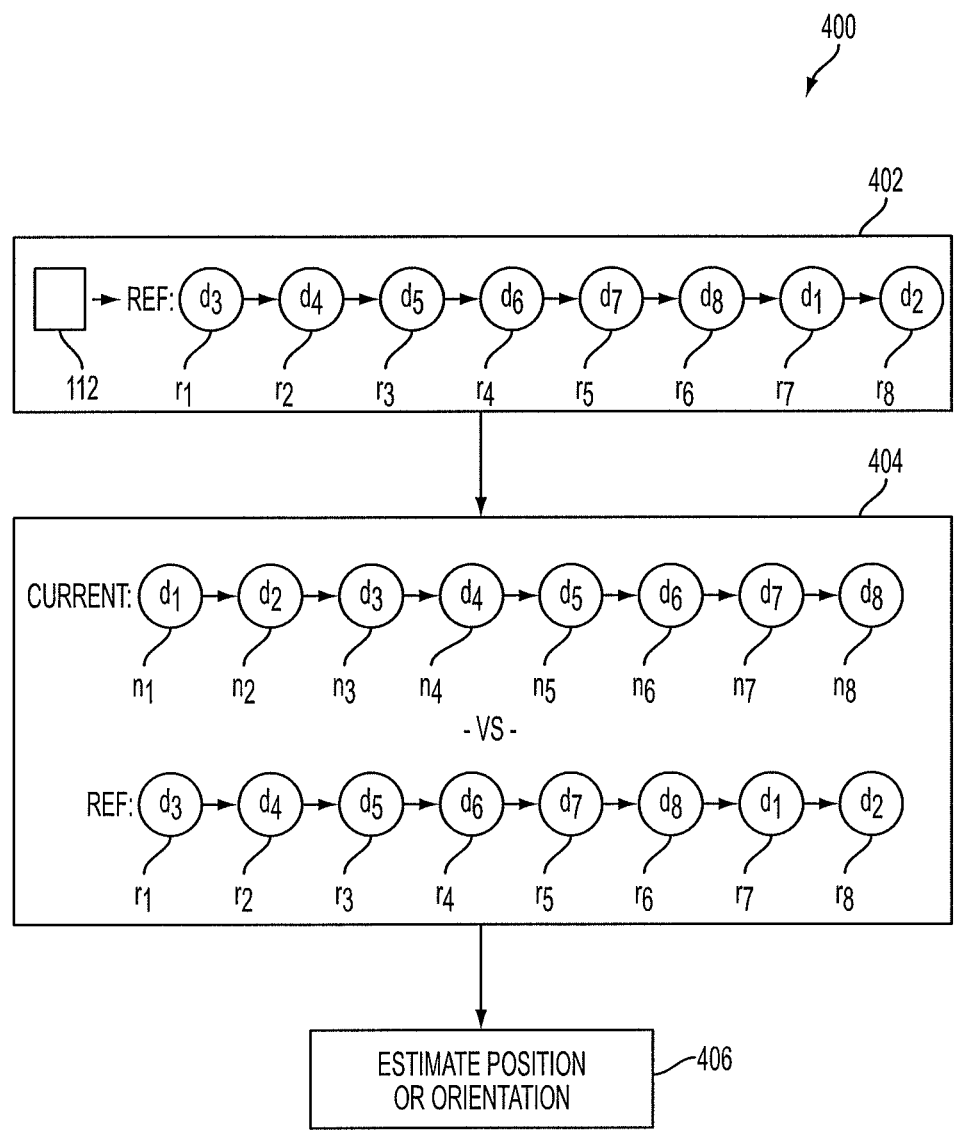
FIG. 4 is a flowchart illustrating a method of estimating a position or orientation based on slice descriptors according to an implementation of the present disclosure.

FIG. 4 shows a flowchart 400 of a method of estimating position or orientation based on slice descriptors. The onboard processing array 110 receives image data representative of a FOV from the camera 121. In some embodiments, the camera 121 can operate within a physical environment and is configured to acquire wide-angle image data, and then send the acquired wide-angle image data of the physical environment to the onboard processing array 110 for storage and/or processing. In some embodiments, the onboard processing array 110 may receive omnidirectional image data from a source external to the clip 100, such as via the antenna 142. The acquired omni-directional image data may be in the form of digital video and/or one or more digital photographs.

The onboard processing array 110 segments the omni-directional image data into a plurality of image slices. In one exemplary embodiment, the received omni-directional image is segmented into eight slices (S1, S2, S3, S4, S5, S6, S7, and S8). In some embodiments, the omni-direction image may be segmented into any number of slices. In some embodiments, the number of slices may be between 8 and 36. However, it should be understood that the number of slices may be less than 8 or greater than 36.

Each of the plurality of slices is representative of at least a portion of the panoramic field of view of the omni-directional image data or the partially panoramic field of view of the omni-directional image data. In some embodiments, the plurality of image slices includes a middle image slice (e.g., slice S2), a preceding image slice (e.g., slice S1), and a subsequent image slice (e.g., slice S3), such that a field of view of the middle image slice (e.g., slice S2) is adjacent to or overlaps a preceding field of view of the preceding image slice (e.g., slice S1) and the middle field of view of the middle image slice (e.g., slice S2) is adjacent to or overlaps a subsequent view of the subsequent image slice (e.g., slice S3).

In some embodiments, each image slice of the plurality of image slices is representative of an equal portion of the panoramic field of view of the omni-directional image data and the collective fields of view of the plurality of image slices is the same as the panoramic field of view of the omni-directional image data. For example, each of the eight slices captures an eighth of the full panoramic view of the omnidirectional image data and the collective field of view of the eight image slices is the same as the panoramic field of view of the omni-directional image data. In some embodiments, the field of view of a first slice of the plurality of views may be greater than a field of view of a second slice of the plurality of slices. In some embodiments, the collective fields of view of the plurality of slices may be smaller than the full panoramic field of view. In some embodiments, the field of views of neighboring slices may overlap.

The onboard processing array 110 calculates a slice descriptor for each image slice of the plurality of image slices. As used herein, "slice descriptor" refers to a description of the visual features (e.g., color, texture, shape, motion, etc.) of the image data of a particular slice of the omni-directional image data. For example, a slice descriptor d1 is calculated for slice S1, a slice descriptor d2 is calculated for slice S2, a slice descriptor d3 is calculated for slice S3, a slice descriptor d4 is calculated for slice S4, a slice descriptor d5 is calculated for slice S5, a slice descriptor d6 is calculated for slice S6, a slice descriptor d7 is calculated for slice S7, and a slice descriptor d8 is calculated for slice S8.

In some embodiments, the slice descriptor may be calculated using an algorithm, such as scale-invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. However, it should be understood that other algorithms may be used to calculate the slice descriptor. In some embodiments, the slice descriptor may include a decimal vector. In some embodiments, the slice descriptor may include a binary vector. In other embodiments, the slice descriptor may be represented in a format other a binary vector or a decimal vector. Depth information resulting from the application of stereo algorithms may also be used to calculate the slice descriptor.

The onboard processing array 110 generates a current sequence of slice descriptors for the omni-directional image data received. The current sequence of slice descriptors includes the calculated slice descriptor for each image slice of the plurality of image slices. For example, node n1 includes the slice descriptor d1 corresponding to slice S1, node n2 includes the slice descriptor d2 corresponding to slice S2, node n3 includes the slice descriptor d3 corresponding to slice S3, node n8 includes the slice descriptor d8 corresponding to slice S8, etc.

In some embodiments, the current sequence of slice descriptors may be structured such that a middle node (e.g., node n2) corresponds to a middle image slice (e.g., slice S2), a preceding node (e.g., node n1) corresponds to a preceding image slice (e.g., slice S1), and a subsequent node (e.g., node n3) corresponds to a subsequent image slice (e.g., slice S3). The preceding node (e.g., node n1) is linked to the middle node (e.g., node n2), and the middle node (e.g., node n2) is linked to the subsequent node (e.g., node n3).

In some embodiments, the current sequences of slice descriptors are stored in the memory 112. In some embodiments, the memory 112 may include a database of reference sequences of slice descriptors, each of which corresponds to a previously processed omni-directional image encountered by the onboard processing array 110.

In some embodiments, the current sequence of slice descriptors may be stored in the memory 112 as a current linked list of slice descriptors. In embodiments in which the current sequence of slice descriptors is stored in the memory 112 as a current linked list of slice descriptors, each node of the linked list may be linked to the subsequent node of the linked list (e.g., node n1 is linked to node n2, node n2 is linked to node n3, etc.). In some embodiments, the current sequence of slice descriptors may be stored in the memory 112 as a circular linked list of slice descriptors, such that the first node is linked to the second node (e.g., node n1 is linked to node n2), the second node is linked to the third node (e.g., node n2 is linked to node n3), . . . , and the last node is linked back to the first node (e.g., node n8 is linked to node n1). In some embodiments, the current sequence of slice descriptors may be stored in the memory 112 as a current doubly linked list of slice descriptors. It should be understood that in other embodiments, the current sequence of slice descriptors may be stored in the memory 112 using a data structure other than a linked list, such as an array, and the like.

While the omni-directional image received was not unwarped prior to segmenting the omni-directional image, in other embodiments, the omni-directional image may be unwarped prior to segmentation.

Returning to FIG. 4, at block 402, the machine readable instructions stored in the memory 112, when executed by the processor 111, may cause the onboard processing array 110 to access a reference sequence of slice descriptors in the memory 112. For example, in the embodiment depicted in FIG. 4, the reference sequence of slice descriptors includes a reference slice descriptor d3 corresponding to a reference node r1, a reference slice descriptor d4 corresponding to a reference node r2, a reference slice descriptor d5 corresponding to a reference node r3, a reference slice descriptor d6 corresponding to a reference node r4, a reference slice descriptor d7 corresponding to a reference node r5, a reference slice descriptor d8 corresponding to a reference node r6, a reference slice descriptor d1 corresponding to a reference node r7, and a reference slice descriptor d2 corresponding to a reference node r8.

Still referring to FIG. 4, at block 404, the machine readable instructions stored in the memory 112, when executed by the processor 111, may cause the onboard processing array 110 to determine whether the current sequence of slice descriptors matches the reference sequence. In some embodiments, whether the current sequence of slice descriptors matches the reference sequence of slice descriptors is determined by determining a current order of slice descriptors, determining a reference order of slice descriptors, and comparing the current order of slice descriptors to the reference order of slice descriptors. For example, a current order of slice descriptors in the embodiment depicted in FIG. 4 may be determined as {d1, d2, d3, d4, d5, d6, d7, d8}. A reference order of slice descriptors in the embodiment depicted in FIG. 4 may be determined as {d3, d4, d5, d6, d7, d8, d1, d2}. The current order of slice descriptors {d1, d2, d3, d4, d5, d6, d7, d8} may be compared to the reference order of slice descriptors {d3, d4, d5, d6, d7, d8, d1, d2} in order to determine whether the current order of slice descriptors matches the reference order of slice descriptors.

In some embodiments, the current sequence of slice descriptors is a current circular linked list of slice descriptors and the reference sequence of slice descriptors is a reference circular linked list of slice descriptors. In such embodiments, the current order of slice descriptors may be determined by traversing the current circular linked list of slice descriptors starting at a current starting node (e.g., the current order of slice descriptors may be determined to be {d1, d2, d3, d4, d5, d6, d7, d8} by traversing the current circular linked list starting from node n1 of the current circular linked list of slice descriptors).

The reference order of slice descriptors may be determined by traversing the reference circular linked list of slice descriptors starting at a reference starting node (e.g., the reference order of slice descriptors may also be determined to be {d1, d2, d3, d4, d5, d6, d7, d8} by traversing the reference circular linked list starting from node r7 of the reference circular linked list of slice descriptors). The current sequence of slice descriptors matches the reference sequence of slice descriptors when the current order of slice descriptors is the same as the reference order of slice descriptors. In the embodiment depicted in FIG. 4, the current sequence of slice descriptors may be determined to match the reference sequence of slice descriptors because the reference order of slice descriptors when traversing the reference circular linked list of slice descriptors starting from node r7 is the same as the current order of slice descriptors when traversing the current circular linked list of slice descriptors starting from node n1.

Still referring to FIG. 4, at block 406, the machine readable instructions stored in the memory 112, when executed by the processor 111, may cause the onboard processing array 110 to estimate an orientation or position based on the current sequence of slice descriptors and the reference sequence of slice descriptors. For example, differences between the current sequence of slice descriptors and the reference sequence of slice descriptors may be used to determine a current position or orientation with reference to a known position or orientation associated with the reference sequence of slice descriptors. In some embodiments, standard filtering techniques, such as the extended Kalman filter, the particle filter, and the like may be used to determine the current position or orientation based on the comparison between the current sequence of slice descriptors and the reference sequence of slice descriptors.

Figure 5:
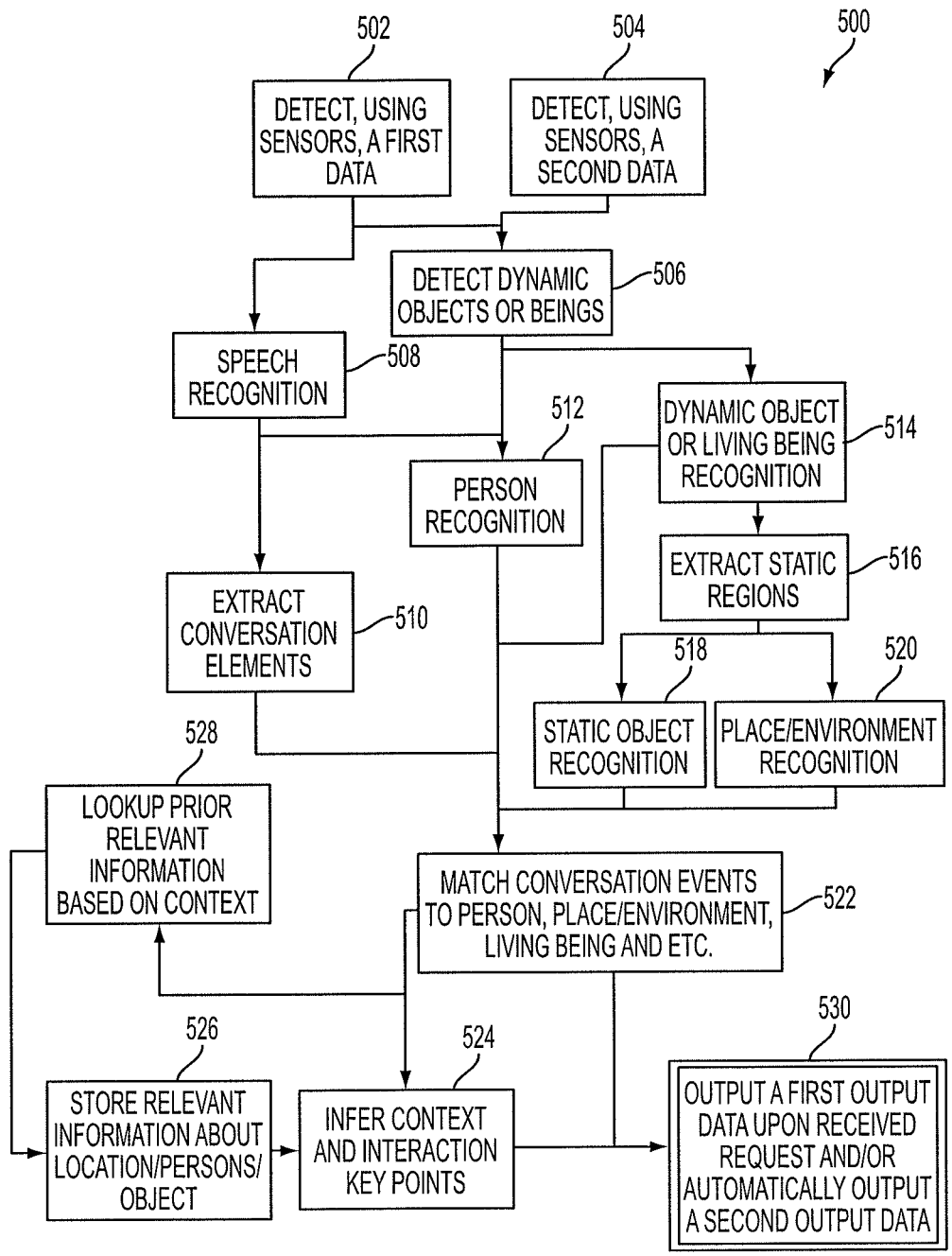
FIG. 5 is a flowchart for outputting first and/or second output data for providing assistance to a user of a clip according to an embodiment of the present invention.

FIG. 5 illustrates an exemplary method 500 for human interaction using the clip 100. The method 500 is only an example of the detection and analysis or processing of the first detected data and/or the second detected data. The blocks of method 500 may be performed simultaneously or in various combinations of orders. In blocks 502 and 504, the first data and the second data are detected using the camera 121 and/or sensor 125. The degree to which data can be collected regarding the surrounding environment of the user and matters therein may depend on what or which camera 121 and/or sensor 125 are available, as well as the processing limitations of the processor 111 and/or the external device and/or cloud. As such, the method 500 may be adjusted accordingly in real time by monitoring such limitations.

The processor 111 may work in concert with the camera 121 and/or sensor 125 for improving collection of the first detected data and/or the second detected data. The processor 111 may also consider whether the user or a person is requesting or attempting to convey information. For example, if a user is making a facial expression without speech to communicate with the clip 100, the processor 111 can direct the speaker 132 to pose follow-up questions or inquiries in order to supplement or clarify the detected data. For example, the method 500 may direct an output speech to be generated, thereby asking the user to clarify the facial expression. The user may then respond in a voice command clarifying the conveyed information. In other embodiments, this facial expression recognition setup may be performed by a person other than the user.

In block 506, the method 500 detects dynamic objects or beings. In one embodiment, the method 500 may detect movement, changes in a scene or other dynamic regions as observed by cameras in order to focus the camera 121 and/or sensor 125 on the detected dynamic regions. The processor 111 classifies the detected dynamic region as described below.

For example, detection of a person, living being, and/or a dynamic object may be performed by looking for changes in data detected by the camera 121 and/or sensor 125. Changes in data received from the camera 121 and/or sensor 125 may be identified by first estimating the motion of the clip 100 using the GPS 124, the IMU 123 or techniques such as visual odometry which allow estimation of the motion of a camera by tracking corner or blob features between two camera frames. As such, the clip 100 may identify motion in the surrounding environment of the user which does not correspond to the motion of the clip 100.

Upon identifying the changing parts of the scene within the first detected data and the second detected data, the clip 100 seek to recognize the changing elements, using techniques such as "eigenfaces" and "skeletal recognition" to recognize persons and faces. Additionally, standard techniques like Support Vector Machines, Deformable Parts Model and dynamic programming can be used to learn different models for various object/person classes. The types of features that can be used in these recognition tasks can be any combination of features like SIFT (Scale-Invariant Feature Transform), SURF (Speeded Up Robust Features), Gist modeling, Sobel, Fast, and other features and/or techniques that enable the method 500 to recognize a person, object, living being, or place/environment within a proximity of the user.

Thus, by detecting the dynamic regions, a new person entering the environment within the proximity of the user may be detected in block 512 and a dynamic object or being can be detected in block 506 and classified by the processor 111 accordingly. Simultaneously or thereafter, the clip 100 extracts the remaining static regions in block 516. In one embodiment, in block 516 additional second detected data are collected from static objects in block 518 and from an environment or place within a proximity of the user in block 520.

The microphone 131 may communicate with a speech recognition module to detect speech, conversation or interaction as shown in block 508. The clip 100 may further extract conversation elements containing useful data in block 510. In block 522, the processor 111 matches extracted conversation or speech elements from block 510 to the detected person, object, living being, place/environment, or combinations thereof.

In block 528, the method 500 looks up prior relevant information or learned data based on context and based on the matched conversation events from block 522 regarding the person, object, living being, place/environment, or combinations thereof. In block 526, the processor 111 stores relevant information for later use in the memory 112 based on prior relevant information. For example, if the processor 111 detects facial features of a person entering the environment and also detects that the new person is speaking, the speech elements can be matched with the new person.

Speech data related to the person may be stored in the memory 112 for later use. A 3-D microphone or a microphone array may also be utilized to localize the origin of the sound or voice. The clip 100 can track and log data related to the person in order to supplement the first detected data. The method 500 may actively and automatically output a second output data in block 530 based on the matched conversation events to the corresponding person, place/environment, living beings, or combinations thereof of block 522 and further based on the inferred context and interaction key points from block 524.

The processing of data (e.g., in blocks 506-350) can be performed by continuously analyzing data gathered by the camera 121 and/or sensor 125 in real time. The external device and/or cloud may be utilized due to restraints on the information storage capacity of the memory 112, energy capacity challenges associated with processing using solely the processor 111, and processing power limits of the processor 111. However, in one embodiment, both on-board and off-board processing capabilities are utilized to prepare for events in which the on-board processing may be preferable (e.g., a poor connection in cloud communications) to ensure a minimal level of capability. For example, if the device does not have sufficient capacity to perform the blocks of method 500, the external device and/or cloud can provide assistance in sharing the load of the processing.

In block 530, the processor 111 may passively output, using the speaker 132, a first output data upon an input/request received by the processor 111 or a predetermined or scheduled event stored in the memory 112. The processor 111 may further actively and automatically output, using the speaker 132, a second output data based on the first detected data and/or the second detected data, the previously detected, processed, and stored first and/or second data, the pre-programmed algorithm stored in the memory 112, or combinations thereof.

As discussed above, the interface array 130 communicates with the user or another person based on the detected data. The interface array 130 may communicate via the display 135 or a projection system in communication with the processor 111. The display 135 or projection system may be positioned on a remote device, such as a cellular telephone wirelessly connected to the clip 100. The interface array may also communicate via the speaker 132.

The output images/videos may be displayed using an LCD, an organic light emitting display, a plasma display, light-emitting diodes, or any other display mechanism for displaying the output images/videos.

Flow charts illustrating exemplary methods of the invention will now be disclosed. The clip 100 may be configured to operate in different modes. The mode may be selected, for example, using the input device 134. Depending on the mode, the clip 100 may perform all of the functions, some of the functions or none of the functions described herein. Different functions are illustrated using the flow charts. The functions represented by the flow charts do not always require all of the blocks, some additional blocks may be utilized, and the blocks are not necessarily performed in any given order.

All of the methods described below may cause the clip 100 to perform actions based on determining a divergence between stored data and detected data. For example, the process of FIG. 7 relates to a method for determining and responding to a danger to a user. As an example, if a user falls down, the camera 121 may detect data that the user is facing upwards. The previously detected and stored data may indicate that the user was previously facing in a direction parallel to the floor. The clip 100 may then take an action based on the divergence of data between the stored data (facing forward) and the detected data (facing upwards).

Figure 6A:
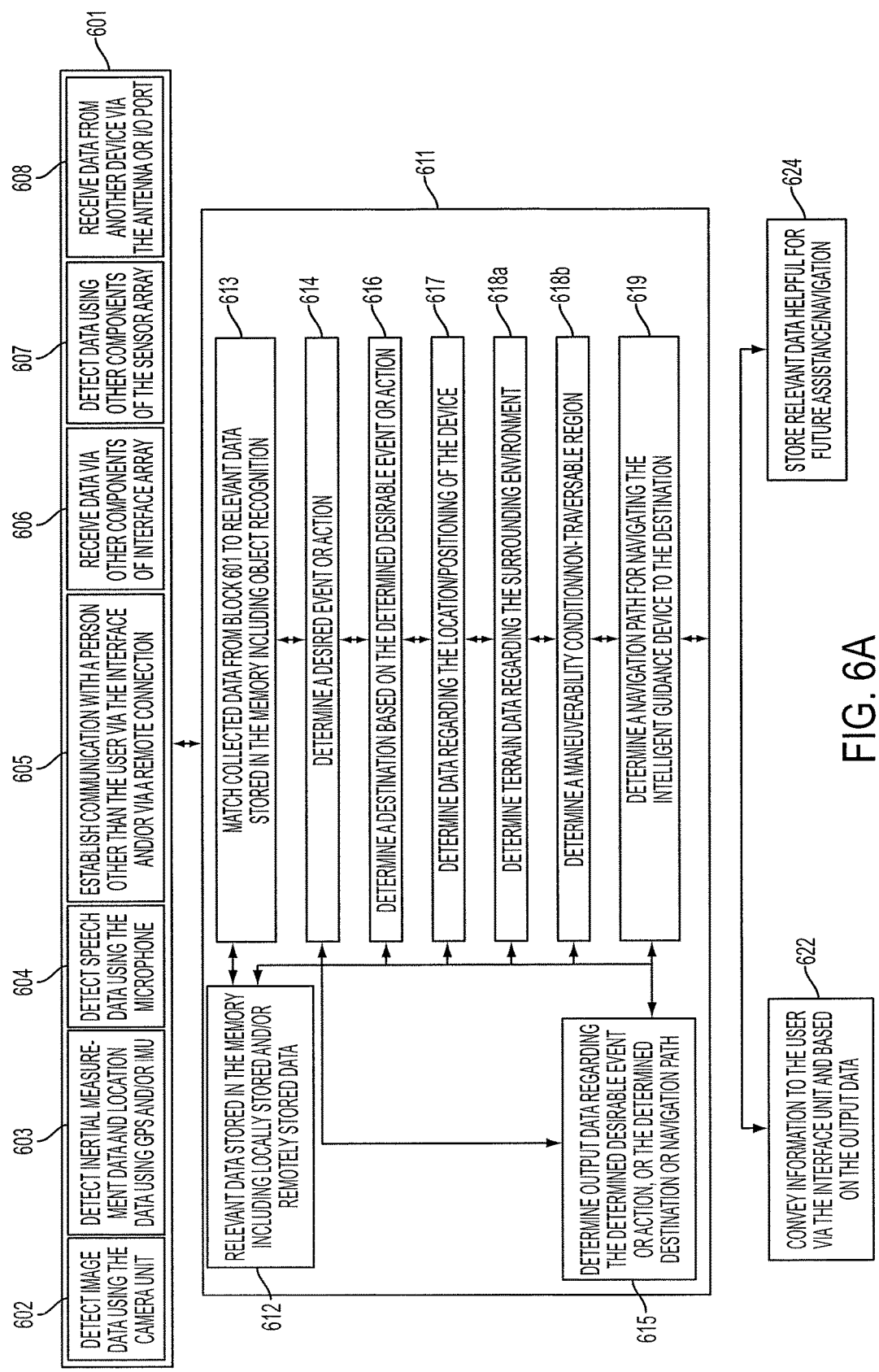
FIG. 6A illustrates an exemplary method for providing helpful information to a user of a clip based on detected data according to an embodiment of the present invention.

FIG. 6A illustrates an exemplary method for navigating an clip 100 and/or providing helpful information to a user of the clip 100 based on detected data. Block 601 refers to various methods of data collection using the clip 100.

In block 602, the clip 100 may detect image data using the camera 121. The image data may correspond to the surrounding environment, objects or living beings therein, the user, and/or other surrounding elements. For example, the image data may be associated with the shape of a room or objects within the room. As another example, the clip 100 may detect image data including facial recognition data.

In block 603, an IMU 123 is coupled to the platform and configured to detect inertial measurement data corresponding to a positioning, velocity, or acceleration of the intelligent navigation device. A GPS 124 is configured to detect location data corresponding to a location of the intelligent navigation device.

In block 604, speech data or audio data is detected using the microphone 131. This information may be information associated with the user, with the environment, with other people, actions, events, and various other items regarding social interaction and the surrounding environment. For example, when in a particular room, the clip 100, via the interface array 130, may receive information from the user or another person, such as the type of room (i.e., "this is the living room"). As another example, a user may want to name or add information regarding a particular person. In this instance, the clip 100, via the interface array 130, may receive information from the user such as to name the person (i.e., "he is Johnny"). Alternatively, the processor 111 may actively infer this information by parsing a conversation with the other person, without a user input that is directed to the clip 100.

Referring to another example, the user may provide input to the clip 100 that the user is performing a particular action, such as going to lunch. As another example, the user may provide input to the device that a hazard exists at the current position and a description of the hazard. Alternatively, the processor 111 may actively infer this information by parsing conversations, analyzing detected image data, etc. as discussed above with respect to FIG. 5 and as discussed further below.

The data may further include a request. This request may be, for example, a request to identify a person, identify a room, identify an object, identify any other place, navigate to a certain location such as an address or a particular room in a building, to remind the user of his current action, what color an object is, if an outfit matches, where another person is pointing or looking, etc. The output of block 614 (determining a desirable event or action) or of block 616 (determining a destination) can be based on the requested information. Although speech data is discussed with respect to block 604, the information can be gathered using any combination of components of the interface array 130 and/or the sensor array 120.

In block 605, the processor 111 may establish communication with a person other than the user via the interface array 130 and/or via a connection with a remote device. The remote connection may be established via a wireless communication antenna 142, as discussed further below.

The processor 111 may determine whether communication with a person other than the user is desirable or requested. For example, when the detected data suggests that the user requires an opinion of another person, a communication channel may be established with a device of another person. For example, when the detected speech regarding an outfit of the user, facial recognition data regarding the user being indecisive or wondering about what to wear, and/or perceived action of a user in front of a mirror indicate that the user needs fashion advice from another person, a video teleconference between the user and a friend of the user may be established. From prior conversations/interactions, the processor 111 may have previously stored a user's friend's contact information. The processor 111 may categorize types of friends of the user and recognize that this communication needs to be with a friend that the user is comfortable with. The processor 111 may output data to the user letting the user know that a video conference or teleconference will be established with the friend. The clip 100 may provide a video connection to a friend of the user or send a picture of the outfit to a friend of the user. In this example, the friend may provide a response as to whether or not the outfit matches. The friend may also assist the user in finding an alternate outfit that matches.

In block 606, data is received from the user, the environment, and/or other objects/beings via the interface array 130. For example, data may be detected from a touch-screen display, from a keyboard or buttons of an input device 134, or other devices capable of interfacing with the user or another person to receive input data.

In block 607, data may be detected using other components of the sensor array 120. For example, data may be detected from the camera 121, or other sensors 125 as discussed above. This information may be information associated with the user, with the environment, objects within the environment, and/or with other living beings/people.

In block 608, the clip 100 may also receive data from another device using the antenna 142 or the I/O port, such as data regarding a map of a building, or any other data. Data may be shared among the clip 100, other devices of the user (for example, a portable electronic device of the user such as a smart phone or tablet), a remote server, or devices of others connected with and with permission to access (for example, devices of the friends of the user).

In block 608, data is retrieved via the antenna 142 and/or I/O port 143. This data may be information indicating to the clip 100 that the user should be performing a particular set of actions. For example, the user may be in a hospital. The received information may be processed real time or stored for later use in the memory 112. The information may relate to mealtimes of the user. The clip 100 may then know that the user is to eat lunch at 12:00 pm in the cafeteria every day. As another example, the clip 100 may access the user's cellular phone and download the user's schedule.

In block 611, the processor 111 matches collected data from block 601 to relevant data stored in the memory. This includes object recognition. The processor 111 recognizes an object in the surrounding environment by analyzing the detected data based on the stored object data and at least one of the inertial measurement data or the location data. The object data stored in the memory 112 can be obtained from block 612.

In block 612, the memory 112 stores relevant data locally and/or remotely. For example, locally stored data may be data stored in a memory coupled to the clip 100. For example, remotely stored data may include data accessed from a remote server or another device via the antenna 142 and/or I/O port 143. For example, a schedule of the user may be periodically transmitted to the clip 100 via the antenna 142.

In block 613, the processor 111 matches data collected in block 601 to relevant data stored in the memory. This includes object recognition as discussed above. The processor 111 recognizes an object in the surrounding environment by analyzing the detected data based on the stored object data and at least one of the inertial measurement data or the location data. The retrieved data can include data stored in the cloud or the internet. The processor 111 determines what information is desirable to process the request. For example, if the user requested to be navigated to the living room, the clip 100 may need to know where the living room is, a layout of an entire route from the user to the living room and any hazards that may be present. As another example, if the user asked if his clothes match, then the clip 100 may need to know what type of clothes match, what colors match and what the user is wearing.

The processor 111 accesses the memory 112 to retrieve the information desired to process the request. For example, if the user requested to be navigated to the living room, the clip 100 may retrieve the location of the living room, a layout of the route from the user to the living room and any known hazards.

The processor 111 may determine whether or not the memory 112 has sufficient helpful information regarding the detected data. For example, when the user requests walking directions between two points, and a layout of a route is not available in the memory 112, the clip 100 may access the internet or the cloud via the antenna 142 and/or the I/O port 143 to retrieve this missing information.

In block 614, the processor 111 determines a desirable event or action. The processor 111 may determine a desirable event or action based on the recognized object, the previously determined user data and a current time or day. Current day or time is relevant for determining the current desirable event, action, destination, speech, etc. as discussed below.

The clip 100 may determine whether or not the user should be at a particular location and/or performing a particular action at any given time. For example, the processor 111 may match a previously stored lunch event to a current date/time (i.e., noon). The processor 111 may also match the previously stored lunch event to a time before the event. For example, if the user is to have lunch at noon somewhere that is 30 minutes away, the processor may determine a match at 11:30 am. As another example, a desirable action may be to wear certain clothes with other matching items. A desirable event may be to go to lunch if the current day/time indicates that the user in a nursing home should attend a lunch gathering event.

In block 615, the clip 100, via the interface array 130, may output data based on the inferred current desirable event, action/destination, etc. For example, if the inferred action is to find matching clothes, the processor may determine whether or not the outfit matches. As another example, if a destination is inferred, the processor may determine a viable navigation route for the user. The output may be, for example, a series of verbal phrases (i.e., step-by-step walking directions) via the speaker 132. The output may also be, for example, vibrations informing the user of the data. For example, a vibration on a left side of the clip 100 may signify to turn left, a vibration in a right side of the clip 100 may signify to turn right, a vibration in both right and left sides of the clip 100 may signify to stop, a continuous vibration in both sides may signify to slow down, or any other combination of vibrations may indicate any of these or any other command.

Discussion now turns to navigation features of the clip 100. In order to provide navigation information to the user, the processor 111 at least determines two sets of data: (I) data regarding positioning and/or location of the clip 100 and/or the user and (II) data regarding the surrounding environment, persons, objects, living beings, etc.

Referring back to block 602, data regarding the surrounding terrain of the clip 100 is detected using the camera 121. As discussed above, the blocks in FIG. 6A are not necessarily performed in the order shown. The processor 111 may determine, for example, that further image data is required to learn about the terrain after a destination is determined. When navigating indoors, the standalone GPS units may not provide enough information to a blind user to navigate around obstacles and reach desired locations or features. The clip 100 may recognize, for instance, stairs, exits, and restrooms and appropriately store them in the memory 112.

For example, the stereo cameras 121A may provide depth information of the surrounding environment and obstacles. Alternatively or in addition, one or more other cameras 121 may be utilized to provide information regarding the surrounding environment.

Referring back to block 603, data using the GPS 124 and/or IMU 123 is detected. This data can be used along with data obtained from the camera 121 to gain an understanding of the terrain.

In blocks 617, 618a, and 618b, the processor 111 analyzes data obtained using the camera 121 based on the data obtained from the GPS 124 and/or the IMU 123, and vice versa. In block 617, information set (II) can be used to gain a better/more accurate understanding of the information set (I) and vice versa.

In block 617, the processor 111 determines data regarding the location or positioning of the clip 100 using at least one of image data, inertial measurement data obtained using the IMU 123, location data obtained using the GPS 124, and relevant stored data (for example, map data stored in the memory 112).

In block 618a, the processor 111 may analyze features of images collected using the camera 121 and recognize the environment objects using object recognition. For example, data collected by the IMU 123 can be used to determine the amount and speed of movement to improve accuracy of detection using data collected by the camera 121. In addition, the IMU 123 may indicate a direction in which the collected information is located. For example, if the IMU 123 indicates that the information is regarding objects from a direction above the clip 100, the processor 111 can determine that the surface is more likely to be ceiling than ground.

In addition, data collected using the GPS 124 can enhance identification of data collected by the camera 121. For example, if the camera 121 provides an image of the building, the processor 111 can determine if the building is detected correctly by utilizing data regarding the location of the user in the world, because building types differ in different parts of the world.

The GPS information may be inadequate because it may not provide sufficiently detailed information about the surrounding environment. However, the GPS information can be utilized along with visual data from the camera 121 to draw inferences that are helpful to the user. For example, if the GPS information indicates that the clip 100 is currently inside a building, and the camera 121 provides information regarding an object, the processor 111 can limit its search to objects that would rationally be inside the building. For example, if an image provided by the camera 121 appears like a truck, the processor 111 can rule out the possibility that the object is a truck based on the GPS information. In other words, it is more likely to be an image of a poster of a truck, because the poster can rationally be within a building and a truck cannot. The GPS 124 provides location information, which along with the inertial guidance information, including velocity and orientation information provided by the IMU 123, allows the processor 111 to help direct the user.

The memory 112 may store, for example, map information or data to help locate and provide navigation commands to the user. The map data may be preloaded, downloaded wirelessly through the antenna 142, or may be visually determined, such as by capturing a building map posted near a building's entrance, or built from previous encounters and recordings. The map data may be abstract, such as a network diagram with edges, or a series of coordinates with features. The map data may contain points of interest to the user, and as the user walks, the camera 121 may passively recognize additional points of interest and update the map data.

In block 616, the processor 111 determines a desired destination based on the determined desirable action or event. For example, the clip 100 may direct the user to an empty seat, or may remember the user's specific seat in order to navigate the user away and subsequently return to the same seat. Other points of interest may be potential hazards, descriptions of surrounding structures, alternate routes, and other locations. Additional data and points of interest can be downloaded and/or uploaded to mobile devices and other devices, social networks, or the cloud, through Bluetooth or other wireless networks.

In block 618b, based on the analyzed data, a maneuverability condition/non-traversable region is detected. For example, a non-traversable region may be a region where the user cannot safely travel, such as a tar pit.

In block 619, the processor 111 determines a path over which the user can travel. The path excludes the detected non-traversable regions in block 618b. The clip 100 may determine paths for navigation, which may be further modified for the user's needs. For example, a blind person may prefer routes that follow walls. Using the IMU 123 and/or the GPS 124 and other sensors, the clip 100 can determine the user's location and orientation to guide them along the path, avoiding obstacles.

For example, the path may be towards a desired object (empty chair) as discussed above. The clip 100 may identify obstacles or paths for the user, and based on either the speed of the traveler or the intended direction of the traveler, be able to filter down what the significant obstacles or potential paths are. The clip 100 may then guide the user based on those significant obstacles or paths. Guidance may be, for example, auditory feedback or vibratory feedback, for either the path or objects to avoid.

In block 622, the output data from block 615 may be conveyed to the user using various outputs of the interface array 130. Multimode feedback is provided to the user to guide the user on the path. This feedback is also provided to guide the user towards the desired destination/object and is presented via a combination of speech, vibration, mechanical feedback, electrical stimulation, display, etc. With blind users, the processor 111 may keep the range of vision in mind when outputting information. A blind or partially blind person can identify most of the things that are less than three feet away using a cane. Objects and other items of interest more than 30 feet away may not be of utmost importance because of the distance.

While travelling along the path, the clip 100 may inform the user about signs or hazards along the path. The vibration unit 133 and/or the speaker 132 provide audio and haptic cues to help guide the user along the path. For example, the speaker 132 may play a command to move forward a specified distance. Then, special audio tones or audio patterns can play when the user is at a waypoint, and guide the user to make a turn by providing additional tones or audio patterns. A first tone, audio pattern or vibration can alert the user to the start of a turn. For example, a single tone or a vibration from the left side of the intelligent mobility aid device may indicate a left turn. A second tone, audio pattern or vibration can alert the user that the turn is complete. For example, two tones may be provided, or the vibration may stop so that the left side of the clip 100 ceases to vibrate, when the turn is complete. Different tones or patterns may also signify different degrees of turns, such as a specific tone for a 45 degree turn and a specific tone for a 90 degree turn. Alternatively or in addition to tones and vibrations, the clip 100 may provide verbal cues, similar to a car GPS navigation command. High level alerts may also be provided through audio feedback. For example, as the clip 100 reaches a predetermined distance—such as a foot or other value which may be stored in the memory 112 and may be adjusted—from an obstacle or hazard, the speaker 132 and/or the vibration unit 133 may provide audible alerts. As the clip 100 gets closer to the obstacle, the audible alerts and/or vibrations may increase in intensity or frequency.

As an example of the method illustrated in FIG. 6A, the user may give a voice command, "Take me to building X in Y campus." The clip 100 may then download or retrieve from memory a relevant map, or may navigate based on perceived images from the camera 121. As the user follows the navigation commands from the clip 100, the user may walk by a coffee shop in the morning, and the clip 100 would recognize the coffee shop. The clip 100 may use this recognition and the time of day, along with the user's habits, and appropriately alert the user that the coffee shop is nearby. The clip 100 may verbally alert the user through the speakers 132. The user may use the input device 134 to adjust settings, which for example may control the types of alerts, what details to announce, and other parameters which may relate to object recognition or alert settings. The user may turn on or off certain features as needed.

Figure 6B:
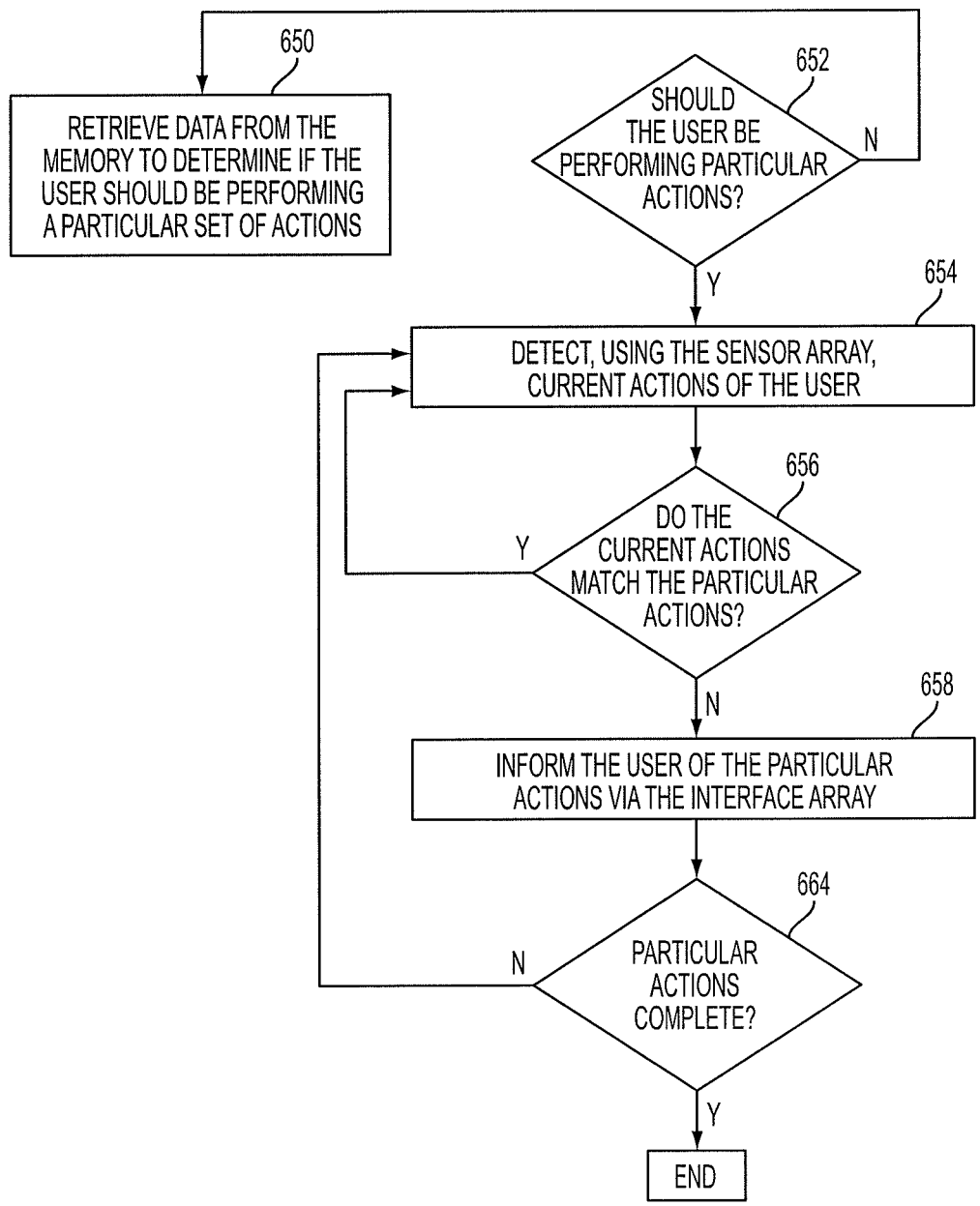
FIG. 6B illustrates an exemplary method for providing assistance to a user of a clip based on a determined desirable event, action, and/or destination, according to an embodiment of the present invention.

FIG. 6B illustrates an exemplary method for providing assistance to a user of the clip 100 based on an inferred current desirable event, action, destination, etc. In block 650, data is retrieved from the memory 112 and/or via the antenna 142 and/or the I/O port 143. This data may be information indicating to the clip 100 that the user should be performing a particular set of actions. For example, the user may be in a hospital. In this example, let's assume that the memory 112 includes information related to mealtimes of the user. The device may then know that the user is to eat lunch at 12:00 pm in the cafeteria every day. As another example, the user may inform the clip 100 of his/her schedule. For example, the user may inform the device that he/she has a meeting at 5:00 PM this Friday at 600 Anton Blvd.

In block 652, the clip 100 may determine whether or not the user should be at a particular location and/or performing a particular action at any given time. If not, the process may return to block 650. If so, the process may proceed to block 654.

In block 654, data associated with the current actions of the user is detected by the sensor array 120. For example, the GPS 124 and/or the IMU 123 may sense that the clip 100 is traveling towards the cafeteria or towards 600 Anton Blvd. As another example, the microphone 131 may detect data indicating that the user is busy talking to another person.

In block 656, it is determined whether the current actions of the user match the particular set of actions from block 650. For example, if the user is not moving towards the cafeteria and he is supposed be at lunch in 5 minutes, the current actions do not match the particular actions. If the current actions do match the particular actions from block 650, then the process returns to block 654 to ensure that the user continues to perform the particular actions.

In block 658, the user is informed of the particular actions via the interface array 130. For example, if the device is travelling away from the cafeteria, the clip 100 may provide data to the user that he should be going to lunch now. If the user does not begin the particular set of actions retrieved in block 650, then the clip 100 may again notify the user after a predetermined amount of time. However, the clip 100 may have learned when the user does not want to be interrupted. For example, the user may not want to be interrupted during a conversation. If the microphone 131 detects that the user is having a conversation, the clip 100 may wait until after the conversation to inform the user.

The clip 100 may determine, via the interface array 130, whether or not the user needs more information. The clip 100 may have previously learned preferences of the user, such as if he is wobbling back and forth, he requires directions. The clip 100 may also request navigational information. For example, the user may request directions to the cafeteria. The user can provide data to the clip 100 via the interface array 130 that he does or does not need more information. If the user does not require additional information, the process proceeds to block 664.

In block 664, the processor 111 determines whether or not the particular set of actions from block 650 is complete. If the particular actions are complete, then the process ends. If the particular actions are not complete, then the process returns to block 654.

An example of the process in FIG. 6B will now be provided. Assume that the user is supposed to be in the cafeteria for lunch. The clip 100 may determine that the user is supposed to be in the cafeteria and that the user is not moving towards the cafeteria. The clip 100 may then, via the interface array 130, provide feedback to the user, such as audio feedback that says, "time to go to lunch." The user may then return feedback to the clip 100, such as "I'm not ready yet" or "let's go." If the user is not yet ready, the clip 100 may remind the user again that it is lunch time after a predetermined amount of time. When he is ready, the user may provide data to the clip 100 that he is ready to go.

The clip 100 may then request feedback from the user to determine whether he needs directions or not. If the user responds no, then the clip 100 may not provide any current information. However, if the user responds yes, then the clip 100 may navigate the user to the cafeteria. The clip 100 may also be configured so that it communicates with another device. For example, the clip 100 may provide data to a terminal in the cafeteria that the user is on his way for lunch, so that his food can be prepared and a seat ready for him when he arrives. As the user arrives, the clip 100 may provide additional data to the user such as where his table is and who he is sitting with.

In some embodiments, the clip 100 may learn preferences of the user. For example, it may learn what chair the user normally sits at for lunch. In this example, the clip 100 may determine where the user's normal lunchtime chair is. To do so, it may use sensed visual data from the camera 121, position data from the GPS 124, the IMU 123, and/or any other detected data, as well as shape analysis as described above in regards to FIG. 2. Once the clip 100 determine where the chair is, it may guide the user to the chair so that the user can safely get to the chair and sit down.

Figure 7:
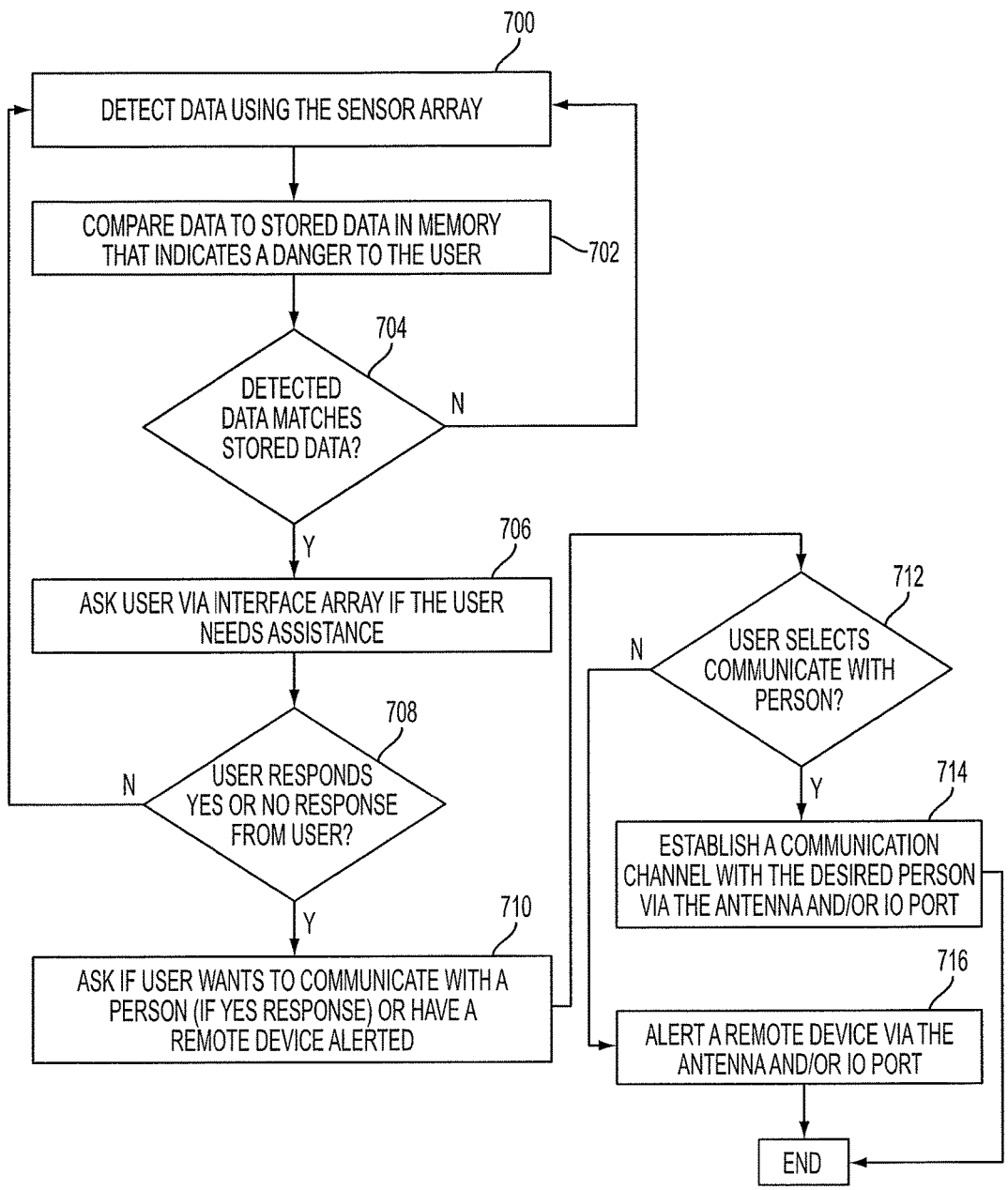
FIG. 7 illustrates an exemplary method for danger assistance by a clip according to an embodiment of the present invention.

FIG. 7 illustrates an exemplary method of danger assistance by the clip 100. In block 700, data is detected by the sensor array 120. This data may be visual data, position data, or any other data that the sensor array can sense. For example, the IMU 123 may detect data indicating that the user has fallen down or that the user is in an upside down position. The camera 121 may detect visual data such as a large object extremely close to the lens. The sensor array 120 may detect any other information such as data indicating a fire or a flood.

In block 702, the detected data is compared to data indicative of danger stored in the memory 112. This data in the memory 112 may be, for example, data associated with a falling motion of a user. The data may also be, for example, data associated with an object falling on the user. The processor 111 compares the data indicative of danger from the memory 112 to the detected data to determine if there is a match. For example, if detected data matches data indicating that a large object has fallen on the user, then a match exists.

In block 704, if no match exists between the data indicative of danger and the detected data, then the process returns to block 700 where data continues to be detected. If, however, a match does exist, then the process proceeds to block 706. In block 706, the clip 100 requests that the user provide information such as whether the user is ok. The user may provide this information via the interface array 130. This information may be, for example, a spoken "yes, I am ok," or "no, I am not ok."

In block 708, it is determined whether the user responded that he needs assistance, responded that he does not need assistance, or did not respond at all. If the user responded that he does not need assistance, then the process returns to block 700. If the user responded that he does need assistance or if the user did not respond to the inquiry, then the process proceeds to block 710.

In block 710, the clip 100 may, via the interface array 130, request that the user provide information about whether the user wants to communicate with a person or to have a remote device alerted.

In block 712, it is determined whether or not the user selected to communicate with a person. If the user selected to communicate with a person, then in block 714, a communication channel may be established between the user and the desired people/person. Additionally, the user may select whom he wants to speak with. For example, he may wish to contact his personal physician, the police, a friend, or any other person or service. The clip 100 may also have learned with whom to open a communication channel. For example, if fire data is detected, the clip 100 may open a communication with a fire department or "911" call center.

The communication may be established, for example, by connecting the clip to a cellular device via the antenna 142 and/or the I/O port 143. After the connection is established, the clip 100 may cause the cellular device to place a video call or a voice call to the requested person or institution. The microphone 131 of the clip 100 may act as the microphone for the cellular device and the speaker 132 of the clip 100 may act as the speaker of the cellular device. Once the communication is established, the user may communicate with the requested person and provide information. The clip 100 may also provide information to a device on the other end of the communication, such as any data associated with the danger, any location data, etc. Any information may also be communicated via a Wi-Fi, Bluetooth, etc. element of the clip 100. For example, the clip 100 may establish a VoIP connection via Wi-Fi.

If, in block 712, the user did not select to communicate with a person, or the user did not respond, the process may proceed to block 716. In block 716, a remote device is alerted of the danger via the antenna and/or the I/O port. This alert may consist of any data captured around the time of the incident, any location data, etc. The alert may be communicated by a connection to a cellular device via the antenna 142 and/or the I/O port 143, Wi-Fi, Bluetooth, etc.

Figure 8A:
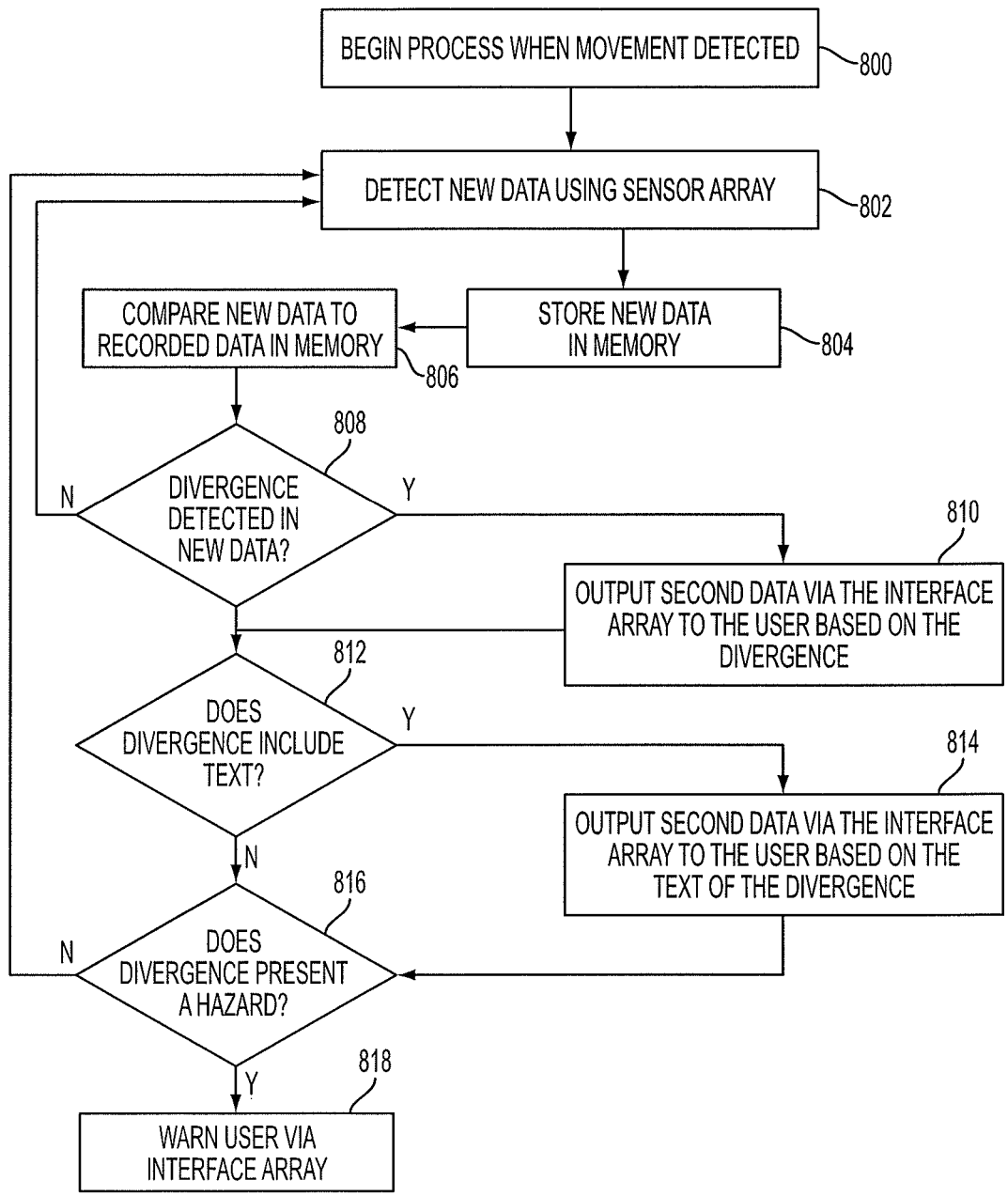
FIG. 8A illustrates an exemplary method for safety monitoring and alerting using a clip according to an embodiment of the present invention.

FIG. 8A illustrates an exemplary method for safety monitoring and alerting. The process begins in block 800 when movement is detected by the clip 100. This movement may be detected, for example, by the IMU 123 or the GPS 124. After the process begins, in block 802, new data is detected by the clip using the sensor array 120. This data may include any data detected by the sensor array 120, such as visual data (streets, sidewalks, people), position data (location of the user, direction of travel), audio data (such as a moving car sound, a siren, an alarm), or any other data. In block 806, this new data is stored in the memory 112.

In block 806, this new data is compared to data recorded in the memory 112. The data recorded in the memory 112 may include data captured at the same location at a previous time. The data recorded in the memory 112 may also include data captured at the same location or nearby at a time prior to the current time, such as milliseconds, seconds, or minutes prior to the current time. The processor may make this comparison using the object recognition method of FIG. 2.

In block 808, it is determined whether or not a divergence is detected between the new data and the data recorded in the memory 112. This divergence may include, for example, data indicating that a new object is in the field of view of the clip 100 that was not previously detected. A divergence may also include, for example, that a previously-present object is no longer in the field of view. The divergence may also include, for example, a new sound, such as a police siren.

In block 810, if a divergence is detected in the new data, a second data may be output to the user via the interface array 130 based on this divergence. As an example, let's assume that a divergence includes a boulder in the middle of the sidewalk. In this example, the clip 100 may provide data to the user indicating the divergence. For example, the clip 100 may, using the speaker 132, inform the user that an object matching the shape of a boulder is 10 feet directly ahead of the user. Alternately or additionally, the clip 100 may provide haptic feedback to the user based on the divergence.

In block 812, it is determined whether or not the divergence includes text. For example, the divergence may be a sign or police tape including text. The processor 111 may make this determination by comparing the new detected data to data indicating the shape of text characters to determine if any matches exist.

In block 814, if is determined that the divergence includes text, then the clip 100 may output data to the user via the interface array 130 based on the text of the divergence. For example, the data may include audio data indicating the content of the text of the divergence.

In block 816, it is determined whether or not the divergence presents a hazard. The memory 112 may have stored data which can be compared to detected data in order to determine if a divergence is hazardous. For example, the memory 112 may have stored therein visual data associated with a bobcat and an indicator that a bobcat is hazardous. As another example, the memory 112 may have stored therein visual data associated with the shape of a caution sign and the word caution, and that this data is an indicator of a hazard.

As another example, instead of having data representing a dangerous object, the memory 112 may store situational data. An example of situational data is that the clip 100 may recognize that if a large object is in the middle of a sidewalk that the user is walking along, the object may present a hazard. Another example of situational data is that the clip may recognize that if visual data of an area had been previously sensed and stored, and the visual data of the area is significantly different in the present sensing of the area, then a danger may exist.

In block 818, if it is determined that the divergence does present a hazard, the clip 100 may warn the user via the interface array 130. The warning may include, for example, an output via the speaker 132 info' wing the user that a hazard exists and the location of the hazard. The clip 100 may also output, for example, the type of hazard. If the clip 100 detected a caution sign that read "potholes in the sidewalk," then the clip 100 may output data to the user informing the user that potholes exist in the sidewalk. The clip 100 may also inform the user of the locations of the potholes as the clip 100 detects them. In some embodiments, the clip 100 may provide vibrational data to the user via the vibration unit 133. For example, as the user approaches a hazard, the vibration unit 133 may produce increasingly frequent vibrations.

In block 820, it is determined whether or not more movement of the clip 100 is detected. If no more movement is detected, then the user is standing still and the process may end. If movement is detected, then the process may return to block 802. If the process ends because of a lack of movement, it can restart at any time by detection of movement of the clip 100.

Figure 8B:
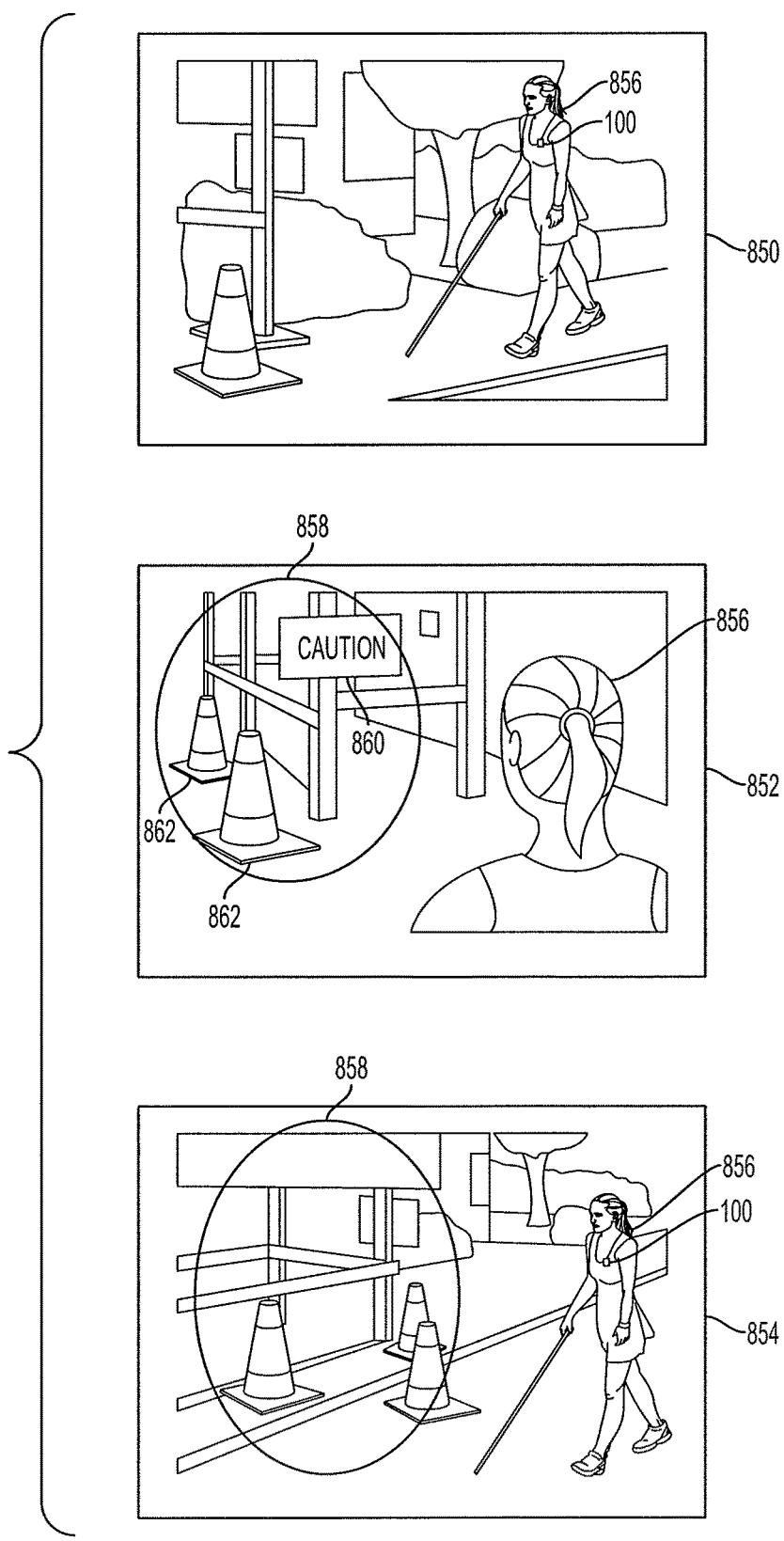
FIG. 8B illustrates an example of the method of FIG. 8A according to an embodiment of the present invention.

FIG. 8B illustrates an example of the method of claim 8A. In frame 850 of FIG. 8B, a user 856 is walking along a sidewalk. Let's assume that the user has previously walked along the sidewalk and the memory 112 has stored therein data detected by the sensor array 120 during the previous trips along the sidewalk.

In frame 852, a hazard 858 is present on the sidewalk in the direction of travel of the user. The hazard includes a caution sign 860 as well as two caution cones 862. When the hazard is in the field of view of the clip 100, the clip 100 may compare the detected data to stored data. The processor 111 may then determine that the hazard is a divergence and it may provide data to the user 856 based on the divergence. The data may include, for example, a description of the two cones 862, the fact that a sign is present and any other large diversions. The clip 100 may also detect that the diversion includes text. The clip 100 may provide the user 856 data based on the text, such as reading the text to the user.

The clip 100 may have learned that a caution sign 860 or a caution cone 862 presents a hazard, and determine that the caution sign 860 and/or the caution cone 862 present a hazard. The clip 100 may also determine this by identifying that the divergence is significant. The clip 100 may use the fact that the sign 860 and/or caution cones 862 are positioned in a direction of travel of the user 856 to determine that they present a hazard. The clip 100 may then provide data to the user 856 indicating that the hazard 858 is present.

The clip 100 may, for example, output the type and/or location of the hazard 858 to the user 856 using the speaker 132. The clip 100 may also, for example, vibrate with increasing frequency as the user approaches the hazard 858.

For example, in frame 854, the user may utilize the output from the clip 100 to navigate around the hazard 858. The clip 100 may vibrate more on one side than another to indicate the location of the hazard 858. In frame 854, the hazard is more to the right side of the user 856 than the left side. So, the right side of the clip 100 may vibrate more than the left side of the clip 100, indicating that the hazard is on the right. Alternately, the right side may vibrate less than the left side, indicating that it is safer on the left side.

Figure 9A:
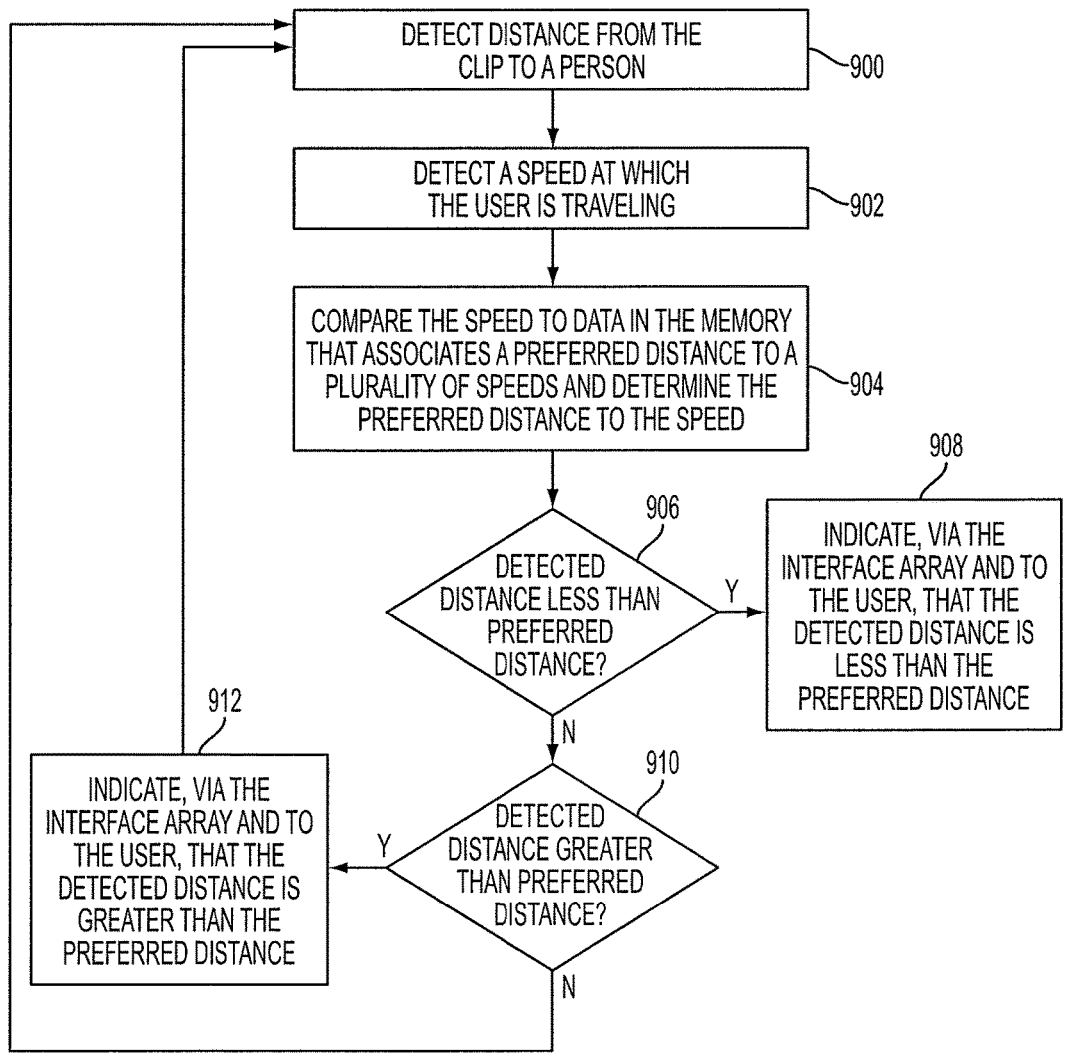
FIG. 9A illustrates an exemplary method for providing navigation assistance to a user of a clip according to an embodiment of the present invention.

FIG. 9A illustrates an exemplary method for providing navigation assistance to the user. This method may be used, for example, to inform a user when he should move forward in line. It may also be used, for example, to inform a user of when he should slow down or speed up based on a another walker. This method may also be used, for example, to inform a user of when he should slow down or speed up so that he can walk at the same pace as his friends.

In block 900, the clip 100, using the sensor array 120, may detect a distance from the clip to a moving object, such as a person. The object can be in any relative position to the user so long as it is in the field of view of the camera 121. The clip may also, in some embodiments, determine a speed at which the object is moving.

In block 902, the clip 100 may determine a speed at which the user is traveling, using the sensor array 120. This speed may include a walking or running speed, or it may be a zero speed. Using the speed data, as well as other data, the processor 111 may determine a set of actions that the user is performing. For example, the user could be walking with friends. He also could be waiting in a line, or walking down the street in a hurry to get to a meeting. The processor may utilize the detected data to determine the action of the user.

In block 904, the processor 111 compares the speed and other data to data in the memory 112. The data in the memory 112 may, for example, associate speed and other data to a preferred distance of the user to an object. For example, if the user is walking with friends, the preferred distance may be relatively short. As another example, if the user is rushing to a meeting, the preferred distance may be relative long so that the user does not accidentally run into the object.

In block 906, it is determined whether or not the detected distance is less than the preferred distance. This may be useful, for example, when the user is walking down the street faster than another walker, or has prematurely started walking forward when waiting in a line.

If the detected distance is less than the preferred distance, then the method proceeds to block 908. In block 908, the clip 100 outputs data to the user, via the interface array 130, indicating that the detected distance is less than the preferred distance. This data may include, for example, audio data or haptic data. For example, the clip 100 may vibrate with increasing frequency as the user approaches the object.

In block 910, it is determined whether the detected distance is greater than the preferred distance. This may be useful, for example, if the user is walking with friends and is moving at a faster pace.

If the detected distance is greater than the preferred distance, then the process proceeds to block 912. In block 912, the clip 100 output data to the user, via the interface array 130, indicating that the detected distance is greater than the preferred distance. This data may include, for example, audio data or haptic data. For example, the clip 100 may vibrate with increasing intensity as the distance between the user and the object grows. In some embodiments, there are only certain situations in which the clip 100 will alert the user that the distance is greater than the preferred distance. For example, if the user is walking alone, he will not care if he is far away from other walkers and the clip may not provide any data.

Figure 9B:
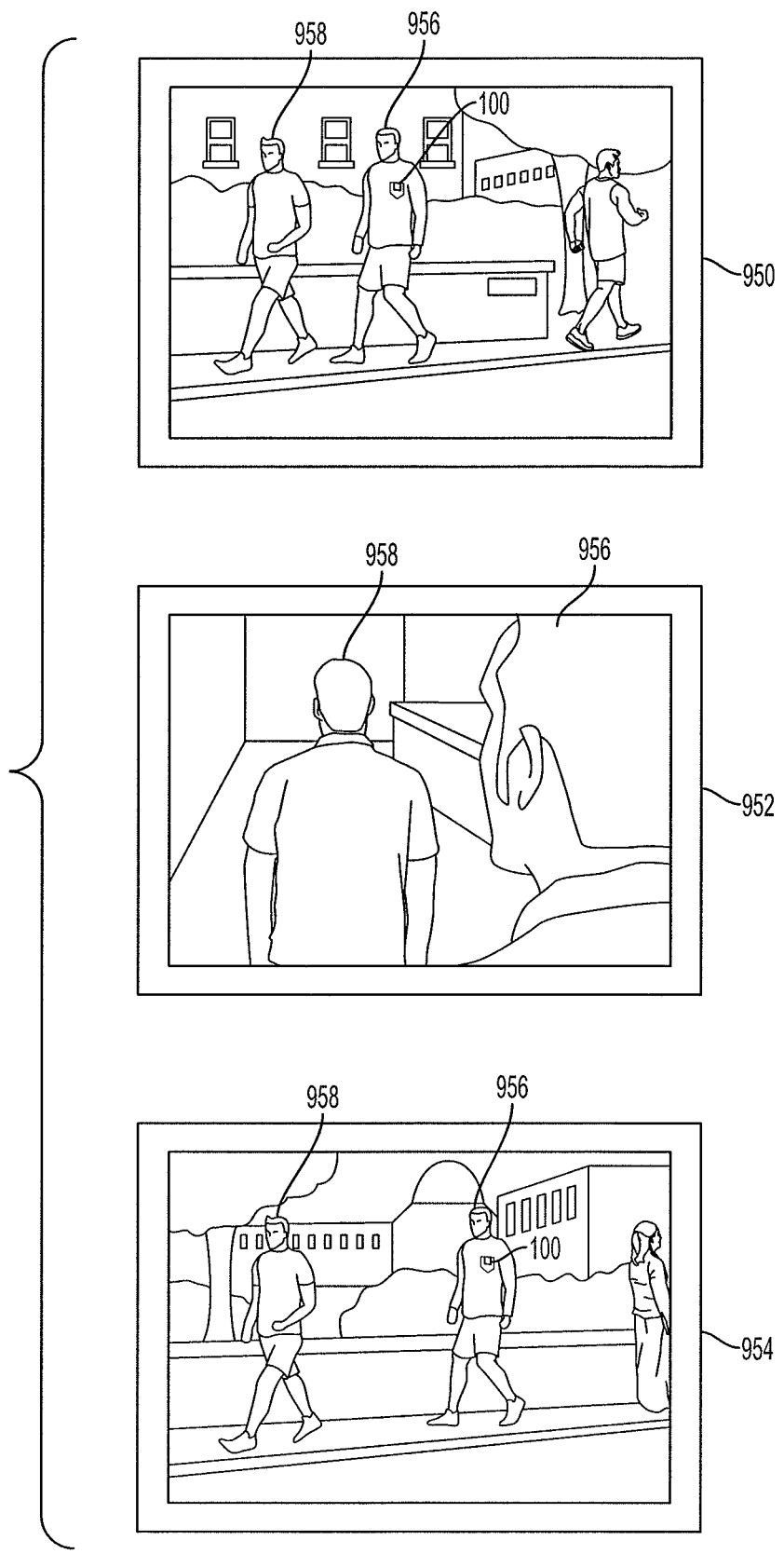
FIG. 9B illustrates an exemplary use of the method of FIG. 9A according to an embodiment of the present invention.

FIG. 9B illustrates an exemplary use of the method of FIG. 9A. In frame 950, the user 956 is walking down a sidewalk. The user is behind a walker 958. At first, the user 956 and the walker 958 may be traveling at the same speed. Initially, because of the same speeds, the distance from the user 956 to the walker 958 may be the preferred distance.

As illustrated in frame 952, eventually the walker 958 may slow down. In this situation, the detected distance from the user 956 to the walker 958 may become less than the preferred distance. The clip 100 may provide data to the user 956 including information that the detected distance is shorter than the preferred distance. The user 956 may then slow down based on the data from the clip 100. By receiving the data from the clip 100, the user 956 may slow until he is at the preferred distance from the walker 958, as illustrated in frame 954.

Figure 10A:
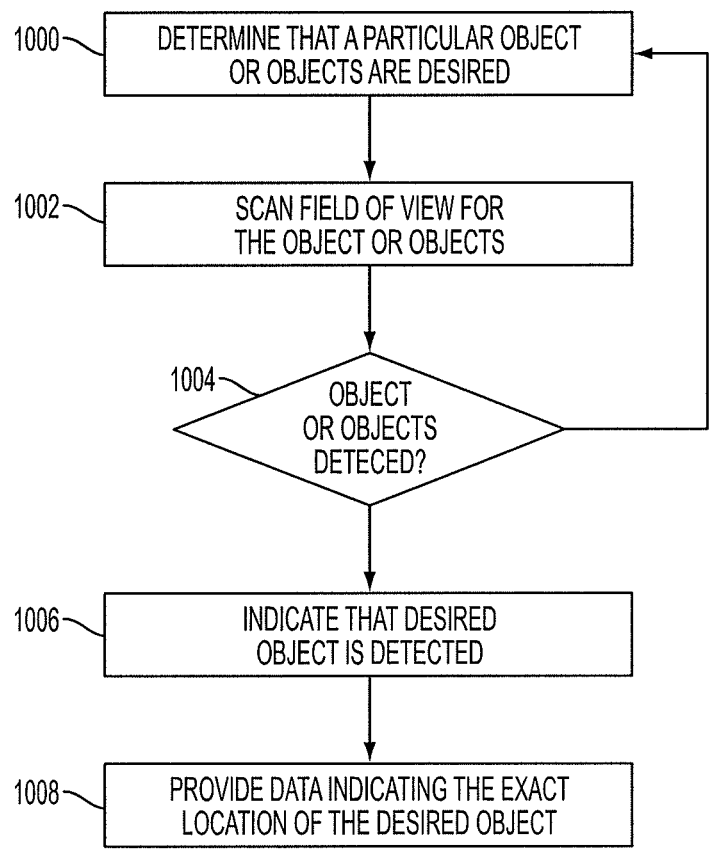
FIG. 10A illustrates an exemplary method for determining the location of a desired object by a clip according to an embodiment of the present invention.

FIG. 10A illustrates an exemplary method for determining the location of a desired object. In block 1000, the clip 100 may determine that a particular object or objects are desired. This may be determined with or without explicit instructions from the user.

For example, the user may be able to click a button while directing the camera 121 at an object to instruct the clip 100 to find the object. The user may also be able to verbally instruct the clip 100 to find the object. For example, the user may direct the camera 121 or the second camera 121B towards an object and say "I want to find this." The camera 121 may then capture image data of the desired object. The clip 100 may detect movement via the IMU 123. A certain movement of the clip 100 may indicate that the user desires to find a particular object. The user may also give a command that includes a description of the object. For example, the user could speak the words "find me a box of X cereal" into the microphone 131. The clip 100 may then be able to recall data from the memory 112 about the object or retrieve data via the antenna 142 or the I/O port 143 about the object. Data associated with the object may be stored in the memory 112 until the clip 100 locates the object.

In block 1002, the clip 100 may scan its field of view for the object or objects using the camera 121, the second camera 121B or any sensor 125. The clip 100 may continuously scan the field of view for the object or objects or the clip 100 may be told when to search for the object. For example, the user could make a grocery list at home and scan each of the objects that the user wants to retrieve from the grocery store. It would be a waste of processing power for the clip 100 to scan the field of view within the user's residence for the object or objects. In this situation, the clip 100 may determine when it is in the grocery store where it is reasonable to scan for the objects.

In block 1004, it is determined whether the object or objects have been detected. The clip 100 may compare the object data in the memory 112 to data sensed by any component in the sensor array 120. If the stored data does not match the sensed data, then the process returns to block 1000. If the object is detected, then the clip 100 may indicate that the desired object is detected. This indication may be in the form of audio output via the speaker 132 or via the vibration unit 133. The clip 100 may, for example, vibrate once when it detects the object. The clip 100 may also output a beep or an audible instruction that the object has been detected.

In block 1008, the clip provides data indicating the exact location of the desired object. For example, the vibration unit 133 may provide vibration or an audio tone with increasing frequency as the user approaches the object. The speaker 132 may also provide precise directions to the user about the location of the object.

Figure 10B:
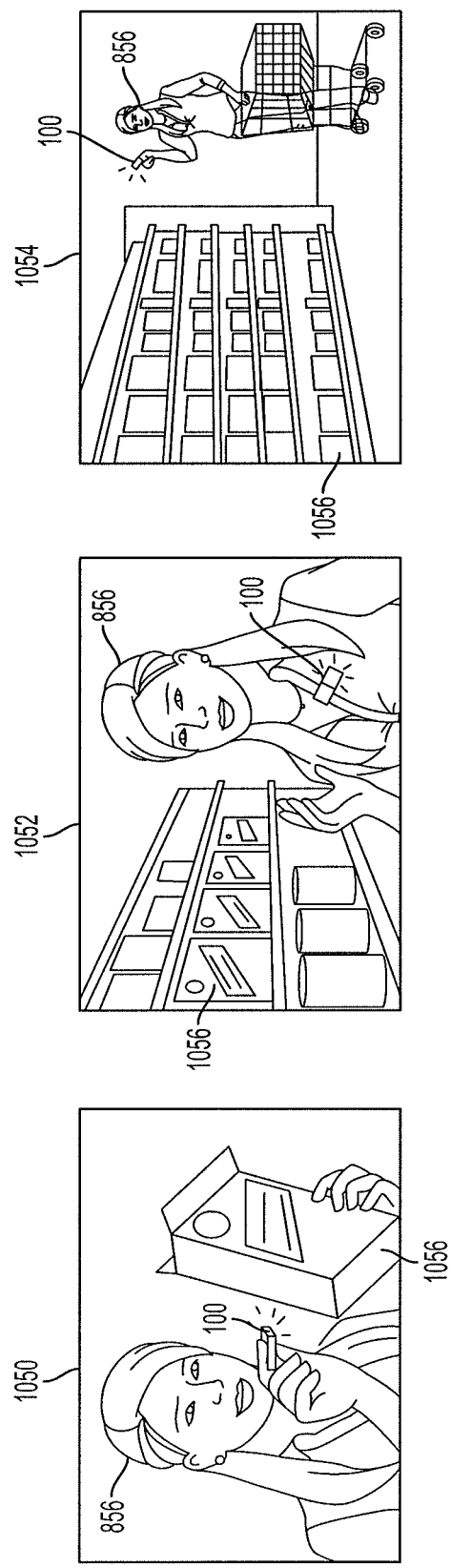
FIG. 10B illustrates an exemplary use of the method of FIG. 10A according to an embodiment of the present invention.

FIG. 10B illustrates an exemplary use of the method of FIG. 10A. In frame 1050, the user 856 is scanning a box of cereal 1056 with the clip 100. The box of cereal 1056 may be empty, and thus the user 856 wants to replace the box of cereal 1056. The user 856 may be using the second camera 121B of the clip 100 to detect data from the box of cereal, such as the name or a barcode of the box of cereal 1056.

In frame 1052, the user 856 is walking down an aisle in a supermarket. The clip 100 may be scanning the field of view of the camera 121 and the second camera 121B for the box of cereal 1056. As the clip 100 detects the box of cereal 1056, it indicates this to the user 856. For example, the clip 100 may provide a beep or a vibration.

In frame 1054, the clip 100 is directing the user 856 to the precise location of the box of cereal 1056. The clip 100 may provide vibrations or tones of increasing frequency as the user 856 approaches the box of cereal 1056. The clip 100 can also provide any other type of output to the user 856 that would direct the user 856 to the precise location of the box of cereal 1056.

Figure 11:
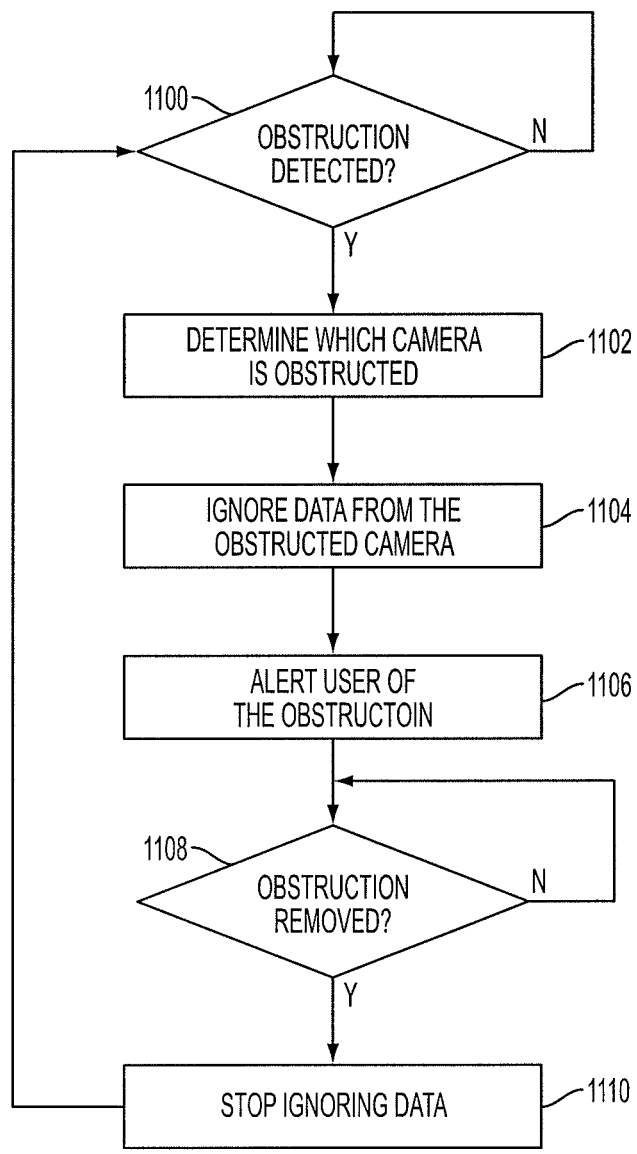
FIG. 11 illustrates an exemplary method for handling an obstruction of a camera on a clip according to an embodiment of the present invention.

FIG. 11 illustrates an exemplary method for handling an obstruction of a camera 121 (including stereo cameras 121A). An obstruction can be any occurrence that obstructs the view of any camera. For example, a lock of hair or an article of clothing can block the lens of any camera. The clip 100 can respond to the obstructed camera using the following method.

In block 1100, it is determined whether or not an obstruction is detected. Assuming that the camera 121 is obstructed, the obstruction may be detected in multiple fashions. Image data from another camera may be checked against data from the camera 121. If the data does not correlate, then the clip 100 may determine whether data from the camera 121 or the other camera is more likely data that represents the actual information surrounding the user. The camera 121 may also be adapted to determine the distance to an object. If an object is within a certain range, such as 3 inches, of the camera 121, then the clip 100 may determine that an obstruction is occurring.

If an obstruction is not detected, then the method may be placed on hold until an obstruction is detected. If an obstruction is detected, then the clip 100 may determine, in block 1102, which camera is obstructed. In this example, camera 121 is obstructed. This determination may be made based on the result of the selected method for determining whether an obstruction has occurred in block 1100.

In block 1104, the clip 100 ignores data from the obstructed camera. If the clip 100 is using data collected from the obstructed camera 121 as input to functions, then the functions may provide bad output. Because another camera may be unobstructed, the clip 100 can still provide data to the user based on image data captured by the unobstructed camera.

In block 1106, the clip 100 may alert the user of the obstruction. For example, the clip 100 may provide a spoken alert to the user that the camera 121 is obstructed. In various embodiments, the clip 100 may play a specialized tone or vibration instructing the user of the obstruction and/or the location of the obstruction.

In block 1108, it is determined whether or not the obstruction has been removed. This determination can be made using the same techniques discussed above in reference to block 1100. If the obstruction is not removed, then the method may remain in this state until the obstruction is removed.

If the obstruction is removed, then the clip 100 may stop ignoring data from the camera 121 in block 1010.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device, point of sale device, personal digital assistant (e.g., an Android device, iPhone®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Systems, methods and computer program products are provided. References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The steps of a method or algorithm described in connection with the examples disclosed herein may be embodied directly in hardware, in a software module executed by the processor 111, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium, such as the memory 112, is coupled to the processor 111 such that the processor 111 can read information from, and write information to, the storage medium. In the alternative, the storage medium may be integral to the processor 111. The processor 111 and the storage medium may reside in an Application Specific Integrated Circuit (ASIC).

The methods/systems may be described herein in terms of functional block components, screen shots, optional selections and various processing steps. It should be appreciated that such functional blocks may be realized by any number of hardware and/or software components configured to perform the specified functions. For example, the methods/systems may employ various integrated circuit components, e.g., memory elements, processing elements, logic elements, look-up tables, and the like, which may carry out a variety of functions under the control of one or more microprocessors or other control devices. Similarly, the software elements of the methods/systems may be implemented with any programming or scripting language such as, VPL, C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and XML with the various algorithms being implemented with any combination of data structures, objects, processes, routines or other programming elements. Further, it should be noted that the methods/systems may employ any number of conventional techniques for data transmission, signaling, data processing, network control, and the like.

As will be appreciated by one of ordinary skill in the art, the methods/systems may be embodied as a customization of an existing system, an add-on product, upgraded software, a stand-alone system, a distributed system, a method, a data processing system, a device for data processing, and/or a computer program product. Furthermore, the methods/systems may take the form of a computer program product on a non-transitory computer-readable storage medium having computer-readable program code means embodied in the storage medium. Any suitable computer-readable storage medium may be utilized, including hard disks, CD-ROM, optical storage devices, magnetic storage devices, and/or the like.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An intelligent clip to be worn by a user, comprising:
a housing having a front portion, a back portion, a channel positioned on the back portion and configured to receive a connection to a fastening device, a top portion, and a bottom portion; and
one or more components encased within the housing and including:
an inertial measurement unit (IMU) sensor configured to detect inertial measurement data corresponding to a positioning, a speed, a direction of travel or an acceleration of the intelligent clip,
at least one camera including a first camera positioned on the front portion, the first camera being configured to detect image data corresponding to a surrounding environment, a memory configured to store object data regarding previously determined objects and previously determined user data associated with the user, a processor connected to the IMU sensor and the at least one camera and configured to:

recognize an object in the surrounding environment based on the detected image data and the stored object data, determine a desirable event or action based on the recognized object, the previously determined user data, and a current time or day, determine a destination based on the determined desirable event or action, determine a plurality of navigation paths based on the determined destination, filter the plurality of navigation paths based on the inertial measurement data including the speed and the direction of travel to determine a navigation path of the plurality of navigation paths for the user to travel, and determine output data based on the determined navigation path; and a speaker or a vibration unit configured to provide the output data to the user.

2. The intelligent clip of claim 1 wherein the vibration unit is
configured to provide haptic information to the user based on the output data.

3. The intelligent clip of claim 1 wherein the memory is configured to store map data and the processor is configured to determine the navigation path based on the stored map data.

4. The intelligent clip of claim 1 wherein the one or more components include:

a wireless communication antenna for establishing an audio or video communication with another portable electronic device or computer used by another person, wherein the processor is further configured to establish the audio or video communication based on the determined desirable event or action.

5. The intelligent clip of claim 1 wherein the one or more components further include a microphone that is configured to detect a speech of the user or another person, wherein the processor is further configured to:

parse a conversation of the user or the another person into speech elements, analyze the speech elements based on the previously determined user data, and determine the desirable event or action further based on the analyzed speech elements.

6. The intelligent clip of claim 1 wherein the processor is further configured to determine the desirable event or action based on the detected inertial measurement data.

7. The intelligent clip of claim 1 wherein the at least one camera includes a second camera facing a second direction, wherein the first camera is facing a first direction.

8. The intelligent clip of claim 1 wherein the processor is configured to filter the detected image data and transfer the filtered image data to a remote processor via a wireless communication antenna.

9. The intelligent clip of claim 1 wherein the at least one camera includes a stereo pair of cameras that are further configured to detect depth information.

10. A method for providing continuous social and environmental awareness by an intelligent clip comprising:

detecting, via a camera or an inertial measurement unit (IMU) sensor, inertial measurement data corresponding to a positioning, a speed, a direction of travel, or an acceleration of the intelligent clip, or image data corresponding to a surrounding environment;

storing, in a memory, object data regarding previously determined objects and previously determined user data regarding a user;

recognizing, by a processor, an object in the surrounding environment based on the detected image data, the stored object data and the inertial measurement data including the speed and the direction of travel of the intelligent clip;

determining, by the processor, a desirable event or action based on the recognized object, the previously determined user data, and a current time or day;

determining, by the processor, a destination based on the determined desirable event or action;

determining, by the processor, a plurality of navigation paths based on the determined destination;

filtering, by the processor, the plurality of navigation paths based on the inertial measurement data including the speed and the direction of travel to determine a navigation path of the plurality of navigation paths for the user to travel;

determining, by the processor, output data based on the determined navigation path; and providing, via a speaker or a vibration unit, the output data to the user.

11. The method of claim 10 wherein:

providing the output data includes providing audio or haptic information based on divergence data between the object data and the image data.

12. The method of claim 10 wherein the desirable event or action includes alerting the user of an approaching hazard.

13. The method of claim 10 further including transmitting, via an antenna, the image data and the inertial measurement data to a remote device for processing.

14. The method of claim 10 further comprising:

storing, in the memory, map data; and determining the navigation path is based on the stored map data.

15. The method of claim 10 wherein storing the object data includes storing the object data in a remote database accessible by other intelligent devices.

16. An intelligent clip to be worn by a user, comprising:

a front;

a back;

a first side;

a second side;

an inertial measurement unit (IMU) sensor configured to detect inertial measurement data corresponding to a positioning, a speed, a direction of travel or an acceleration of the intelligent clip;

a first camera positioned on the front of the intelligent clip and configured to detect a first image data corresponding to a surrounding environment;

a second camera positioned on the first side or the second side and configured to detect a second image data corresponding to the surrounding environment;

a memory configured to store object data regarding previously determined objects and previously determined user data associated with the user;

a processor connected to the IMU sensor, the first camera and the second camera and configured to:

recognize an object in the surrounding environment based on the first image data, the second image data, the stored object data and the inertial measurement data including the speed and the direction of travel of the intelligent clip,
determine a desirable event or action based on the recognized object, the previously determined user data, and a current time or day,
determine a destination based on the determined desirable event or action,
determine a plurality of navigation paths based on the determined destination,
filter the plurality of navigation paths based on the inertial measurement data including the speed and the direction of travel to determine a navigation path of the plurality of navigation paths for the user to travel, and
determine output data based on the determined navigation path; and a speaker or a vibration unit configured to provide the output data to the user.

17. The intelligent clip of claim 16 wherein the second camera has a lower focal length than the first camera and is configured to read fine print.

18. The intelligent clip of claim 16 further comprising a button configured to be used as an input device for selection of a mode of operation.

19. The intelligent clip of claim 16 further comprising a wireless communication antenna configured to communicate with a remote processor.

20. The intelligent clip of claim 16 wherein the memory is accessible remotely by multiple smart devices.

* * * * *